(12) United States Patent
Sansanwal et al.

(10) Patent No.: US 11,323,556 B2
(45) Date of Patent: May 3, 2022

(54) ELECTRONIC DEVICE AND METHOD OF OPERATING ELECTRONIC DEVICE IN VIRTUAL REALITY

(71) Applicant: Samsung Electronics Co., Ltd., Suwon-si (KR)

(72) Inventors: Abhishek Sansanwal, Noida (IN); Neeraj Kumar, Noida (IN); Maneesh Jain, Noida (IN); Arun Kumar Singh, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 15/733,393

(22) PCT Filed: Jan. 18, 2019

(86) PCT No.: PCT/KR2019/000776
§ 371 (c)(1),
(2) Date: Jul. 17, 2020

(87) PCT Pub. No.: WO2019/143189
PCT Pub. Date: Jul. 25, 2019

(65) Prior Publication Data
US 2021/0099565 A1   Apr. 1, 2021

(30) Foreign Application Priority Data
Jan. 18, 2018   (IN) .............................. 201811002067

(51) Int. Cl.
*H04M 1/72412* (2021.01)
*H04M 1/72484* (2021.01)
(Continued)

(52) U.S. Cl.
CPC ......... *H04M 1/72412* (2021.01); *G06F 3/011* (2013.01); *G06F 3/0416* (2013.01);
(Continued)

(58) Field of Classification Search
CPC ............... G06F 3/044; G06F 3/04815; H04N 21/43615; H04M 1/72412; H04M 1/72484
See application file for complete search history.

(56) References Cited

U.S. PATENT DOCUMENTS 6,388,657 B1   5/2002  Natoli
7,870,496 B1   1/2011  Sherwani
(Continued)

FOREIGN PATENT DOCUMENTS

EP              3093743 A1   11/2016
KR   10-2014-0029901 A    3/2014
KR   10-2015-0050883 A    5/2015

OTHER PUBLICATIONS

International Search Report and Written Opinion of the International Searching Authority in connection with International Application No. PCT/KR2019/000776 dated Apr. 22, 2019, 11 pages.
(Continued)

*Primary Examiner* — Gerald Johnson

(57) ABSTRACT

Provided is an electronic device comprising: a memory storing instructions; and at least one processor configured to execute the instructions to: detect at least one event of the electronic device operating in a first mechanism; in response to the detected at least one event, operate in a second mechanism; and transmitting screen information of the electronic device to another electronic device for displaying a virtual reality screen at the other electronic device based on the screen information.

20 Claims, 43 Drawing Sheets

(51) Int. Cl.
*G06F 3/01* (2006.01)
*G06F 3/041* (2006.01)
*G06F 3/0488* (2022.01)

(52) U.S. Cl.
CPC ...... *G06F 3/0488* (2013.01); *H04M 1/72484* (2021.01); *G06F 2203/04108* (2013.01)

(56) References Cited

U.S. PATENT DOCUMENTS

| | | | |
|---|---|---|---|
| 8,754,931 | B2 | 6/2014 | Gassel et al. |
| 9,223,402 | B2 | 12/2015 | Cho |
| 9,489,086 | B1 | 11/2016 | Marsden et al. |
| 9,599,821 | B2 | 3/2017 | Van Curen et al. |
| 2011/0007021 | A1 | 1/2011 | Bernstein et al. |
| 2016/0034058 | A1* | 2/2016 | Stauber ............ H04N 21/44227 345/173 |
| 2016/0124499 | A1 | 5/2016 | Shiu et al. |
| 2017/0076502 | A1* | 3/2017 | Chen ........................ G06F 3/041 |
| 2017/0337897 | A1 | 11/2017 | Jung et al. |
| 2017/0364960 | A1* | 12/2017 | Huang ............... G06Q 30/0277 |
| 2018/0004297 | A1 | 1/2018 | Xu et al. |
| 2019/0025921 | A1* | 1/2019 | Hwang ................ G06F 3/0416 |
| 2019/0212823 | A1* | 7/2019 | Keller ..................... G06F 3/015 |

OTHER PUBLICATIONS

Virtual Reality Soceity "What is Virtual Reality?" https://www.vrs.org.uk/virtual-reality/what-is-virtual-reality.html, 2017, 3 pages.

Airtame, "Screen Mirroring," https://airtame.com/screen-mirroring, 2020, 2 pages.

Engadget, "A first look at Gear VR's moton controller," https://www.engadget.com/2017/02/27/gear-vr-controller-first-look/, Feb. 27, 2017, 7 pages.

* cited by examiner

"Easy Access" bar

ELECTRONIC DEVICE AND METHOD OF OPERATING ELECTRONIC DEVICE IN VIRTUAL REALITY

CROSS-REFERENCE TO RELATED APPLICATIONS

This application is a 371 National Stage of International Application No. PCT/KR2019/000776, filed Jan. 18, 2019, which claims priority to Indian Patent Application No. 201811002067, filed Jan. 18, 2018, the disclosures of which are herein incorporated by reference in their entirety.

BACKGROUND

1. Field

Embodiments generally relates to using physically separated electronic devices together in a virtual reality (VR) mode. More particularly relates to, systems and methods for operating a handheld device while using a virtual reality device (VR device).

2. Description of Related Art

Virtual Reality (VR) is the term used to describe a three-dimensional computer-generated environment with which a user can interact. VR environment may resemble the real world by providing users with sensory experience including seeing, touching, and hearing experiences. A person using VR may interact with objects displayed in VR or perform a series of actions, and may be assisted by VR devices, a VR headset, a head-mounted display, or multimodal devices, a wired glove, omnidirectional treadmills, etc.

In a closed VR environment which can be provided by a VR headset, a user may use VR controllers together. However, it is difficult for the user to use another electronic device like a handheld mobile device while using VR. So, in order for the user to interact with the handheld mobile device in the closed VR environment, the user needs to take off the VR headset. For example, when a user who is immersed in a VR gaming session by a VR headset, it may be difficult for the user to respond to a call received on his handheld mobile device. It may also be seen that while the user is in a VR session, the user's handheld mobile device is practically unusable and not participative in the VR experience of the user. In such an event, even if a user wishes to access a media content like an image/video or any other application of the handheld mobile device while using the VR headset, he may need to physically access the handheld mobile device. Thus, there is a need for allowing the user to access the handheld mobile device even when the user is immersed in a VR session by using the VR headset, without taking off the VR headset.

SUMMARY

Provided are methods and devices enabled to allow a user to use his external handheld device, e.g., a mobile device, or any other external visual display device inside a VR environment without being away from the VR. Additionally, the handheld device may be controlled using the sensors of the handheld device (for e.g., sensors present on the mobile device) inside the VR, without looking at the screen of the handheld device and also without removing the VR headset. The external handheld device is connected to the VR headset wirelessly. The handheld mobile device may further transmit screen information, i.e., display information, along with position information of an input means on the handheld device, such as touch coordinates received as user-input on the screen of the mobile device, to the VR headset. Upon receiving the screen information and the position information of the handheld device, the screen-view of the handheld device along with the position information of the input means (for example, finger position over the screen of the handheld device) is rendered for display over a currently playing VR content on a display of the VR device, i.e., VR headset.

Provided is a method of operating handheld device on a virtual reality device (VR device). The method comprises of detecting at least an event on a handheld device to initiate operating of the handheld device on a VR device. The method may further comprise of switching an operating mechanism of the handheld device from a first mechanism to a second mechanism. The method may further comprise of transferring screen information of the handheld device and position information of an input means to the VR device for display thereupon. The method may further comprise of receiving at least a touch command on the handheld device by a user without looking at the handheld device, wherein the touch command is received while looking at a display of the VR device displaying information based on the screen information and the position information. The method further comprises of executing an application based on the touch command on the handheld device and to continue providing effect of the executed application to the VR device.

According to an embodiment, the position information of the input means corresponds to a hovering position of the input means.

According to an embodiment, the switching of the operating mechanism of the handheld device from the first mechanism to the second mechanism includes at least one of: converting an input receiving mechanism at the handheld device from a first input receiving mechanism to a second input receiving mechanism, converting a mechanism for interacting with the handheld device from a first interaction mechanism to a second interaction mechanism, and converting a screen displaying mechanism of the handheld device from a first screen display mechanism to a second display mechanism.

According to an embodiment, the second input mechanism includes a hovering air gesture input mechanism.

According to an embodiment, the first interaction mechanism includes receiving first set of interaction command and the second interaction mechanism includes receiving a second set of interaction command, wherein the first set and the second set are not identical sets.

According to an embodiment, the converting the screen displaying mechanism from the first screen display mechanism to the second display mechanism comprises at least one of: initiating wireless transfer of data pertaining to a window to the VR device; initiating wireless transfer of data pertaining to a window to the VR device and ceasing to render data pertaining to the window on a display device associated with the handheld device; initiating wireless transfer of data pertaining to plurality of windows to the VR device; and initiating wireless transfer of data pertaining to plurality of windows to the VR device and ceasing to render data pertaining to the plurality of windows on a display device associated with the handheld device.

According to an embodiment, the data pertaining to the window further includes data pertaining to format of rendering on the VR device.

According to an embodiment, the second display mechanism comprises displaying multiple windows for viewing on the VR device.

According to an embodiment, the executing the application based on the touch command includes modifying user-interface of the application.

According to another embodiment, the executing the application based on the touch command includes executing a process to start at least one further related application.

Provided is a method for operating a handheld device on a virtual reality (VR) device where the method comprises of detecting at least an event on an handheld device to initiate operating of the handheld device on a VR device and transferring primary screen information of the handheld device and position information of an input means to the VR device for display thereupon. The method may further comprise of receiving at least a touch command on handheld device by a user without looking at the handheld device, wherein the touch command is received while looking at a display of the VR device displaying information based on the screen information and the position information, and executing a primary application based on the touch command on the handheld device. The method further comprises of creating secondary screen information and providing the primary screen information and secondary screen information together to the VR device.

According to an embodiment, the converting the screen displaying mechanism from the first screen display mechanism to the second display mechanism comprises changing a rendering format of at least one of the primary screen information and the at least one secondary screen information on the VR device.

According to an embodiment, the primary screen information is distinguished from the secondary screen information based on a tag associated thereto.

Provided is a method for operating handheld device on a virtual reality (VR) device where the method comprises of detecting at least an event on an handheld device to initiate operating of the handheld device on a VR device and transferring screen information data pertaining to plurality of windows of the handheld device to the VR device for simultaneous display thereupon, wherein the screen information data pertains to at least one of the plurality of windows includes data designating the corresponding window as one of primary screen information data or secondary screen information data.

According to an embodiment, the method for operating the handheld device on the virtual reality (VR) device further comprises of transferring to the VR device control command to initiate operating of the handheld device on the VR device.

According to an embodiment, the control command further comprises at least one of: a command to maintain a connection between the handheld device and the VR device, a command defining layout configuration information, a command indicative of a bezel event on the handheld device and a command indicative of a zoom event on the handheld device.

According to an embodiment, the method may further comprise of transferring information pertaining to a type of input event to the VR device for display thereupon. The information pertaining to the type of input event may correspond to at least one of a hovering touch event, a physical touch event, a move event and a click event.

According to an embodiment, the method for operating the handheld device on the virtual reality (VR) device further comprises of capturing screen information data pertaining to an application running in foreground mode on the handheld device. The method may further comprise of capturing screen information data pertaining to at least one application running in background mode on the handheld device, storing the screen information data pertaining to the application running in foreground mode as primary screen information data and storing the screen information data pertaining to the at least one application running in background mode as secondary screen information data.

According to an embodiment, the capturing of the screen information data pertaining to an application running in foreground mode on the handheld device is performed at a first rate.

According to an embodiment, the primary screen information data is stored in a dedicated buffer, According to an embodiment, the capturing of the screen information data pertaining to an application running in background mode on the handheld device is performed at a second rate.

According to an embodiment, the secondary screen information data is stored in a ring buffer.

Provided is a handheld device for operating in conjunction with a virtual reality (VR) device. The handheld device comprises of an event detection module configured to detect at least an event on the handheld device to initiate operation of the handheld device in conjunction with the VR device. The handheld device further comprise of a VR configuration module configured to switch an operating mechanism of the handheld device from a first mechanism to a second mechanism. Further, the handheld device comprises of a VR interface module configured to transfer screen information of the handheld device and position information of an input means to the VR device for display thereupon. Further, the handheld device comprises of a touch-input module configured to receive at least a touch command on handheld device by a user without looking at the handheld device, wherein the touch command is received while looking at a display of the VR device displaying information based on the screen information and the position information. Further, the handheld device comprises of a controller configured to execute an application based on the touch command on the handheld device, and an application user interface extraction module configured to provide effect of the executed application to the VR device.

Provided is a handheld device for operating in conjunction with a virtual reality (VR) device where the handheld device comprises of an event detection module configured to detect at least an event on the handheld device to initiate operation of the handheld device in conjunction with the VR device and a VR interface module configured to transfer primary screen information of the handheld device and position information of an input means to the VR device for display thereupon. Further, the hand-held device further comprises of a touch input module configured to receive at least a touch command on handheld device by a user without looking at the handheld device, wherein the touch command is received while looking at a display of the VR device displaying information based on the screen information and the position information. The handheld device further comprises of a controller configured to execute an application based on the touch command on the handheld device, the controller being further configured to create secondary screen information. The handheld device further comprises of an application user interface extraction module configured to provide the primary screen information and the secondary screen information together to the VR device.

Provided is a handheld device for operating in conjunction with a virtual reality (VR) device where the handheld device comprises of an event detection module configured to detect at least an event on the handheld device to initiate operation of the handheld device in conjunction with the VR device, a VR interface module configured to transfer screen information pertaining to plurality of windows of the handheld device to the VR device for simultaneous display thereupon, and a controller configured to include in the screen information data pertaining at least one of the plurality of windows data designating the corresponding window as one of primary screen information data or secondary screen information data.

Additional aspects will be set forth in part in the description which follows and, in part, will be apparent from the description, or may be learned by practice of the presented embodiments.

The advantages of embodiments of the disclosure include, but are not limited to, that a user using a standalone VR device does not need to take off his VR headset to access his handheld device (for example, the mobile device) to respond to a call or notification received at the mobile device or to operate the mobile device while continuing using VR. Additionally, the user can also have a better experience of operating the mobile device when viewing a screen of the handheld device on a larger display area provided by the VR device. Additionally, the user is able to view multiple windows pertaining to multiple applications running on the handheld device in an enhanced display manner on the VR, which is difficult to be achieved on the handheld device. Thus, according to the embodiments a seamless and immersive VR experience may be provided to the user while not causing the user to take off the VR headset, and the user may operate his handheld device in a more convenient way with an assist of the display properties and larger display area provided by the VR.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
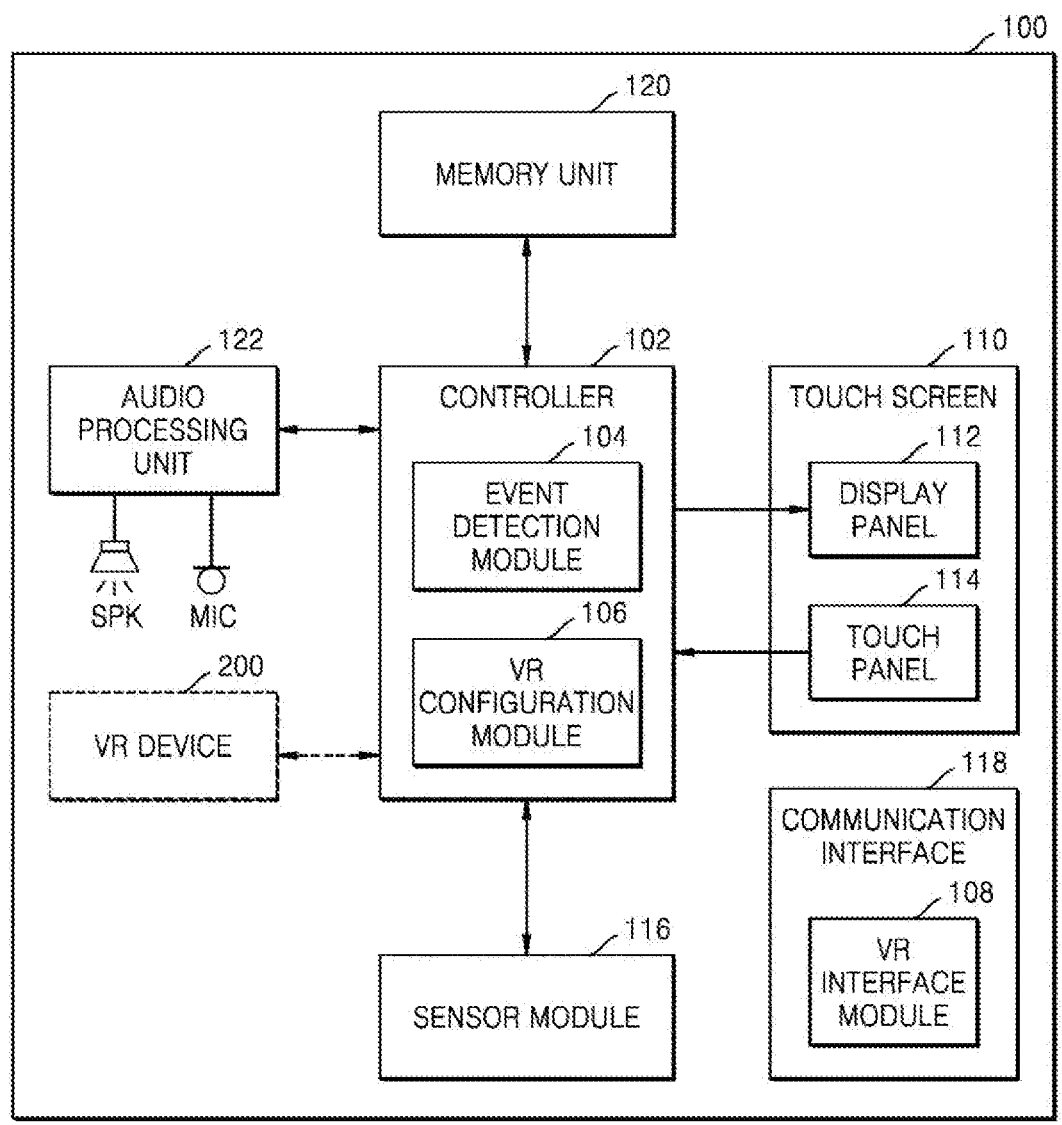
FIG. 1 illustrates a block diagram of a handheld device according to an embodiment.

Provided is an electronic device comprising: a memory storing instructions; and at least one processor configured to execute the instructions to: detect at least one event of another electronic device operating in a first mechanism; in response to the detected at least one event, cause the other electronic device to operate in a second mechanism; receive screen information of the other electronic device; and display a virtual reality screen based on the screen information.

Provided is an electronic device comprising: a memory storing instructions; and at least one processor configured to execute the instructions to: detect at least one event of the electronic device operating in a first mechanism; in response to the detected at least one event, operate in a second mechanism; and transmitting screen information of the electronic device to another electronic device for displaying a virtual reality screen at the other electronic device based on the screen information.

Provided is a method performed at an electronic device, comprising: detecting at least one event of another electronic device operating in a first mechanism; in response to the detected at least one event, causing the other electronic device to operate in a second mechanism; receiving screen information of the other electronic device; and displaying a virtual reality screen based on the screen information.

Provided is a method performed at an electronic device, comprising: detecting at least one event of the electronic device operating in a first mechanism; in response to the detected at least one event, operating in a second mechanism; and transmitting screen information of the electronic device to another electronic device for displaying a virtual reality screen at the other electronic device based on the screen information.

According to an embodiment, the method is performed by a computer program product comprising a computer readable storage medium having a computer readable program stored therein, the computer readable program, when executed on an electronic device, causing the electronic device to carry out the method.

The following description with reference to the accompanying drawings is provided to assist in a comprehensive understanding of various embodiments of the disclosure as defined by the claims and their equivalents. The following description includes various specific details to assist in that understanding but these are to be regarded as merely exemplary. Accordingly, those of ordinary skill in the art will recognize that various changes and modifications of the various embodiments described herein may be made without departing from the scope and spirit of the disclosure as defined in the appended claims. In addition, descriptions of well-known functions and constructions may be omitted for clarity and conciseness.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the embodiments. Furthermore, the one or more elements may have been represented in the drawings by various symbols, and the drawings may show only those specific details that are pertinent to understanding the embodiments of the disclosure so as not to obscure the drawings with details that will be readily apparent to those of ordinary skill in the art having benefit of the description herein.

The terms and words used in the following description and claims are not limited to the bibliographical meanings, but, are merely used by the inventors to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. Additionally, expressions such as "at least one of," when preceding a list of elements, modify the entire list of elements and do not modify the individual elements of the list. For example, the expression "at least one of a, b or c" indicates only a, only b, only c, both a and b, both a and c, both b and c, all of a, b, and c, or variations thereof.

As used herein, the terms "1st" or "first" and "2nd" or "second" may use corresponding components regardless of importance or order and are used to distinguish one component from another without limiting the components.

The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below may be implemented or supported by one or more computer programs, each of which may be formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data may be permanently stored and media where data may be stored and later overwritten, such as a rewritable optical disc or an erasable memory device.

The term "unit", "manager", "engine", or "device" may refer to a unit which processes at least one function or operation and may be implemented by hardware, software, or a combination of hardware and software.

It may not be enough to display a calling notification or any other message notification in order to solve the current problem. The user may need to simultaneously access to more than one particular application of the handheld mobile device. Sometimes, an application running on the handheld mobile device may be linked to other applications running in the background or in the active-sessions on the handheld mobile device, and the other applications may be opened in the foreground display based on a user-selection or upon occurrence of a predefined event on the handheld mobile device. Therefore, a similar visual experience of using the handheld device directly may also be required when the user has to access the handheld mobile device in VR with the VR headset in-use. Thus, there is need for a solution to enhance the operating experience as well as the visual experience of the user when accessing the handheld mobile device in VR.

Overall, there is also a need to enhance display or the screen-view of the handheld device in a display of the VR. The VR display may have better display properties and a larger area of display than the screen size of the handheld device having a limited display area. It may be therefore beneficial to actually use the larger area of the VR display for displaying the screen-view of the handheld device. Although, the existing solutions do provide methods for screen-mirroring of smaller sized display of handheld device (for example, a mobile phone) to a larger sized-display of a secondary electronic device (for example a smart TV), the display configurations provided by the secondary electronic device may not be considered to display the screen of the mobile device. Apart from providing a larger display area, the actual display buffer properties (for example, the aspect ratio) are limited by the orientation or display buffer properties of the handheld mobile device. Also, screen-mirroring does not contribute to enhancing the operating experience of the handheld mobile device within a larger display area. The user may have to continuously look at the screen of the handheld mobile device to give a desired input at a desired location on the screen, or may sometime have to rely on a secondary input device (for example the remote control of the smart television).

In view of the above, it is desired to provide solutions to provide an enhanced viewing experience to a user rather than relying on a limited-sized screen of a handheld mobile device having a small display area. Further, it is also desired to provide solutions for operating a handheld mobile device within a VR environment without removing the VR headset.

According to an embodiment, a virtual reality device (VR device) is provided on which screen information of a handheld device is provided, which enables a user to operate, i.e., view and control, the handheld device in a VR provided by the VR device. The screen information may include visual display information, i.e., screen views of the handheld device. According to an embodiment, the screen information may pertain to either an active screen, i.e. a current screen-view of the handheld device, or may pertain to a background screen of the handheld device, i.e., the screen-view of applications running on a background of the handheld device. Herein, the active screen, i.e., the current screen-view may be running in a foreground of the handheld device. In some further embodiments, the screen information may even pertain to at least one application which is related to an application currently being executed on the handheld device or which has been recently used on the handheld device. According to an embodiment, the screen information may pertain to a single window of the handheld device or may pertain to multiple windows of the handheld device. The single window may be inferred as a window or a screen-view of a primary application running on the handheld device. However, a single window should also be understood as only a current screen-view of a handheld device on which an application may or may not be currently running, i.e. the single window may be a home-screen of a mobile device. Further, multiple windows may be inferred as multiple windows of the handheld device, and each window may be associated with an application currently running on the handheld device, the application may be running either in the foreground or in the backgrounds of the handheld device. However, multiple windows may also be understood as including one window pertaining to a current screen-view of the handheld device and other windows pertaining to other screen-views other than the current screen-view of the handheld device. The other screen-views may include background applications running on the handheld device or user-interfaces pertaining to background processes of the handheld device.

According to an embodiment, the screen information of the handheld device may be provided to the VR device using existing technologies such as Wi-Fi, Bluetooth™, or wired data cable etc. According to an embodiment, position information of an input means of the handheld device may be transferred along with the screen information to the VR device. The input means may be a stylus, or fingers of the user, whose position on the screen of the handheld device may be provided as position information to the VR device. By way of an example for a touch-screen, the touch coordinates of the screen of the handheld device is shared as position information of the input means with the VR device.

According to an embodiment the VR device may be a standalone VR device. However, in some embodiments the VR device may be a Head Mounted type Display Device (HMD) connected to another electronic device enabled to operate in a respective VR mode when connected to the HMD. The VR device may be a wearable device (for e.g., smart glasses) or VR headsets (for e.g., a head-mounted device (HMD)) or a smart appliance, such as a smart television or may include multimodal devices such as wired gloves.

According to an embodiment the handheld device may be an external electronic device which is not physically connected to the VR device. In particular, the handheld device may not be an electronic device which is enabled to provide VR display when connected to the HMD. In a preferred embodiment, the handheld device may be a device having a visual display screen. Accordingly, the handheld device may also be referred to as an 'external visual display device' in the disclosure.

According to an embodiment, the handheld device may include a touch input module to receive a touch command on the handheld device. According to an embodiment, the handheld device may include a touch-enabled visual display screen which may be referred to as 'touch-screen'. The touch enabled visual display screen may sense touch-inputs received as user-input on the handheld device and may accordingly be able to detect touch-coordinates by using a capacitive scheme, a resistive scheme, an infrared scheme and/or an ultrasonic scheme. Accordingly, the 'screen' of the handheld device may also be referred to as 'touch-screen' of the handheld device.

In another preferred embodiment, the touch-screen of the handheld device may be hover-sensitive and may accordingly determine hovering positions of the input means of the handheld device. Accordingly, the hover-sensitive screen of the handheld device may detect hover-coordinates upon the hover-sensitive screen by using proximity detection functions. The touch-screen of the handheld device may be touch-sensitive and hover-sensitive.

In one example, the handheld device according to an embodiment may be a smartphone, a tablet personal computer (PC), a mobile phone, a video phone, an electronic book (e-book) reader, a desktop PC, a laptop PC, a netbook computer, a personal digital assistant (PDA), an electronic dictionary, a portable multi-media player (PMP), a MP3 player, a mobile medical appliance, a camera, a camcorder, and a wearable device (for e.g., a smart watch or an electronic accessory), but is not limited thereto.

According to an embodiment, the handheld device may be enabled to operate on a VR mode which is an operational mode of the handheld device when connected to a VR device which allows the handheld device to be operated in a VR provided by the VR device. As explained later, the VR mode may be triggered on the handheld device in response to detecting an event on the handheld device to initiate operating of the handheld device on the VR device.

FIG. 1 illustrates a block diagram of a handheld device according to an embodiment.

A handheld device 100 may be one of a variety of computing devices such as a mobile phone, a smartphone, a table, a phablet, a handheld computer, and a PDA, but is not limited thereto, according to an embodiment. The handheld device 100 may include a variety of optional hardware and software components. The components illustrated in the FIG. 1 can communicate with each other. The handheld device may include a controller 102 or a processor 102 (e.g., signal processor, microprocessor, application specific integrated circuit (ASIC), or other control processing logic circuitry) for performing tasks including touch detection, finger swipe or gesture detection, hover detection, input-interface mode control, VR mode detection and decision making modules, application UI executor for VR mode, signal processing, data processing, input/output processing, power control, display power control, or other functions. According to an embodiment, the controller 102 may include an event detection module 104 and a VR configuration module 106.

According to an embodiment, the event detection module 104 may be configured to detect on the handheld device 100 an event to initiate operation of the handheld device 100 on a VR device 200. The event detection module 104 may process information related to an event of detection of VR mode on the handheld device 100. The event may be generated while the VR device 200 is in-use for providing a VR to a user of the handheld device 100. Herein the VR device 200 may be a standalone VR device 200 such as wearable VR glasses or may be a HMD type display device on which another electronic device is mounted, and the another electronic device may be physically separate from the handheld device 100.

By way of one example, the VR mode may be triggered on the handheld device 100 in at least two ways. The VR mode may be triggered on the handheld device 100 directly by a user-input on the handheld device 100. The user-input may be a selection of certain user-selectable options within a device settings UI of the handheld device 100 or a selection of a special keys of the handheld device 100. For example, the volume-up button on a mobile device may be used to trigger the VR mode on the handheld device 100. For example, when a user presses the volume-up key for a predetermined duration (e.g., 3 seconds), the VR mode may be triggered on the handheld device 100.

The VR mode may be triggered based on a pre-defined event. The pre-defined event may include at least an incoming notification or a call on the handheld device 100 while the VR device is in-use. For example, when the user is using the VR device 200 to be in a VR and a call or a message notification is received at his handheld device 100, the event of receiving the call or the message notification on the handheld device 100 may be notified to the VR device 200, and the VR device 200 may be configured to detect an event of incoming call or notification of the handheld device of the user. The VR device 200 may be configured to display, in the VR, information regarding the incoming call or notification on the handheld device 100 of the user. According to an embodiment, based on detecting the pre-defined event, the VR device 200 may require a user-input allowing the VR mode to be triggered on the handheld device 100. Herein, the user-input may be received via an input device of the VR device 200 or by pressing any of the input keys of the VR device 200, such as the hard keys available on a VR headset.

The event based triggered VR mode may also be referred to an as 'automatic mode' or an 'automatic method of enabling the VR mode' on the handheld device 100. By way of some further examples, the automatic method of enabling the VR mode may involve setting the device configurations of the handheld device 100 to switch to the VR mode based on detection of pre-defined events on the handheld device. The pre-defined events may include, for example, an incoming call, an incoming message, e-mail or some other events, like motion sensing on the handheld device 100. In another example, the user may press a hard button on the VR headset and then the VR mode may be enabled programmatically on the handheld device 100.

When the VR mode is enabled on the handheld device 100, the handheld device 100 may be paired with the VR device 200 which enables both the devices to communicate with each other. The handheld device 100 and the VR device 200 may be paired with each other before the VR mode is enabled on the handheld device 100. When paired, the handheld device 100 may send and receive data via a VR interface module 108, which may be included in the communication interface 118 on the handheld device 100. The communication interface 118 may receive commands or data input from the VR device 200 or another electronic device (for e.g. a server or another electronic device on which an a VR headset or HMD is mounted). Further, the communication interface 118 may output commands or data received from other components of the handheld device 100 to the VR device 200. The VR interface module 108 in particular may establish communication between the handheld device 100 and VR device 200. The VR interface module 108 may establish communication between the handheld device 100 and the other electronic devices which operates in a VR mode and perform at least some of the function of the VR device 200 to output commands on a display of the VR device 200.

The communication interface 118 may be connected to a network through wireless or wired communication to communicate with the VR device 200.

According to an embodiment, the communication interface 118 may transfer a control command from the handheld device 100 to the VR device 200 so as to initiate the operation of the handheld device 100 in the VR. The control command may include, for example, a command to maintain a connection between the handheld device 100 and the VR device 200. According to an embodiment, the control command may include a command defining layout configuration information of the shared screen information. According to an embodiment, the control command may include a command indicative of a bezel event on the handheld device 100 and/or and a command indicative of a zoom event on the handheld device 100. The various operating mechanism of the handheld device 100 in the VR mode may include detection of some of the events on the handheld device 100 such as detection of bezel event and zoom event. These shall be explained in detail in the foregoing description.

According to an embodiment, the VR interface module 108 may be configured to transfer the screen information of the handheld device 100 and the position information of an input means to the VR device 200 for its display. Based on the screen information and the touch-coordinates shared by the handheld device 100 (transmitted from the handheld device 100), the VR device 200 renders, on a VR currently displayed on a display of the VR device 200, display information of the screen-view of the handheld device 100 and a visual indicator, for e.g., a finger pointer, placed on the shared screen-view of the handheld device 100. As a result, the user may operate the handheld device 100 within the VR using the visibly available screen information of the handheld device 100 without looking at the screen of the handheld device 100. According to an embodiment, the handheld device 100 may receive at least a touch-command from a user while not causing the user to look at the handheld device 100, wherein the touch command is received while the user looking at a display of the VR device displaying information based on the screen information. According to an embodiment, an input-command such as a voice command, gesture command, air-hovering gestures and other form of gestures may also be received on the handheld device 100 from a user, wherein the input-command is received while the user looking at a display of the VR device displaying information based on the screen information.

According to an embodiment, based on detection of an event on the handheld device 100, the VR configuration module 106 may be configured to switch an operating mechanism of the handheld device 100 from a first mechanism to a second mechanism. The first mechanism may be the operating mechanism of the handheld device 100 in a normal mode, and the second input receiving mechanism may be the operating mechanism of the handheld device 100 in a VR mode.

According to an embodiment, the first mechanism and the second mechanism may include a first input receiving mechanism and a second input receiving mechanism, respectively. The first input mechanism and the second input receiving mechanism may be based on different types of input received on the handheld device 100. By way of an example, the touch input module of a handheld device may receive a touch-input on a touch-screen of the handheld device. The touch-screen of the handheld device 100 may be hover-sensitive to receive air hovering gesture, referred to as a hover-input, on the touch-hover enabled screen of the handheld device 100. According to an embodiment, the first input mechanism includes a touch-input receiving mechanism, and the second input mechanism includes a hovering air gesture input receiving mechanism. The first input receiving mechanism may be an input receiving mechanism of the handheld device 100 in a normal mode, and the second input receiving mechanism may be the input receiving mechanism of the handheld device 100 in a VR mode. Thus, when the VR mode is not enabled on the handheld device 100, that is, when the handheld device 100 is in the normal mode, if the first input receiving mechanism is a touch-type detection on the handheld device 100, the second input receiving mechanism may be a hover-type detection on the handheld device 100, and the second input receiving mechanism of the handheld device 100 is activated when the VR mode is enabled on the handheld device 100.

According to an embodiment, the first input receiving mechanism and the second input receiving mechanism may be based on the same type of inputs with different functionalities. For example, the same touch gesture may function differently in the first input receiving mechanism and the second input receiving mechanism, and the following table 1 lists a few examples thereof. where the input receiving mechanism, that includes touch-type input, changes functional behaviour when VR mode is enabled on the handheld device 100.

TABLE 1

| Type of touch-input received on the handheld device 100 | In Normal Mode | In VR mode |
| --- | --- | --- |
| TAP | To bring the object view in focus | To execute the operation as a click-event |
| TAP & HOLD | To hold a view (used for moving the object in a display area of the device 100) | To hold a view either in a display area of the VR device 200 or outside of a designated display area of the VR device 200. |
| DOUBLE TAP | To select a particular object | To enable/disable VR mode |
| FLICK, SWIPE | In normal mode, this touch-type input may be specific to an application of the handheld device 100, e.g., deleting an option from the screen of the device 100, transferring the content to same screen different | To switch between applications (for e.g., primary screen and secondary screens, explained later in the disclosure) |

TABLE 1-continued

| Type of touch-input received on the handheld device 100 | In Normal Mode | In VR mode |
|---|---|---|
| | space or another screen (for e.g. next appearing screen of the device 100, etc. | |
| 2-FINGER | May or may not be used depending upon the handheld device's 100 functionality or application specific command on the device 100. | To enable/disable moving an object outside a designated area in the VR. |
| SLIDE, DRAG | To move an object on the screen of the handheld device 100 | To either move an object or to bring the display screen of the handheld device 100 out of a designated area in the VR (may be based on the 2-FINGER input-event). |
| STRETCH | To zoom-in a view of an object | |
| PINCH | To zoom-out of a view of an object | |
| GESTURE AREA | May or may not be used depending upon the handheld device's 100 functionality or application specific command on the device 100. | May be defined as a certain functionality in the VR mode based on VR configuration. |

The above defined examples should not be construed as restrictive to the disclosure and are only illustrated for sake of understanding of the change in behaviour of the input receiving mechanism of the handheld device 100 while using the same type of touch-inputs received on the handheld device 100 in the VR mode.

According to an embodiment, the first mechanism and the second mechanism may be based on a first interaction mechanism and a second interaction mechanism, respectively, the first interaction mechanism and the second interaction mechanism may be based on a type of interaction with the handheld device 100, and the type of interaction may include, for example, a touch-enabled interaction mechanism, a hover-detection interaction mechanism, bezel-touch detection interaction mechanism, gesture detection interaction mechanism, motion sensing interaction mechanism etc. The first interaction mechanism may be an interaction mechanism of the handheld device 100 in the normal mode, and the second interaction mechanism may be the interaction mechanism of the handheld device 100 in the VR mode.

According to an embodiment, the first interaction mechanism may include receiving first set of interaction commands, and the second interaction mechanism may include receiving a second set of interaction commands. The first set and the second set may not be identical to each other. The first interaction mechanism in a mobile device may be based on a touch-typed input as received on the touch-screen of the handheld device 100. According to an embodiment, when the VR mode is enabled or triggered on the handheld device 100, a second interaction mechanism is activated on the handheld device 100. The second interaction mechanism may include for example, air-hover mechanism (for e.g., using proximity sensors 128 of the handheld device 100), a bezel-touch mechanism (for e.g., using bezel-touch sensors 126 of the handheld device 100), a finger swipe mechanism (for e.g. using gesture sensors 130 or the touch detector of the touch panel 114 of the handheld device 100) or a motion or a move event (for e.g., using gyroscope sensors 121 of the handheld device 100). In one example, when VR mode is enabled on the handheld device 100, the touch-screen may start recognizing air-hover gestures on the touch-screen to process a user-input on the handheld device 100, even when the air-hover gesture is not enabled during the normal mode on the handheld device 100. Such change in interaction mechanism when VR mode is enabled on the VR device 100, allows a user to enter user-input on the handheld device 100 without looking at the screen of the handheld device 100. Thus, the user may continue viewing the display of the VR device while operating the handheld device 100 within the VR.

Figure 2:
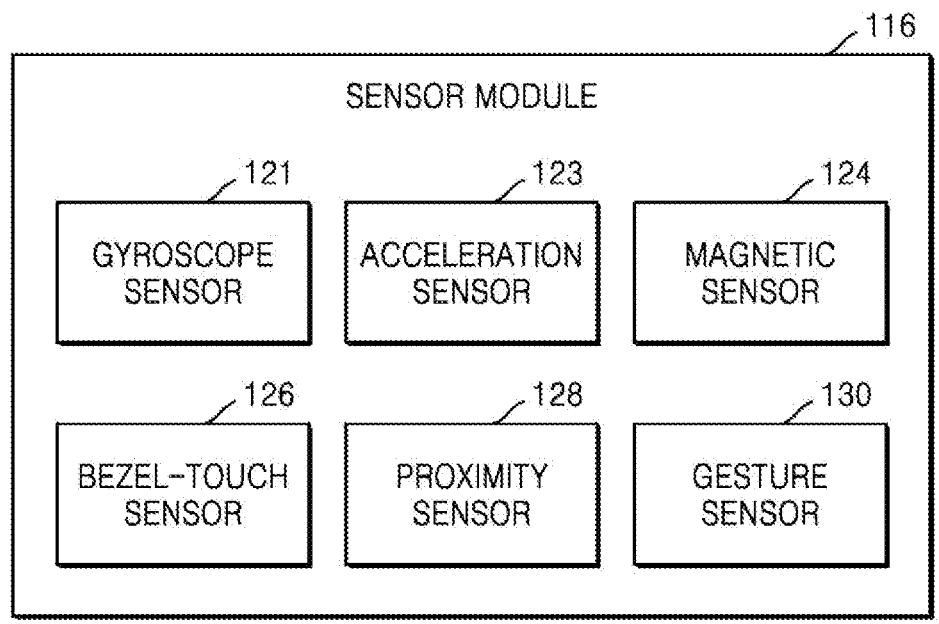
FIG. 2 illustrates a block diagram of sensor modules of the handheld device according to an embodiment.

FIG. 2 illustrates a block diagram of sensor modules of the handheld device according to an embodiment.

According to an embodiment, a variety of input events may be generated on the handheld device 100 in the VR mode, for example, a hover input, a click input, a motion input, a bezel touch or bezel swipe input, a finger swipe input etc. Such interactions commands to the handheld device 100 may be detected in assistance of various sensors of the handheld device 100 which may be included in the sensor module 116 as briefly discussed with reference to FIG. 2. Further, the input events may include a hovering-touch event, also referred to as hover event; a physical touch event, a move event or a click event. According to an embodiment, information on the type of input event may be transferred to the VR device 200, for example, via the VR interface module 108 as shown in FIG. 1.

According to an embodiment, the first mechanism and the second mechanism may be based on a first screen displaying mechanism and a second screen display mechanism, respectively. The first screen display mechanism and the second screen display mechanism may be based on a type of displaying of the screen-view of the handheld device 100. According to one implementation, during the VR mode on the handheld device 100, the handheld device 100 may ceases to display a screen-view of the handheld device 100, that is, the second screen display mechanism. Thus, the screen of the handheld device 100 may appear as a black screen in the VR. However, in another implementation, during the VR mode on the handheld device 100, the handheld device 100 may not turn-off the display of the screen of the handheld device 100 but only reduce the brightness of a display of the handheld device 100 to save power. of the handheld device 100.

By way of one example, the first screen displaying mechanism may include displaying the screen in an ON-state The second screen displaying mechanism may include turning OFF the display of the screen of the handheld device 100, and the second display mechanism may be associated with a lower power level than the power level associated with the first display mechanism. Such change in screen display mechanism may enhance privacy of a user while the user viewing the screen information of his handheld device 100 in the VR provided by the VR device 200.

When the screen displaying mechanism of the handheld device 100 switches to the second screen displaying mechanism in the VR enabled mode, the second interaction mechanism may be used to allow the user to interact with his handheld device 100 without looking at the screen of the handheld device 100.

According to an embodiment, the second display mechanism may include displaying multiple windows of the handheld device 100 in the VR provided by the VR device 200. The processing of the screen information pertaining to each window shall be described in detail later in the specification.

According to an embodiment, the converting the screen displaying mechanism from the first screen display mechanism to the second display mechanism may include changing a rendering format of at least one of primary screen information and secondary screen information in the VR.

According to an embodiment, the switching the operating mechanism of the handheld device from the first mechanism to the second mechanism may include at least one of: (a) converting an input receiving mechanism at the handheld device from a first input receiving mechanism to a second input receiving mechanism; (b) converting a mechanism for interacting with the handheld device from a first interaction mechanism to a second interaction mechanism; and (c) converting a screen displaying mechanism of the handheld device from a first screen display mechanism to a second display mechanism.

Referring to FIG. 1, the hand-held device 100 may include at least one display means which may be implemented in form of a touch screen 110. The touch screen 110 may include a display panel 112 and/or a touch panel 114. However, in some embodiments, it may be possible that the display panel 112 and the touch panel 114 are separate rather than a single touch screen. The touch panel 114 may include a touch input module of the handheld device to receive the user's touch input on the touch panel 114 or a hovering input near the touch panel 114. In some embodiment, the touch panel 114 may include a capacitive interface to sense both touch and hover gesture. A touch detector may be used to detect touch-coordinates of an input means (for example, finger of a user of the handheld device 100) touching the touch screen 110. The handheld device 100 may further include proximity sensors 128, by referring to FIG. 2. The proximity sensors 128 may be used to detect touch-coordinates of an input means close to but not touching the touch screen 100. The proximity sensors 128 may be used to identify a location (x, y, z) of the input means in the three-dimensional hover space defined for the handheld device 100, where x and y axes are orthogonal to each other and parallel to the surface of the touch screen 110. The proximity sensors 128 may be used to detect other attributes of the input means with respect to the hover space. The touch detector in the touch panel 114 and the proximity sensors 128 may be a single apparatus detecting both touch and hover inputs. The single apparatus may use sensing technologies but not limited to capacitive, electric field, inductive, Hall effect, optical visual light, optical infrared (IR), optical color recognition, ultrasonic, conductive and resistive technologies. Gesture sensors 130 may be used to detect various gestures in relation to an inputs via the input means of the handheld device 100, where the gesture detected may use, finger or hand gestures, air hover gestures, voice gesture etc.

The sensor module 116 may include motion sensors for example, gyroscope sensor 121, acceleration sensor 123 and magnetic sensors 124 to sense motion of the handheld device in two dimensions or three dimensions. Based on a reference value assigned to a particular motion, the motion may be interpreted as one of user's interactions with the handheld device 100. A specific output is carried out by motion detection functions. The motion sensors may sense the movement of the main body of the handheld device 100. The handheld device 100 may rotate or tilt in various directions. The motion sensors such as gyroscope sensor 121 and acceleration sensor 123 may sense motion characteristics such as rotating direction, angle, inclination, and so on, by using at least one of various sensors such as geomagnetic sensor, gyroscope sensor 121, acceleration sensor 123, and so on. According to an embodiment, based on a tapping motion or a shaking motion, an event to initiate an operation of the handheld device 100 in the VR mode may be generated. In another case, a motion of the handheld device 100 may be used for a part of interaction commands in the second interaction mechanism on the handheld device 100. Thus, the motion and orientation of the handheld device 100 may be measured and used to perform a function on the handheld device 100. For example, the measured data from these sensors may be used to infer complex user gestures and motions, such as tilt, shake, rotation, or swing. Further, position sensors such as magnetic sensors 124 or magnetometers may be used to detect the position of the handheld device along with orientation sensors (gyroscope sensor 121) in the three-dimensional space.

The sensor module 116 may include bezel-touch sensors 126 located on a bezel of the handheld device 100 where one or more tapping on the bezel may be sensed by the bezel touch-sensors 126 and may be used for an interaction mechanism with the handheld device 100. The tapping of the bezel may be physically touching the bezel area or hovering over the bezel.

The handheld device 100 may include a memory unit or storage module 120 which may store information regarding various event processing functions in the VR mode on the handheld device 100. The memory unit or storage module 120 may store information regarding various input detection functions mapped to one or more output functions, and the input detection functions may vary in the first interaction mechanism and the second interaction mechanism.

The handheld device 100 may receive a user-input based on touching or hovering over the touch screen 110 or. As described earlier, an input mean may include finger(s) of the user of the handheld device 100, or stylus with capacitive tip.

The handheld device 100 may include an audio processing unit 122 which may also provide input/output function to/from the handheld device 100. The touch screen 110 of the handheld device 100 may display a natural user interface (NUI) allowing a user to interact with the handheld device 100 in a natural manner, and the NUI may rely on speech recognition from the audio processing unit 122 using voice and speech processing techniques.

According to an embodiment, based on enabling or triggering the VR mode on the handheld device 100, the screen information of the handheld device 100 may be transferred to the VR device 200 for its display. According to an embodiment, the position information of the input means (e.g., the touch coordinates. or hover-coordinates) of the handheld device 100 may transferred to the VR device 200 along with the screen information. The screen information may include information contained in a display buffer of the handheld device 100. By way of an example, the display buffer of the handheld device 100 may include display information of the current screen-view of the handheld device. The current screen-view may regard to a foreground application currently running and being opened on the screen of the handheld device 100. According to an embodiment, screen information pertaining to background applications running on the handheld device 100 may be transferred from the display buffer of the handheld device 100 to the VR device 200 for its display. According to an embodiment, the screen information of applications related to the application currently running and being opened on the handheld device 100 may be transferred to the VR device 200 for their display.

According to an embodiment, the screen information shared by the handheld device 100 with the VR device 200 may include data pertaining to format of rendering the screen information on the VR device.

According to an embodiment, the screen information which is shared with the VR device 200 by the handheld device 100 may include information on an orientation for the shared screen information.

According to an embodiment, the screen information displayed on a display of the VR device 200, that is, displayed in the VR, may be independent of the display configurations of the handheld device 100. According to an embodiment, a display area of the touch screen 100 of the handheld device may not be mapped to a display area of the VR device 200. The display area of the VR device 200 may have display properties as per display configuration of the VR device 200. Accordingly, the screen information displayed on the display of the VR device 200 may be according to the display configurations of the VR device 200.

As described earlier, the position information of the input means may include information regarding touch-coordinates or hover-coordinates of a user's finger (or a stylus) on or over the touch-screen (for e.g., the touch screen 110) of the handheld device 100. The hover point may be associated with the input means' point of contact in the three dimensional hover space of the handheld device 100.

Figure 3:
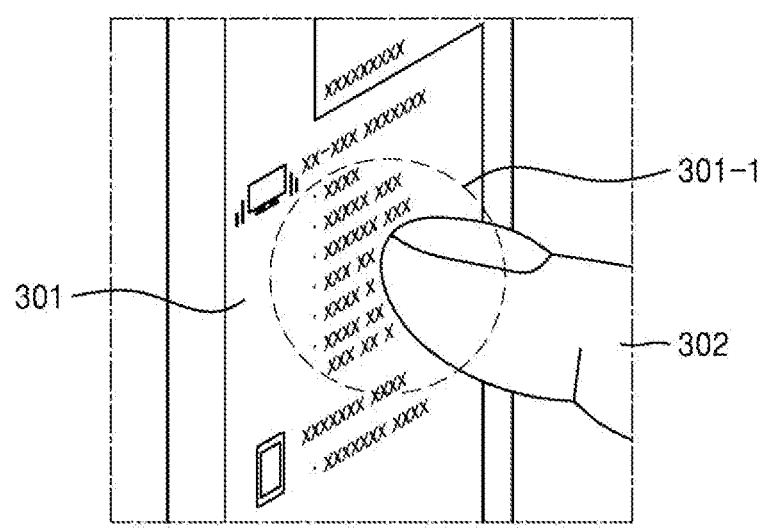
FIG. 3 illustrates an air-hovering gesture performed with respect to a handheld device.

FIG. 3 illustrates an air-hovering gesture performed with respect to a handheld device.

FIG. 3 illustrates a representation of the input means 302 (i.e., user's finger) establishing a point of contact or hover point (301-1) with respect to the touch screen 301 (e.g., the touch screen 110) of the handheld device 100 without physically touching the touch screen 301. The touch screen 301 may be both hover-sensitive and touch-sensitive. In accordance with the above described embodiments, the first interaction mechanism of the handheld device may convert to the second interaction mechanism when VR mode is enabled on the handheld device 100. In one example, the first interaction mechanism may be based on a touch command on a touch-enabled display screen of the handheld device 100, and the same touch command may be interpreted differently in the second interaction mechanism.

According to an embodiment, a change in relative position in the touch coordinates, or change in relative position in the hover coordinates with respect to the handheld device 100 may be transmitted to the VR device 200.

As described earlier, the position information may be displayed as a visual indicator such as a cursor, a finger pointer, a shadow or any other form of visual indicator to indicate the position of touch or hover on the screen (e.g., the touch screen 110) of the handheld device 100. According to an embodiment, the position information may correspond to a location over the screen information of the handheld device 100 in the VR, and the location may be the same as the actual location of the point of contact of the input means on the screen of the handheld device 100. Based on a change in the point of contact of the input means on the screen, or the change in hovering point with respect to the screen of the handheld device 100, the location of the position information displayed in the VR may change in the actual position information of the input means. Thus, the visual indicator may appear as a mirror image of the input means position on the display screen of the handheld device 100. By way of examples, the user of the handheld device 100, who is also using the VR device 200, may navigate the displayed screen of his handheld device 100 on the display of the VR device, by using the visual indicator of the point of contact of the input means on the display screen of the handheld device 100.

According to an embodiment, the visual indicator, i.e., the position information of the input means displayed in the VR, may appear on the displayed screen on the VR device 200 at a location which is mapped to the position of the touch coordinates of the input means on the screen of the handheld device 100 or the hover position of the input means over the screen of the handheld device 100. However, the mapped position may not be identical to display coordinates as per the display configuration of the screen of the handheld device 100. Even when the mapped position resembles the actual location of point of contact, or hover contact, the mapped position may vary based on the display configuration of the VR device 200.

According to an embodiment, multiple touch coordinates may be transmitted to the VR device 200, and each touch coordinate may be associated with a touch identification code, i.e. touch ID, to differentiate amongst the touch coordinates.

According to an embodiment, the touch coordinates may be detected when the input means is actually a making a point of contact on the touch screen or hovering over the touch screen of the handheld device 100. Further, the detected touch coordinates may be transmitted to the VR device 200 to display the position information of the input means. However, in case of no detection, for example, when the input means is not currently making a point of contact on the touch screen (in case of no touch detection), or is either far from the screen (in case of no hover detection), then the information regarding the touch coordinates may not be transmitted to the VR device. By way of one example, when a finger (i.e., the input means) is moved away from screen area, MARK_AWAY message may be sent to VR device 200. The VR may have complete touch information wherever and whenever the user touches the touch screen or makes a hovering gesture over the touch screen of the handheld device 100. Thus, based on the availability of information regarding the touch coordinates, or hover coordinates, the visual indicator may appear or disappear from the display of the VR device 200. For example, the visual indicator may not be displayed when the input means is not making a point of contact with the screen of the handheld device or is not hovering over the screen of the handheld device 100.

In accordance with a preferred embodiment, the handheld device 100 may be operated in the VR mode which is enabled by manually or automatically. Once the VR mode is enabled on the handheld device 100, the operating mechanism of the handheld device 100 may be switched from a first mechanism to a second mechanism, and the display buffer related to the screen of the handheld device 100 may be transmitted to the VR device 200 along with the position information of the input means, via the VR interface module 108.

In accordance with some preferred embodiment, converting the screen displaying mechanism from the first screen display mechanism to the second screen display mechanism may include initiating wireless transfer of data pertaining to a window, to the VR device 200. 'Window' herein may refer to a currently opened screen-view on the handheld device 100, and the currently opened screen-view may belong to a user-interface of an application of the handheld device 100.

An application whose user-interface is currently displayed in the current screen-view of the handheld device 100 may be referred to as a 'primary application'. Further, an application whose user-interface is not currently displayed in the current screen-view of the handheld device 100 may be referred to as a secondary application. The secondary application may exist or be running in a background of the handheld device 100. The secondary application is not limited to background applications of the handheld device 100, and may include an application related to the primary application, and an execution process of the related application may be initiated while the primary application is being executed on the handheld device 100.

According to an embodiment, the data pertaining to the window includes data pertaining to rendering format of the window on the VR device 200. The data pertaining to rendering format may be based on the type of application being rendered. The type of application may include, for example, a primary application running in the foreground state on the handheld device 100, a secondary application running either an active background session or a non-active background session on the handheld device 100. The data pertaining to rendering format may be based on the number of applications that are to be rendered on the display of the VR device 200. The data pertaining to rendering format may be based on the size of the display buffer at the handheld device 100. Further, the data pertaining to rendering format may be based on the type or preferences of user-interface (UI) pattern chosen by a user for displaying the windows of the handheld device 100 on the display of the VR device 200.

In accordance with some preferred embodiment, the converting the screen displaying mechanism from the first screen display mechanism to the second screen display mechanism may include initiating wireless transfer of data pertaining to a window, to the VR device 200, and ceasing to render data pertaining to the window on the display screen of the handheld device 100. Thus, once the VR mode is triggered on the handheld device 100, the window of the application being executed or running on the handheld device 100 may not be rendered and may be rendered in the VR device 200.

In accordance with a preferred embodiment, the converting the screen displaying mechanism from the first screen display mechanism to the second screen display mechanism may include initiating wireless transfer of data pertaining to plurality of windows to the VR device 200. The plurality of windows may refer to at least one primary application running in the foreground on the handheld device 100 and at least one secondary application running in a background state on the handheld device 100. According to an embodiment, the primary application and the secondary application may be switched in-between based on user-selections received via the input means on the handheld device. According to an embodiment, second display mechanism may include displaying the plurality of windows in the VR provided by the VR device 200.

In accordance with a preferred embodiment, the converting the screen displaying mechanism from the first screen display mechanism to the second screen display mechanism may include initiating wireless transfer of data pertaining to plurality of windows to the VR device 200, and ceasing to render data pertaining to the plurality of windows on the display screen of the handheld device 100.

Based on switching of the operating mechanism from a first operating mechanism to a second operating mechanism in response to enablement of the VR mode on the handheld device 100, a touch input module (for example the touch panel 114) may be configured to receive a touch command and other forms of input commands which is a part of the set of a second interaction mechanism. The other forms of input commands apart from the touch commands may include a hover gesture, or a bezel-touch or a finger-swipe gesture. The touch command, or the other form of input command, may be received while the user looking at a display of the VR device 200 without looking at a display of the handheld device 100. As explained above, a touch detector or a proximity sensor 128 of the handheld device 100 may be used to detect the touch coordinates of the input means, (finger of the user or a stylus with a capacitive tip).

According to an embodiment, the touch command as received on the handheld device 100 may result in execution of some functionality of an application on the handheld device 100. Further, according to an embodiment, the display effect of the executed application may be continued to be provided to the VR device 200 to be displayed thereon.

According to an embodiment, the executing the application based on the touch command received on the handheld device 100 may include modifying user interface of the application. In this regard, the controller 102 may be configured to provide display effect of the modified user-interface of the executed application to the VR device 200.

According to an embodiment, the executing the application based on the touch command received on the handheld device may result in execution of at least one related application. In accordance with the described embodiments, screen information of the at least one related application may be transmitted to the VR device 200 for its display.

The foregoing description shall explain in further detail about how the screen information of one or more applications executing on the handheld device 100 or the data pertaining to one or more windows opened on the handheld device 100 is transmitted to the VR device 200 for their display.

Figure 4:
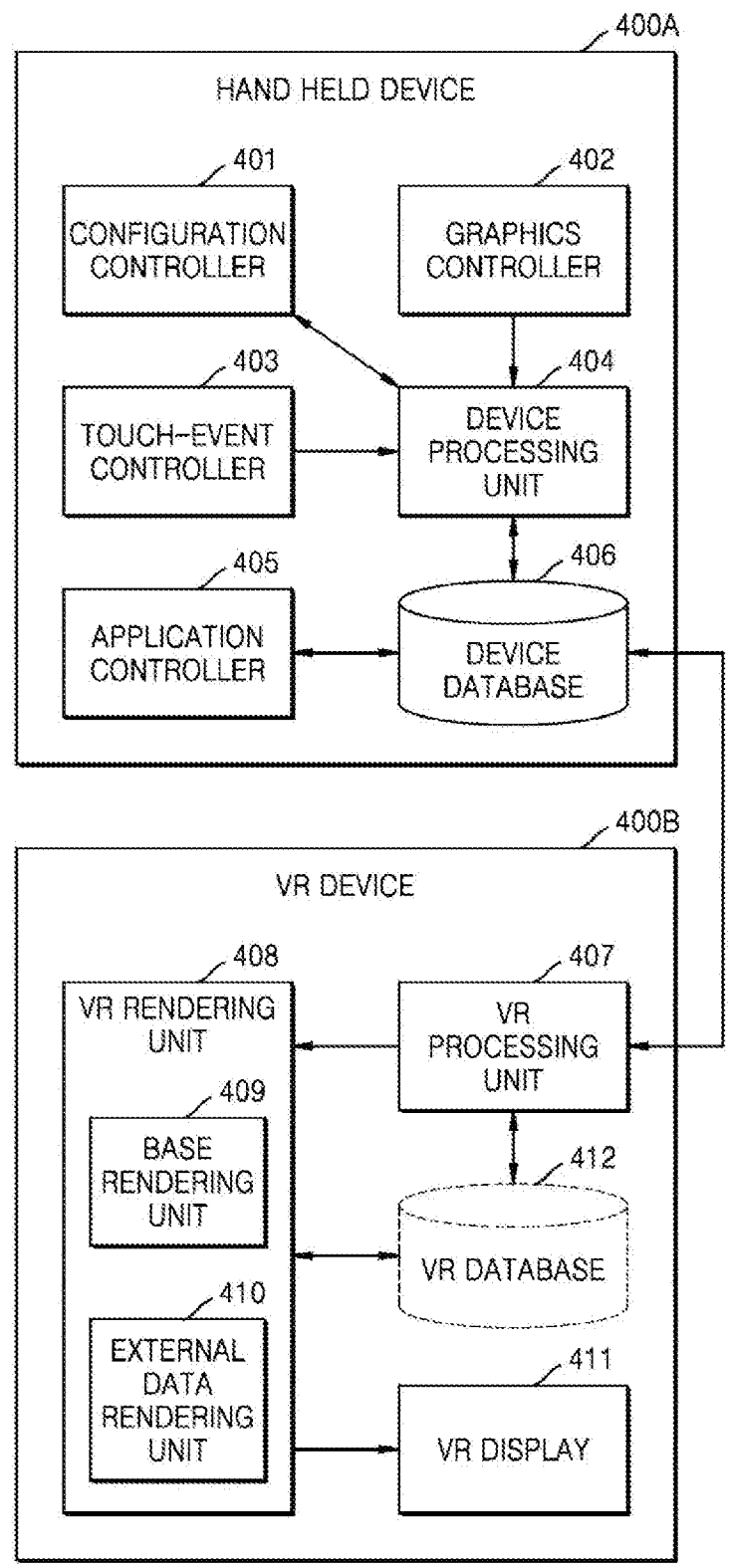
FIG. 4 illustrates block diagrams of a handheld device and a VR device, according to an embodiment.

FIG. 4 illustrates block diagrams of a handheld device and a VR device, according to an embodiment. FIG. 4 illustrates components of a handheld device 400A working in conjunction with components of the VR device 400B in order to display the screen information and the position information of the input means of the handheld device on a display of the VR device 400B, that is, in the VR provided by the VR device 400B. According to an embodiment, the handheld device 400A includes at least a display unit (for example, the display panel 112 shown in FIG. 1). Further, the display unit may include at least a touch screen 110 as shown in FIG. 1, where the touch screen 110 may be both touch sensitive and hover sensitive. Hereafter, the screen of the handheld device 400A shall be referred to as the 'touch screen' having both the display panel and the touch input module of the handheld device 400A. Further, it should be understood that the touch screen of the handheld device 400A is both touch sensitive and hover sensitive and is accordingly configured to detect both touch-inputs and hover inputs on the handheld device 400A. Thus, the position information of the input means of the handheld device 400A may include touch coordinates when a touch command is received as an input command on the handheld device and may further include hover coordinates when a hover command is received as an input command on the handheld device 400A. It should also be understood that an input command received on the handheld device 400A may include both touch commands and hover commands. In accordance with a preferred embodiment, as the second operating mechanism is activated on the handheld device 400A in the VR mode, three input command may be received as a hover input on the touch screen of the handheld device 400A.

As illustrated in FIG. 4, the handheld device 400A includes a configuration controller 401, a graphics controller 402, a touch-event controller 403, a device processing unit 404, an application controller 405 and a device database 406. The configuration controller 401, the graphics controller 402, the touch-event controller 403, the device processing unit 404, and the application controller 405 may form a part of the controller 102 of the handheld device 100 of FIG. 1. The device database 406 may be stored in the memory unit 120 of FIG. 1.

The configuration controller 401 may detect the current device configuration of the handheld device 400A and detect whether the handheld device 400A is in a VR mode or a non-VR mode. As explained before the VR mode may enabled by the above described two ways, i.e., either in a manual mode or an event-based mode, i.e., an automatic mode. The user may press a hard key button to enable the VR mode, or the VR mode may be enabled programmatically based on either the device settings of the handheld device 400A, or based on a user-input provided on the VR device 400B, following an event detection to activate the VR mode on the handheld device 400A. The configuration controller 401 may be configured to trigger the VR mode on the handheld device 400A either by the manual method or the automatic method. Once in the VR mode, the handheld device 400A may be operated in the VR and may share its screen information and touch coordinates of the input means on its screen, with the VR device 400B.

The graphics controller 402 may provide graphical data from a display buffer of the handheld device 400A. The graphics controller 402 may capture the graphical data corresponding to the screen-view of the handheld device 400A. 'Display buffer' may also be referred to as a 'frame buffer' of the handheld device 400A. By way of an example, a handheld device 400A having system configurations developed for an Android platform, may include frame buffers fb0, fb1, etc. which store the graphical data within the respective frame buffers. For each original manufacturer device (OEM) the complete details of the display buffer may be captured by the graphics controller 402. In some embodiments, instead of complete screen information, partial or specific screen information pertaining to the specific portion of the screen-view may be captured.

In an additional embodiment, the graphical data for one or more applications being executed on the handheld device 400A is stored in the device database 406. Thus, screen information pertaining to the one or more applications may be found from the device database 406. The device database 406 includes the graphical data regarding the currently running application on the handheld device 400A and the background applications of the handheld device 400A. Accordingly, the graphical data of currently running application as well as the background applications of the handheld device 400A may be transmitted to the VR device 400B for their display. The graphical data may be one of the contributing factors to displaying multiple applications or windows of multiple applications on the VR device 400B giving the user an experience of running multiple applications in the VR. In some embodiments, the number of applications simultaneously viewed in the VR may be limited by the size of the display buffer of the handheld device 400A. In some embodiments, depending upon the configurations of the display buffer of the handheld device 400A, only limited screen information pertaining to the background applications running on the handheld device 400A may be transmitted to the VR device 400B. For example, only a change in the screen information of the background applications may be transmitted to the VR device 400B to update the displayed screen information of the background applications in the VR on the VR device 400B, which does not affect the user experience of running multiple applications of the handheld device 400A in the VR provided by the VR device 400B.

The touch-event controller 403 may include the touch-detector of FIG. 1 which enables the touch-event controller 403 to detect a touch event when the input means make a contact with the touch screen of the handheld device 400A in order to provide a touch-command. Further, in some preferred embodiments, the touch-event controller 403 may include the proximity sensors 128 of FIG. 2 to detect a hover event when the input means hovers over the touch screen of the handheld device 400A in order to provide hover-input or hover-command. In yet some further embodiments, the touch-event controller 403 may include various other sensors in order to detect event by gestures (for e.g., bezel touch, finger swipe) on the touch screen of the handheld device 400A. According to an embodiment, the touch-event controller 403 may detect touch events generated on the touch screen of the handheld device 400A when the VR mode is enabled on the handheld device 400A.

According to an embodiment, the touch-event controller 403 captures the touch coordinates as well as the hover coordinates in the three dimensional hover space. The touch screen of the handheld device 400A may be both touch-sensitive and hover sensitive. By way of an example, every time when the user of the handheld device 400A touches the touch screen or moves the finger hovering over the touch screen, the touch-event controller 403 may capture the touch coordinates (or hover coordinates), of the touch screen of the handheld device 400A.

In accordance with a preferred embodiment, the touch-event controller 403 may control the touch events generated on the touch screen of the handheld device 400A. By way of some example, events controlled by the touch-event controller 403 are described below.

(a) The touch-sensitivity may work differently in the VR mode enabled on the handheld device 400A, i.e., when the second interaction mechanism is activated in the VR mode on the handheld device 400A. For example, the touch-event may be generated on the handheld device 400A based on detection of the hover-gesture in the VR mode.

(b) Based on detection of the touch-coordinates, position information of the input means may be displayed in the form of a visual indicator on the VR device 400B along with the screen information.

(c) Whenever, the input means is moved away from the display screen of the handheld device 400A, the visual indicator disappears from the display of the VR device 400B.

(d) The movement of the input means on the touch screen of the handheld device 400A, for example the finger movements on the touch screen of the handheld device 400A, are captured by the touch-event controller 403. Accordingly, the visual indicator displayed on the display of the VR device 400B moves according to the captured finger movements on the touch screen of the handheld device 400A.

(e) Since, the input receiving mechanism of the handheld device 400A, is switched from a first input receiving mechanism of a non-VR mode to the second input receiving mechanism of a VR mode, some of the touch-inputs received on the touch screen of the handheld device 400A results in performance of specific actions in relation to the rendering of the applications on the display of the VR device 400B. In one example, a click-event by pressing a finger on the touch screen of the handheld device may cause an action in relation to execution of an application on the handheld device 400A. In another example, a long touch event by long pressing the finger on the touch screen of the handheld device 400A may cause switching between different applications in the VR. Herein the switching of the applications refers to switching between a primary application and one of the secondary applications displayed in the VR such that the switched secondary application becomes the primary application and the previous primary application becomes one of the secondary applications in the VR.

(f) The touch event controller 403 may also capture multiple touch events on the touch screen of the handheld device 400A where each touch-event may be transmitted to the VR device 400B, along a specific touch ID.

According to an embodiment, the touch-event controller 403 may captures different types of input events generated on the handheld device 400A. Such input events which may be captured by the touch-event controller 403 may include a touch event including a click event, a finger swipe event, a hovering touch event, etc. Such input events may be transferred to the VR device 400B, for example, via the VR interface module 108 of FIG. 1.

The application controller 405 may cause one or more actions for controlling execution of the applications running on the handheld device 400A. The one or more actions may include launching an application based on receiving a user-input to launch the application or based on one or more events detected on the handheld device 400A. By way of an example, when a handheld device 400A running on an 'Android' platform, an application may be launched by the application controller 405 by invoking a 'package name' which is an identifier of the application. The application controller 405 may also provide information regarding a type of the application or a file media type of the application running in the handheld device 400A. For example, the application controller 405 may provide the media file type, such as "video/mp4", when a video file is running through an application on the handheld device 400A. According to an embodiment, the application controller 405 provides the information pertaining to the type of application to the VR device 400B. The VR device 400B may utilize the information to determine a required display area for the application, for example, larger display area may be used to display a video type application than other applications' display area. Similarly, the application controller 405 may provide the incoming notifications pertaining to any of the applications running on the handheld device 400A, to the VR device 400B for their display.

According to an embodiment, the application controller 405 may include an application user interface (UI) extraction module referred to as a UI extractor which is configured to provide display effect of the executed application to the VR device 400B. When a touch-command is received on the touch screen of the handheld device 400A in the VR mode, a UI of an application running on the handheld device 400A and being viewed as the shared screen information in the VR, may be different. Thus, according to an embodiment, the UI extractor provides to the VR device 400B the display effect of the executed application which regards to a modified UI of the application.

According to an embodiment, the application user interface (UI) extraction module provides the display effect of both the primary application and the secondary application running on the handheld device 400A to the VR device 400B for their display. Thus, screen information of the primary screen and screen information of the secondary screen, referred to as the primary screen information and the secondary screen information respectively, may be shared with the VR device 400B to be displayed.

The device database 406 may store the current graphical data buffered in the display buffer of the handheld device 400A. The device database 406 may maintains a record of the application details pertaining to the buffered current graphical data. Further, the application details stored in the device database 406 may be mapped to the respective buffered graphical data. The graphical data stored in the device database 406 may be used for an entire session in the VR mode, which enables sharing of the screen information of the handheld device 400A for the entire session with the VR device 400B. Further, the device database 406 may store data regarding history of applications which have been run on the handheld device 400A along with their corresponding buffered graphical data. The application details may include the respective "package name" which may be provided by the application controller 405 to the device database 406.

Whenever the application controller 405 launches an application, the application controller 405 may use the application identifier, i.e., the "package name", to call the application along with the stored graphical data of that application from the device database 406. For example, when a touch event in relation to switching between the primary application and one of the secondary applications is received on the handheld device 400A, the previous graphical data of the switched application buffered and stored in the device database 406 may be utilized to re-display an application.

The device processing unit 404 may be configured to enable transmitting of the graphical data available in the display buffer of the handheld device 400A along with the touch-coordinates (or hover coordinates) to a VR processing unit 407 of the VR device 400B (referring to FIG. 4). Further, the device processing unit 404 may also transmit information regarding a type of input event generated on the touch screen of the handheld device 400A to the VR processing unit 407. The input events may include a touch event, a physical touch event, a hover event, a click event, a move event etc. According to an embodiment, a touch command may be transmitted by the device processing unit 404 to the VR processing unit 407. The device processing unit 404 may be responsible for receiving information from the VR processing unit 407 to perform one or more actions on the handheld device 400A. The one or more actions may include at least launching an application (for e.g., a related application) or enabling the VR mode programmatically on the handheld device 400A when a corresponding command is sent to the handheld device 400A by the VR device 400B. Thus, the device processing unit 404 supports two way communication with the VR processing unit 407 also referred to as the VR controllers of the VR device 400B.

As illustrated in FIG. 4, the VR device 400B may include a VR rendering unit 408 which may further include a base rendering unit 409 and an external data rendering unit 410. Further, the VR device 400B may include a VR display 411 to display the VR, and may include optionally a VR database 412. The VR device 200 as explained above may form a part of the VR device 400B as explained herein.

The VR processing unit 407 may receive the graphical data for an application to be displayed on the VR display 411 from the device processing unit 404 of the handheld device 400A. Further, the VR processing unit 407 may process the touch command or any other form of input command received from the device processing unit 404 of the handheld device 400A when the handheld device is in the VR mode.

In accordance with an embodiment, the VR processing unit 407 may provide a trigger to the handheld device 400A to enable the VR mode, based on receiving an input at the VR device 400B. By way of an example, the automatic method of enabling the VR mode on the handheld device 400A may include detecting an event such as an incoming call or notification on the handheld device 400A while displaying the VR on the VR device 400B connected to the handheld device 400A. Based on detecting an event, the VR device 400B may programmatically enable the VR mode on the handheld device 400A by providing a trigger through the VR processing unit 407 to the device processing unit 404 of the handheld device 400A. By way of an example, 'VR_ENABLE' command may be sent to the handheld device 400A by the VR processing unit 407 in case of automatic triggering of the VR mode. In another example, the VR mode may be enabled on the handheld device 400A based on a received user input on the VR device 400B, for example a hard key button of a VR headset may be pressed to trigger the VR on handheld device 400A.

The VR database 412 may be present on the VR device 400B to store the mapping of the screen information with the identifier information of the corresponding application. The information stored in the VR database 412 may be used when the user switches an application currently displayed on the VR display 411 with other application running in the background state on the handheld device 400A. In some embodiments, the other application running in the background state on the handheld device 400A may also be already displayed as secondary screen information in the VR provided by the VR device 400B. The VR database 412 may accordingly store both the primary screen information and the last available secondary screen information of the handheld device 400A. The VR database 412 may store the graphical data during an entire session of the VR mode on the handheld device 400A. As soon as the VR mode is enabled, the handheld device 400A may start sharing its screen information with the VR device 400B. The last frame buffer data may be available in the in the device database 406 of the handheld device along with the mapped package name of the application. Whenever the user provides a touch command on the touch screen of the handheld device 400A to cause an execution of an application on the handheld device 400A or cause a change in UI of the application currently running in the handheld device 400A, a new record pertaining to a current screen-view of the handheld device 400A may be created and saved in the VR database 412. Further, when a touch command is received on the touch screen of the handheld device 400A so as to cause a switching in-between the primary application and one of the secondary/background applications, a new record may be created pertaining to a new screen-view of the handheld device 400A. The new record herein may correspond to a new primary application displayed on the VR display 411. Further, the new record may include the package identifier corresponding to the new primary application. When the VR mode is disabled at the handheld device 400A, the VR database 412 clears it's the saved data related to the screen information of the handheld device 400A.

The VR rendering unit 408 may render graphical information on the VR display 411 in two part layers. The first part layer may be rendered by the base rendering unit 409. The base rendering unit 409 may render the VR on the VR display 411. The VR may include a pre-recorded VR multimedia. The pre-recorded multimedia may be pre-stored on the VR device 400B, or may be provided via communication over a network by VR servers.

The second part layer may be rendered by an external data rendering unit 410 which renders the screen information and the position information of the input means received from the handheld device 400A on the VR display 411. The second part layer may be rendered over the already rendered VR by the base rendering unit 409. According to an embodiment, the external data rendering unit 410 may be configured to create multiple views for a primary application and secondary applications to be rendered on the VR display 411. Herein the view of the primary application may correspond to a current window displayed on the touch screen of the handheld device 400A, and the views of the secondary applications may correspond to one or more windows opened in the recent past on the handheld device 400A. The one or more windows opened in the recent past on the handheld device 400A may include a background application running on the handheld device 400A or applications related to the primary application on the handheld device 400A. The graphical information pertaining to the primary application and the secondary applications may be available in the device database 406, and may be further available on the local VR database 412.

The VR display 411 may display the two part layers rendered by the base rendering unit 409 and the external data rendering unit 410. In accordance with an embodiment, the rendering units (409,410) may generate a final display buffer data for the VR device 400B. The final display buffer data of the VR device 400B may be provided by the rendering units (409, 410) to the VR display 411. Accordingly, the VR display may provide views of the VR and the screen information and the position information of the input means of the handheld device 400A overlaid on the VR.

According to an embodiment, the VR display 411 may be configured to display a plurality of windows pertaining to plurality of applications running on the handheld device 400A.

According to an embodiment, based on executing a primary application based on a touch command (or any other form of input command) received on the handheld device 400A, at least one secondary screen information may be created to be displayed on the VR display 411. The secondary screen information may be displayed simultaneously along with the primary screen information on the VR display 411. However, in some embodiments, the secondary screen information may not be displayed simultaneously along with the primary screen information and may be displayed in any other suitable format. By way of an example, while execution of a primary application on the handheld device 400A, a related application may be invoked on the handheld device 400A. Such related application may be invoked, for example, when an internet browser tab is selected from the UI of the primary application or an access for a file storage or media is requested while executing the primary application. The related application may be invoked based on any similar event or on receiving a request by means of a user-input to open the related application. Herein, the related application may be treated as a secondary application for which secondary screen information may be created and provided to the VR display 411 to be displayed thereupon.

According to an embodiment, the second display mechanism may be activated on the handheld device 400A in the VR mode, and the second display mechanism may based on a rendering format for the primary screen information and the at least one secondary screen information, whose rendering formats are different. The rendering format may vary according to the display configurations of the VR display 411. For example, the background applications may be hidden from the current screen view of the handheld device 400A (for e.g. in case of a mobile device), the background applications may be displayed, in the VR provided by the VR display 411, simultaneously along with the primary screen information as the secondary screen information of the handheld device 400A.

According to an embodiment, the primary screen information may be distinguished from a secondary screen information on the basis of a tag attached thereto, where the tag may be attached to only the primary screen information or a respective tag may be attached to each of the primary screen information and the secondary screen information.

According to an embodiment, the primary screen information may be associated with an application running in a foreground mode on the handheld device 400A, and the secondary screen information may be associated with an application running in a background mode on the handheld device 400A. In accordance with an embodiment of the primary application, the view of the primary application displayed on the VR display 411 may be switched with any of the views of the secondary applications currently displayed on the VR display 411 or in a display queue on the VR device 400B. The screen-view of the primary application running in the foreground mode and the screen-view of the secondary application(s) running in the background mode on the handheld device 400A may also be referred to as the plurality of windows of the handheld device 400A.

According to an embodiment, the screen information pertaining to the plurality of windows of the handheld device 400A may be transferred to the VR device 400B for their simultaneous display.

According to an embodiment, the screen information pertaining to at least one of the windows may include data of the corresponding window for the primary screen information or the secondary screen information. The data designating the corresponding window as one of primary screen information or secondary screen information may be the tag mentioned earlier.

According to an embodiment, the screen information pertaining to an application running in the foreground mode on the handheld device may be captured by the graphics controller 402 of the handheld device 400A and stored as the primary screen information data in the VR database 412. According to an embodiment, the screen information data pertaining to an application running in the background mode may be captured by the graphics controller 402 of the handheld device 400A and stored as the secondary screen information data in the VR database 412.

According to an embodiment, the screen information pertaining to an application running in a foreground mode on the handheld device 400A may be performed at a first rate. According to an embodiment, the screen information data pertaining to an application running in a background mode on the handheld device 400A may be performed at a second rate. According to an embodiment, the first rate may be faster than the second rate as the primary application which is being currently executed on the handheld device 400A is more likely to change in its corresponding UI. In this implementation, it is less likely for a UI of a background application to change as the same rate as the primary application.

According to an embodiment, primary screen information may be stored in a dedicated display buffer. In one example, the dedicated display buffer may store and retrieve the buffered graphical data on a round robin basis.

According to an embodiment, secondary screen information may be stored in a ring buffer.

In additional to the above described embodiments, the device processing unit 404 may be further configured to transfer a control command to the VR processing unit 407, where the control command allows the handheld device 400A to operate in the VR provided by the VR device 400B.

The control command provided by the device processing unit 404 may include a command of maintaining a connection between the handheld device 400A and the VR device 400B, and the connection may be over one of the communication networks described above.

Further, the control command provided by the device processing unit 404 may include a layout configuration information defining the layout of the primary screen and the secondary screen on the VR device 400B.

Further, the control command provided by the device processing unit 404 may include an input command provided by a user on the handheld device 400A, for example a touch command on the touch screen of the handheld device 100, or a bezel-touch type input command when the bezel-touch sensor 126 senses a bezel-touch event.

According to an embodiment, the control command provided by the device processing unit 404 may include a command indicative of a zoom event on the handheld device 400A. The zoom event may be displayed on the VR display 411, as being received on the handheld device 400A in the form of second input receiving mechanism which has been activated on the handheld device 400A in the VR mode.

According to an embodiment, the device processing unit 404 may be further configured to transfer information pertaining to a type of input event to the VR processing unit 407 for further processing. According to an embodiment the various types of input events may be detected by the second interaction mechanism which has been activated on the handheld device 400A in the VR mode, and may include, but are not limited to, a hovering touch event, a physical touch event, a motion event and a click event.

The foregoing description shall explain some of the exemplary functions performed by at least some of the components of the handheld device 400A to enable the handheld device 400A to be operated in a VR provided by the VR device 400B, and the screen information of the handheld device 400A may be displayed on the VR display 411 with the position information of an input means of the handheld device 400A. Additionally, on execution of an application on the handheld device 400A based on a touch command (or hovering command) received on the handheld device 400A, the display effect of the executed application may be continued to be provided to the VR device 400B.

Displaying of the Screen Information of the Handheld Device 400A on the VR Display 411:

By way of an example, the graphics controller 402 may capture the graphical information of the handheld device 400A. The graphical data may be contained in the graphical information present in the display buffer, i.e., the frame buffer of the handheld device 400A. Once captured, the graphical controller 402 provides the graphical data to the graphical information processing unit, i.e., the device processing unit 404. For example, for a mobile device running on the Android platform, the graphical information may be contained in frame buffers fb0 to fb1. Based on the OEM of the mobile device, the frame buffer data may be captured with system permissions and root permissions. The graphics controller 402 of the handheld device 400A may gather such graphical information. Additionally, the graphical data may also include coordinate values of the screen of the handheld device 400A which are in contact with the input means (or detected to be in close proximity) of the handheld device 400A at the time of providing an input command via the input means on the handheld device 400A, such as the touch coordinate values in case of a touch input command received upon the touch screen of the handheld device 400A. The touch coordinate values (or the hover point values) may be detected by the touch-event controller 403 of the handheld device 400A. Thus, both the screen information and the touch coordinate values are available for transmission to the VR device 400B.

By way of further example, the VR processing unit 407 may receive the screen information and the touch coordinate values from the device processing unit 404. The VR processing unit 407 may provide the screen information and the position information of the input means (e.g., touch coordinate values) to the VR rendering unit 408 for displaying them by the external data rendering unit 410 on the VR display 411. The position information of the input means may be used to display on the VR display 411 a virtual indicator of the actual position of the input means with respect to the screen of the handheld device 400A. Thus, the user may view a virtual indicator at the same position which touched by the user on the screen of the handheld device 400A in the VR mode. Further, the VR processing unit 407 may provide the application identifier, i.e., the package name, corresponding to the screen information and the current graphical data of that application to be stored in the VR database 412. The VR database 412 may maintain a record of the application's package name along with the latest graphical information of that application.

By way of a further example, the touch-event controller 403 may sense an event such as a bezel-touch event. The bezel-touch event may be used to change the current running application displayed on the VR display 411 to a previously opened application, such as a secondary application in the VR. Towards this end, the device database 406 may provide the respective application identifier, i.e., the package name for the secondary application along with the graphical information stored for that application. The respective application identifier may be used by the application controller 405 to launch and execute the secondary application on the handheld device 400A whose effect may be continued to be provided on the VR display 411. As soon as the application is launched (i.e., the secondary application is launched), the updated graphics information for the launched application may be sent to the VR device 400B for its display.

Figure 5:
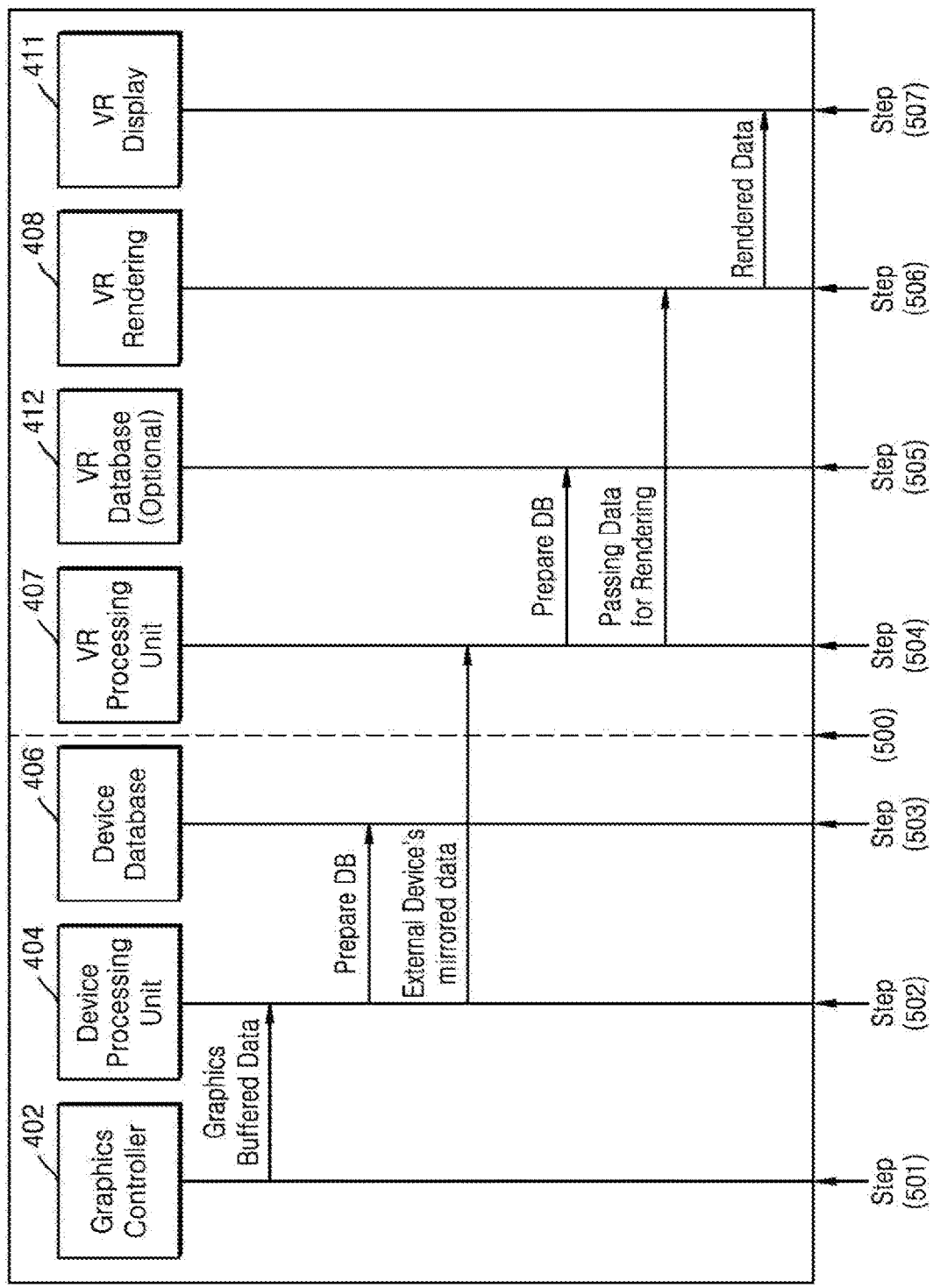
FIG. 5 illustrates an example flow-diagram of a method of displaying screen information of a handheld device on a VR display, according to an embodiment.

FIG. 5 illustrates an example flow-diagram of a method of displaying screen information of a handheld device on a VR display, according to an embodiment. As illustrated in FIG. 5, at step 501, the graphics controller 402 prepares the available display buffer data to be transmitted to the device processing unit 404. The device processing unit 404 at step 502 provides the current display buffer data and information of the corresponding application to the device database 406. The device database 406 stores the display buffer data and the corresponding package name of the application in a mapped relationship.

Further, the device processing unit 404 provides the screen information of the handheld device 400A to the VR processing unit 407. The provided screen information is represented as 'external device's mirrored data' in FIG. 5. 'External device' refers to the handheld device 400A. The interface between the handheld device 400A and the VR device 400B is indicated by dotted-lines and marked at 500.

At step 504, the VR processing unit 407, based on receiving the display buffer data from the device processing unit 404 of the handheld device 400A, cause the local VR database 412 store the display buffer data and the application details. Further, the VR processing unit 407 passes the display buffer data to the VR rendering unit 408 which may utilize the screen information to render the screen information on the VR display 411. At step 505, the local VR database 412 may store the record such as mapping of the application name with current display buffer data of the VR device 400B. At step 506, the VR rendering unit 408 provides the rendered data, i.e., the screen information to the VR display 411 to be displayed thereupon and at step 507, the VR display 411 displays a view based on the screen information thus received.

Displaying of the Visual Indicator Pertaining to the Position Information of the Input Means and the Screen Information of the Handheld Device 400A:

By way of an example, the screen of the handheld device 400A is a touch-screen, and a user may provide touch-inputs on the touch screen, the touch-inputs may include single-tap clicks, double-tap clicks, drag-based input, and even hover-inputs when the second operating mechanism is activated on the handheld device 400A, during the VR mode. Whenever the user provides such touch-inputs on the touch-screen of the handheld device 400A, the position information of the input means, i.e., the user's finger or a pointed stylus used to operate the handheld device 400A, is detected and transferred to the VR device 400B for displaying a visual indicator. As a result, the visual indicator corresponding to the position information of the input means would appear at a position on which a point of contact is made by the input means on the touch screen of the handheld device 400A, or a hovering contact is made with respect to the touch screen of the handheld device 400A. In accordance with an embodiment, the position information of the input means may be mapped based on the actual size of the image on the screen of the handheld device 400A and the actual image size of the image on the VR display 411 of the VR device 400B. Thus, the position of the input means corresponding to the screen of the handheld device 400A, and the position of the input means corresponding to the VR device 400B, may be synchronized with each other. Therefore, when the user moves the input device over the screen of the handheld device 400A, the virtual indicator displayed in the VR may move in accordance with the movement of the input means. The user may view the visual indicator on the VR display 411 and then provide input command on the handheld device 400A, for example, by touch-clicking on the touch screen, or a corresponding operation is then performed on the handheld device 400A. Also, the display effect of the operation being performed on the handheld device 400A may be provided upon the VR display 411 and when receiving of the input command and updating the display of the VR display 411.

Figure 6:
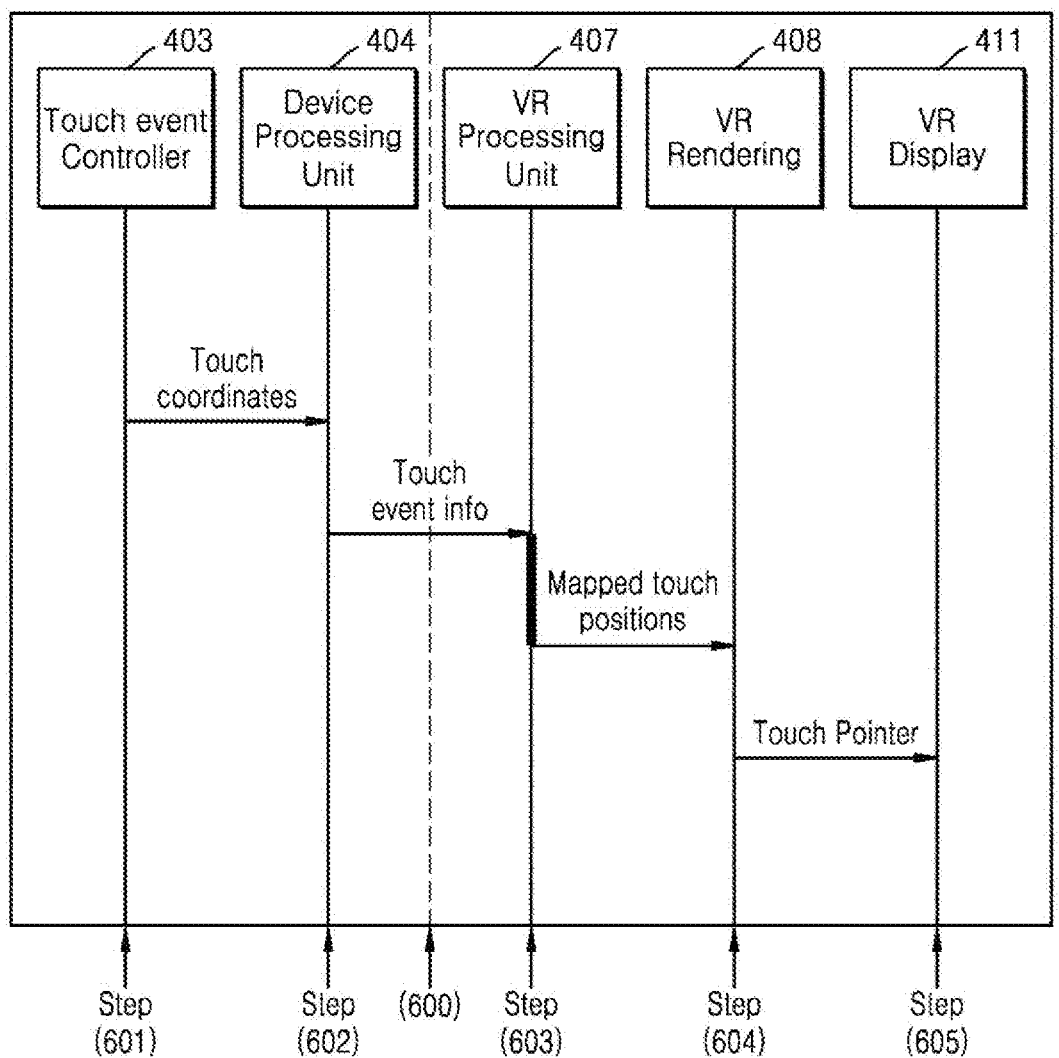
FIG. 6 illustrates an example flow-diagram of a method of displaying on a VR display a visual indicator corresponding to position information of an input means of a handheld device according to an embodiment.

FIG. 6 illustrates an example flow-diagram of a method of displaying on a VR display a visual indicator corresponding to position information of an input means of a handheld device according to an embodiment.

As illustrated in FIG. 6, the touch event controller 403 at step 601 captures the touch-coordinates (or hover-position coordinates) whenever the input means causes a touch-contact or hover-contact with respect to the screen of the handheld device 400A, and the touch-coordinates (or hover-position coordinates) may be transmitted to the device processing unit 404 to be transferred to the VR device 400B. The steps thereafter are performed at the VR device 400B to prepare for displaying of the visual indicator corresponding to the position information of the inputs means of the handheld device 400A. The interface between the handheld device 400A and the VR device 400B is indicated by dotted-lines and marked as 600. At step 602, based on detecting a touch-event (or a hovering event), the information of detecting a touch event (or hovering event), indicated as 'touch event info', is transmitted with the touch coordinates (or hover coordinates) to the VR processing unit 407. The VR processing unit 407 at step 603 provides the mapped touch positions to the VR rendering unit 408. At step 604, the VR rendering unit provides the rendering information of the visual indicator, which may be in the form of 'finger pointer', to the VR display 411. Accordingly, at step 605, the VR display 411 displays the finger pointer on the VR display 411 along with the screen information of the handheld device 400A.

Displaying of Multiple Views, 'Multiple Windows', Corresponding to Different Applications Running on the Handheld Device 400A in the VR:

The above described embodiments consider several scenarios when wireless transfer of plurality of windows is initiated on the handheld device 400A. One such scenario is when a user has clicked a position over the screen of the handheld device 400A to launch a new application for e.g., to open a media application to open a media file or to attach a media file. Thus, the media application may be invoked as a primary application while the already opened application is also running as a background application. In another scenario, another application may be automatically invoked due to some action performed by the user over a currently executing application on the handheld device. From both scenarios, at any point of time, a primary application may be running in the foreground section whose window may be currently viewed on the screen of the handheld device 400A, and one or more secondary applications may be running in the background section, whose corresponding windows may not be currently visible on the screen of the handheld device 400A. Due to limited screen size of the handheld device 400A, the handheld device 400A has a limited size of view for displaying one application. But the VR has the advantage of a bigger view being provided by the VR display 411, and the windows pertaining to the background applications may also be viewed with the window of primary application currently being viewed on the screen of the handheld device 400A, according to an embodiment. According to an embodiment, one of the ways to display multiple views of the windows pertaining to multiple applications running on the handheld device 400A may be achieved by transmitting graphical buffer data of all previously running applications on the handheld device 400A to the VR device 400B. According to an embodiment, another way to display multiple views of the windows pertaining to multiple applications running on the handheld device 400A may be achieved by transmitting graphical buffer data of the foreground application and only the updated information of the graphical buffer data of the background applications to the VR device 400B, and the VR device 400B utilized the transmitted information to display the multiple view of all the applications simultaneously on the VR display 411.

All of the applications running on the handheld device 400A may be shown in the VR. Information related to any of the previously running application of the handheld device 400A may be retrieved from the device database 406 of the handheld device 400A, where the device database 406 may store the history of the graphical buffer data of all the applications.

By way of an example, the VR display 411 may initially display pre-recorded data using the base rendering unit 409 of the VR rendering unit 408. At this point of time, the VR rendering unit 408 may have only one input data, i.e., the VR pre-recorded multimedia. As soon as the VR mode is enabled on the handheld device 400A of the user, its frame buffer, i.e., the graphical data or the graphical buffer data may be captured by the graphics controller 402 as shown in FIG. 5. Further, referring to FIG. 5, as shown at step 501, the graphics controller 402 may provide the captured graphical buffer data to the device processing unit 404 to transmit it to the VR processing unit 407 of the VR device 400B. So, finally, the mirrored data of the external device, i.e., the handheld device, may be provided to the VR rendering unit 408 to be rendered upon the VR display 411 for displaying the mirrored data. By referring to FIG. 5, only one screen data or only one view of one window of a single application running on the handheld device 400A may be displayed to the user in the VR. Accordingly there may be only one entry in the device database 406 including the last frame buffer data of one application currently being viewed on the handheld device 400A, and a mapped package name linked to the one application. As soon as a new application is launched by the user or invoked on the handheld device 400A, the new applications' package name is provided by the application controller 405 to be fed as a new entry in the device database 406. The device database 406 may update its records. The graphics controller 402 may provide the graphical buffer data for the new application to the device database 406. The device database 406 may store the same mapped to the package name of the new application. All the graphical buffer information pertaining to the multiple windows of multiple applications running on the handheld device 400A may be provided to the external data rendering unit 410 of the VR rendering unit 408 via the VR processing unit 407. Accordingly, the VR rendering unit 408 will add the views based on applications' frame buffer data as received from the device processing unit 404 of the handheld device 400A, onto the pre-recorded VR multimedia view rendered by the base rendering unit 409, on the VR display 411 which is presented as a final screen to the user.

Changing the Application or Switching—in Between the Applications on the Handheld Device 400A while Viewing in the VR:

By way of an example, when multiple windows pertaining to multiple applications are displayed on the VR display 411, a dedicated area on the VR display 411 may be used for displaying a primary application. Further, dedicated areas on the VR display 411 may be used for displaying the secondary applications which may be displayed simultaneously with the primary application in the VR. When the user wishes to switch between the primary application and the secondary applications displayed to the user in the VR, the user may provide a specific type of touch-input which is interpreted based on the second input receiving mechanism activated on the handheld device 400A in the VR mode. For example, the user may provide a long press type touch input on the touch screen of the handheld device 400A, or on the bezel-area of the handheld device 400A which is handled by the touch event controller 403. The event detected may be sent to the device processing unit 404 and then passed to the device database 406 to extract the previous saved application identifier. The order of retrieving the record may be based on which side of the bezel area or which side of the edges of the handheld device 400A is touched. Once the application identifier is extracted from the device database 406, it may be then passed to the application controller 405.

The application controller 405 may launch the specific application by providing a relevant command pointing an application identifier of the specific application on the handheld device 400A. Graphics controller 402 continuously works on retrieving the frame buffer data to provide it to the VR processing unit 407 of the VR device 400B. When the graphics buffer data is updated, the graphics controller 402 may provide the graphics buffer data via the device processing unit 404 to the VR processing unit 407. As a result, view at the VR display 411 may be updated by the VR rendering unit 408 and all database entries, such as device database 406 and VR database 412, are updated.

Figure 7:
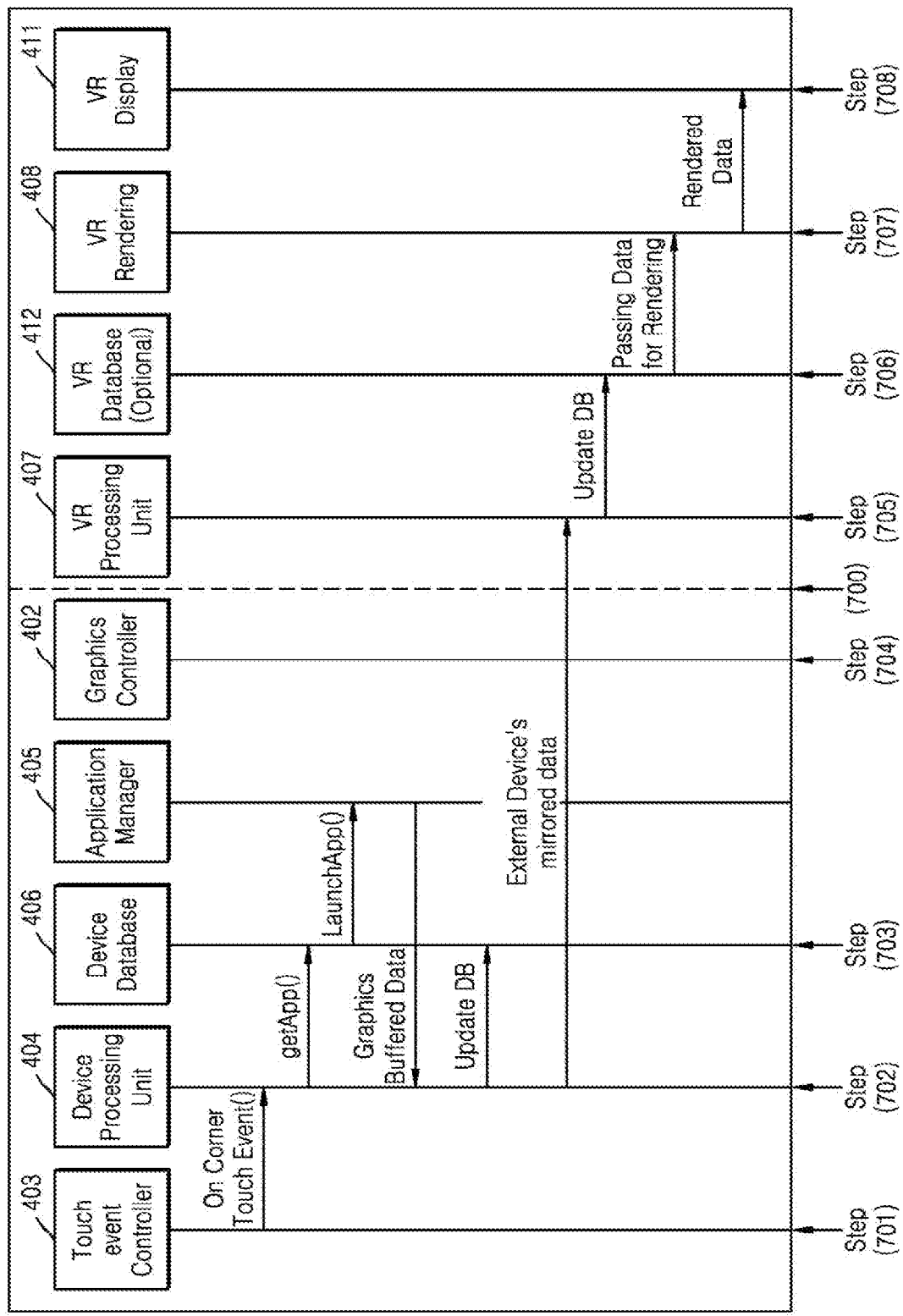
FIG. 7 illustrates an example flow-diagram of a method of displaying on a VR display multiple windows pertaining to multiple applications running on a handheld device according to an embodiment.

FIG. 7 illustrates an example flow-diagram of a method of displaying on a VR display multiple windows pertaining to multiple applications running on a handheld device according to an embodiment.

As illustrated in FIG. 7, the touch event controller 403 at step 701 captures a touch-event by way of long-press on one of the edges of the screen ('screen corner') towards initiating a change in the current primary application being viewed in the VR. The touch event controller informs the device processing unit 404 detection of the touch-event. The device processing unit 404 at step 702 retrieves the previously saved application identifier from the device database 406. Once the application identifier is extracted from the device database 406, at step 703, the application controller, 'application manager' 405 launches the application on the handheld device 400A. While a new window of the application on the handheld device 400A is launched, the graphics controller 402 at step 704 provides the current display buffer data to the device processing unit 404. The device processing unit 404 further provides this information to the device database 406 for updating. At step 702, the device processing unit 404 simultaneously provides the external data's mirrored data corresponding to the new primary application to the VR processing unit 407. Thereafter at step 705, VR database 412 may be updated. At step 706, the display buffer data is passed to the VR rendering unit 408. At step 707, the VR rendering unit 408 provides the rendered data to the VR display 411. The final view may be presented to the VR device 400B for its display on the VR display 411 at step 708.

Automatically Setting of VR Mode of the Handheld Device 400A:

VR mode may be enabled at the external visual display device, i.e., the handheld device 400A, and the handheld device 400A starts to operate in a specific way such as the second mechanism explained in detail above, for e.g. the touch screen of the handheld device 400A may become more sensitive to detect hovering inputs. It should be noted that when hovering detection is not sensitive enough, the normal touch as per the first mechanism of operation of the handheld device 400A may also work in the VR mode. By way of an example, double-click inputs may be received to initiate any user-action on the handheld device 400A by the second input receiving mechanism. In order to enable the VR mode, an event to enable the VR mode may be sent from the VR device 400B to the handheld device 400A for causing the handheld device 400A to enable the VR mode.

Figure 8:
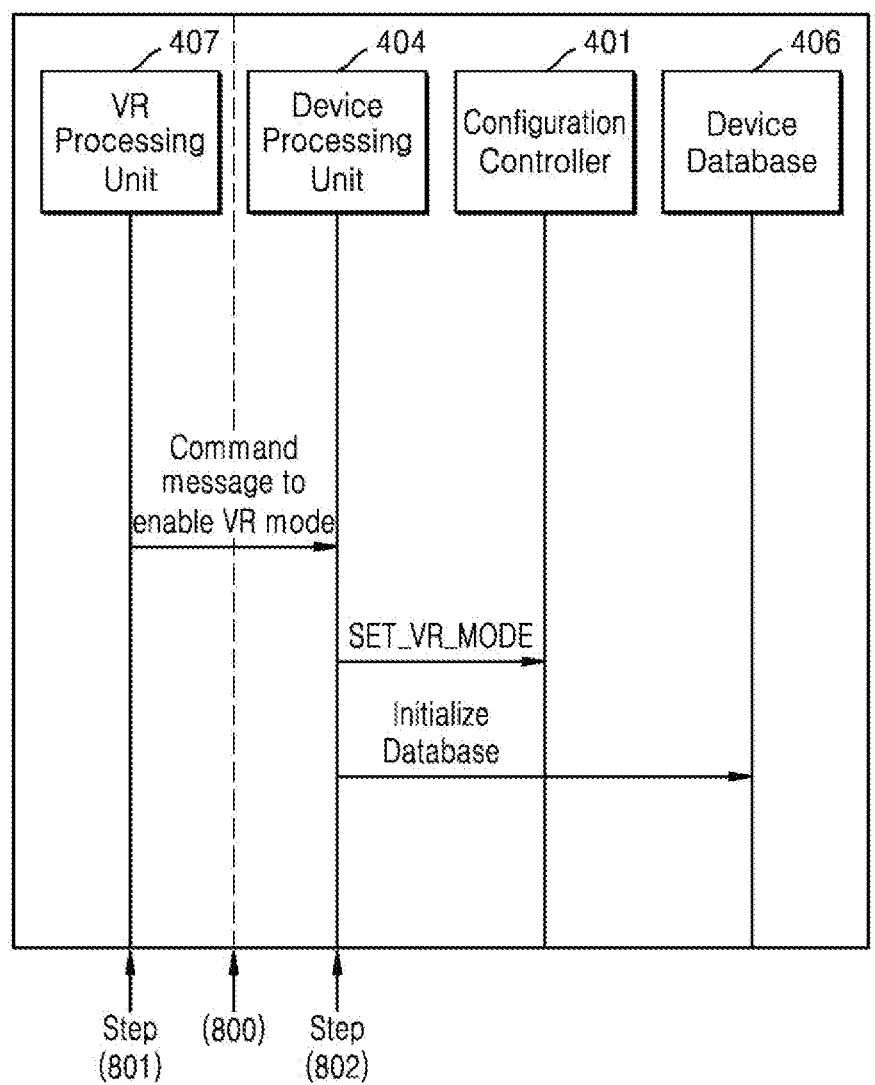
FIG. 8 illustrates an example flow-diagram of a method of setting a VR mode on a handheld device based on a command received from a VR device, according to an embodiment.

FIG. 8 illustrates an example flow-diagram of a method of setting a VR mode on a handheld device based on a command received from a VR device, according to an embodiment. As illustrated in FIG. 8, at step 801, the VR processing unit 407 provides a command message to enable the VR mode to the device processing unit 404 of the handheld device 400A, based on a user-input in the VR. The command message may be received, for example, by the user pressing the hard buttons on a VR headset. The steps thereafter are performed at the handheld device 400A to enable the VR mode. The interface between the handheld device 400A and the VR device 400B is indicated by dotted-lines and marked at 800. The device processing unit 404 passes the event generated by the received user-input in the VR to the configuration controller 401, as represented by step 802 in FIG. 8. 'SET VR MODE' command may be sent to the configuration controller 401. The configuration controller 401 may change the mode on the handheld device 400A to VR mode and initializes the device database 406.

The foregoing description describes some examples of the implementation details of the above described embodiments for the handheld device 400A and the VR device 400B. According to an embodiment, the VR mode may be enabled or triggered on the handheld device 400A by either of the following options:

(a) Manual Key pressed at handheld device 400A (b) Automatic event detection based on a pre-defined as configuration Once triggered, the following actions may be performed to initiate the VR mode at the handheld device 400A.

(1) The priority queue for running applications may be changed on the handheld device 400A. For example, the applications running after enabling VR mode may be given higher priority than the applications running therebefore. In such a case, some of the applications running before enabling the VR mode may be closed.

(2) According to one implementation, the connection request to the VR device 400B to support communication may be carried out through the following channels/sockets of the handheld device 400A:

- Socket 1 (TCP/UDP socket)—Used to transfer display information of active application/foreground application also referred to as the primary application viewed in the VR.
- Socket 2 (TCP/UDP socket)—Used to transfer display information of background applications also referred to as the secondary application viewed in the VR.
- Socket 3 (TCP socket)—used to transfer position information of the input means of the handheld device 400, for example the touch coordinates in case of a user's finger providing touch inputs on a touch screen of the handheld device 400A To transfer touch information.
- Socket 4 (TCP socket)—To enable control communication, for example exchange of certain control commands for operating of the handheld device 400A.

(3) In case a privacy mode is detected on the handheld device 400A, the handheld device 400A goes black when connected to the VR device 400B in the VR mode.

(4) Information regarding the layout configuration is shared by the handheld device 400A with the VR device 400B as control communication over TCP Socket.

(5) The local database (the device database 406) may be initiated to keep tracking of applications opened during VR mode.

(6) The transmission of the screen information of currently running application and all of background applications' graphics data is performed.

(7) The transmission of the position information of the input means, example, the touch coordinates Is performed.

(8) By way of an example, the VR mode may be enabled or triggered on the handheld device 400A by either of the following options:

By way an example, the communication channel (Socket 1) may be used for sharing of various events detected on the handheld device 400A with the VR device 400B. Herein, the types of inputs may include for example, the initialization of the VR mode, de-initialization of the VR mode, keeping alive an established connection, layout configuration information, bezel events, zoom events, etc.

By way of an example, the primary screen information is shared over Socket 2. The Socket 2 is required for sharing screen information of recently running application from the handheld device 400A to the VR device 400B. The following steps may be performed for sharing such screen information:

(a) The application view of a top running application running on top of the handheld device 400A is captured in a thread. This may be performed almost in real time, for example 20 frames per second.

(b) The captured information is passed to a dedicated buffer.

(c) An encoding technique such as H.264 may be used to reduce buffer size to achieve a good system's throughput.

(d) Encoded buffer information is transmitted to the VR device 400B via Socket 1.

By way of an example, the secondary screen information is shared over Socket 3. The Socket 2 is required for sharing screen information of background applications from the handheld device 400A to the VR device 400B. The following steps may be performed for sharing such screen information:

(a) The application view of the background applications is captured periodically in a thread 2 with a rate, for example, 8-10 frames per second.

(b) The captured information is passed to a ring buffer.

(c) Data compressor may be used to compress data for a limited sized buffer.

(d) The compressed buffer information is transmitted to the VR device 400B via Socket 2.

By way of an example, the touch-input may be transferred over Socket 4. The Socket 4 is required for sharing of touch information from the handheld device 400A to the VR device 400B. The following steps may be performed for sharing the touch information:

(a) The touch coordinates (or the hovering coordinates), for example coordinates x,y are captured.

(b) The captured information is transmitted in a packet to the VR device 400B.

(c) Final x, y are calculated relative to change in x,y values pertaining to the last detected touch coordinates.

(d) At a click event, operation may be performed on calculates touch coordinates instead of physical touch coordinates.

Figure 9:
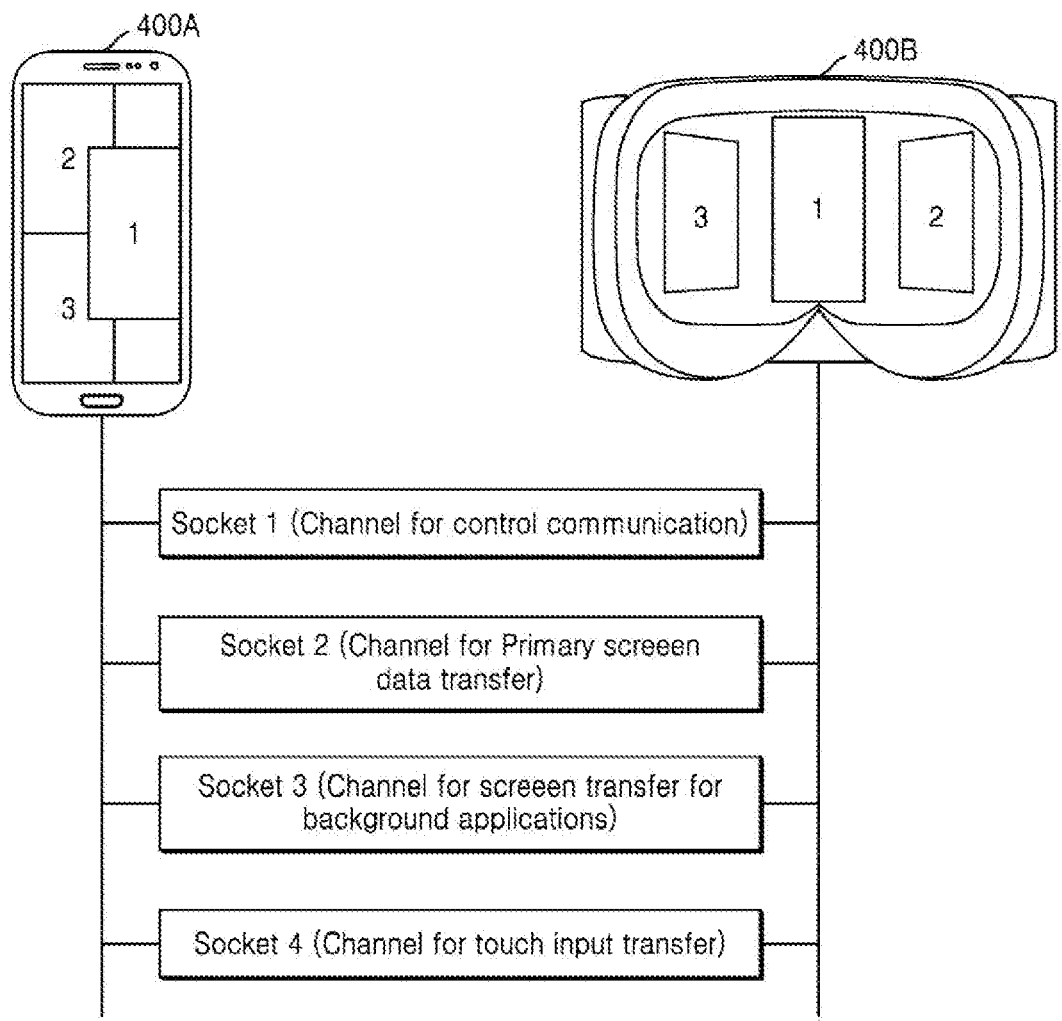
FIG. 9 illustrates an example of communication channels between a handheld device and a VR device, according to an embodiment.

FIG. 9 illustrates an example of communication channels between a handheld device and a VR device, according to an embodiment.

Figure 10A:
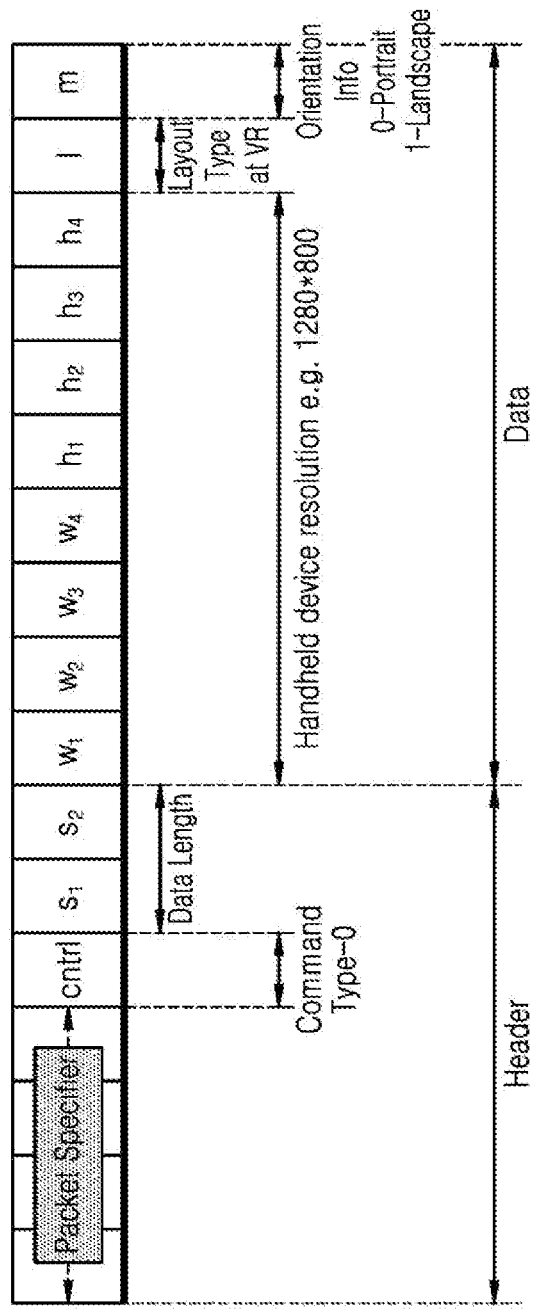
FIG. 10A illustrates an example of packet information shared with a VR device while initiating a VR mode in a handheld device, according to an embodiment.

By way of an example, the packet information for various control communication shared between the handheld device 400A and the VR device 400B may be as follows:

While Initiating VR Mode:

FIG. 10A illustrates an example of packet information shared with a VR device while initiating a VR mode in a handheld device, according to an embodiment. The desired orientation of the screen information to be displayed in the VR on the VR display 411 may be selected by providing '0' for portrait view or '1' for landscape view, irrespective of the current view on the handheld device 400A. Further, the presence of 'packet specifier' confirms that the packet belongs to VR mode. '0' may be provided as the control command for initialization of VR mode; '1' may be provided as the control command for de-initialization of VR mode; '2' may be provided as the control command to keep alive or to keep verify connection establishment; '3' may be provided as the control command for a bezel-event detected on the handheld device 400A; '4' may be provided as the control command for a zoom-event detected on the handheld device 400A, etc.

Figure 10B:
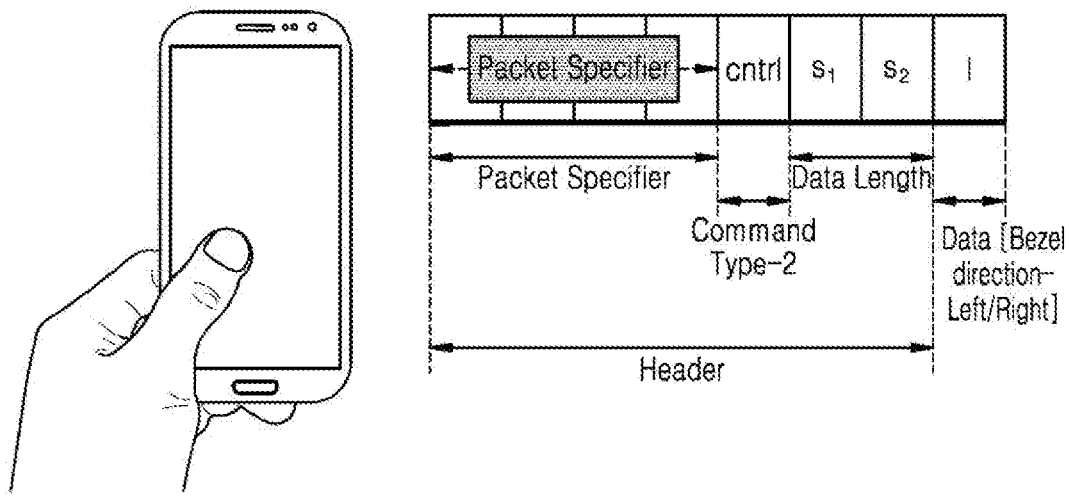
FIG. 10B illustrates an example of packet information shared with a VR device while switching applications in a handheld device, according to an embodiment.

While Switching the Application while Viewing in VR:

FIG. 10B illustrates an example of packet information shared with a VR device while switching applications in a handheld device, according to an embodiment. As illustrated, command type '2' is provided while switching application.

Figure 10C:
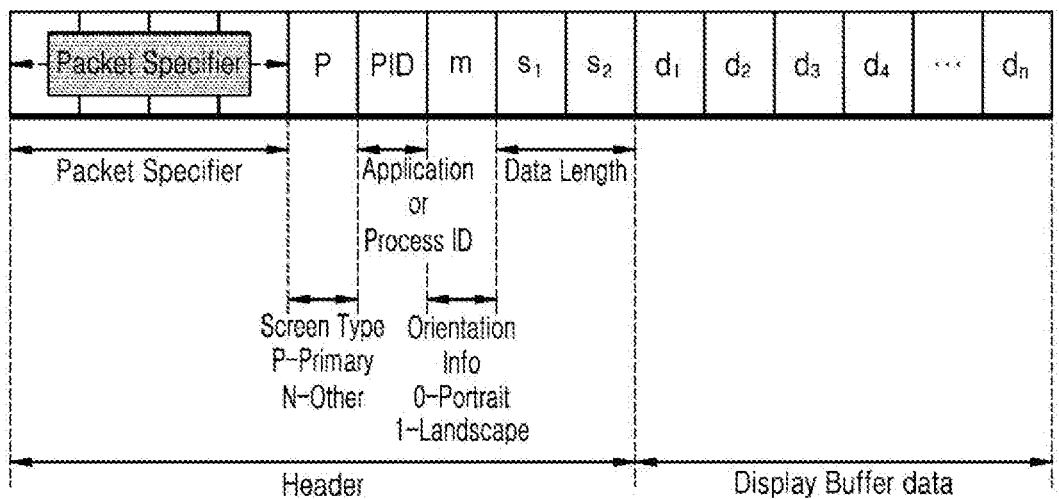
FIG. 10C illustrates an example of packet information shared with a VR device for a primary application, i.e., an active application of a handheld device, according to an embodiment.

Packet Information for Display Buffer of Primary Application:

FIG. 10C illustrates an example of packet information shared with a VR device for a primary application, i.e., an active application of a handheld device, according to an embodiment. As represented, the screen type 'p' indicates that the currently transferred screen information may be treated as a primary application in the VR.

Figure 10D:
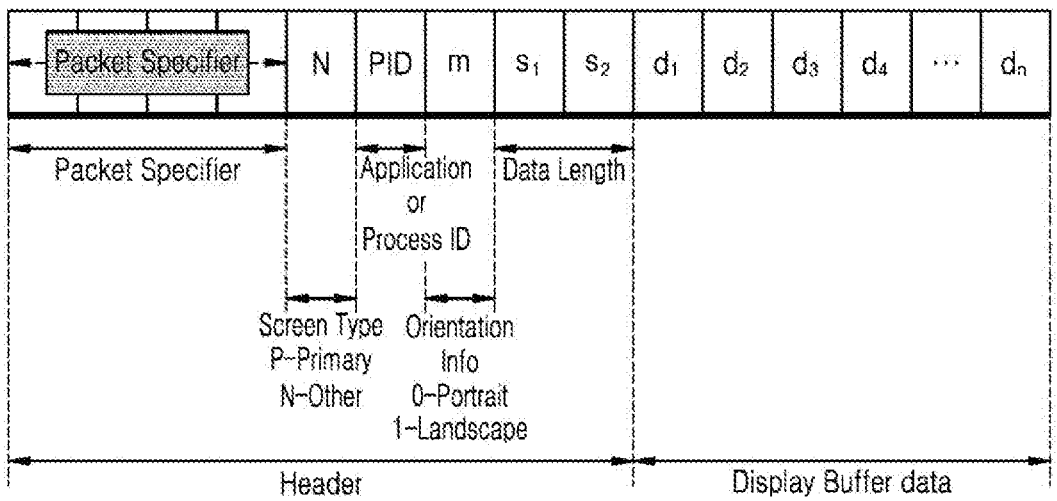
FIG. 10D illustrates an example of packet information shared with a VR device for a secondary application, i.e., a background application of a handheld device, according to an embodiment.

Packet Information for Display Buffer of Secondary Application:

FIG. 10D illustrates an example of packet information shared with a VR device for a secondary application, i.e., a background application of a handheld device, according to an embodiment. As represented, the screen type 'n' indicates that the currently transferred screen information has to be treated other than a primary application in the VR.

Figure 10E:
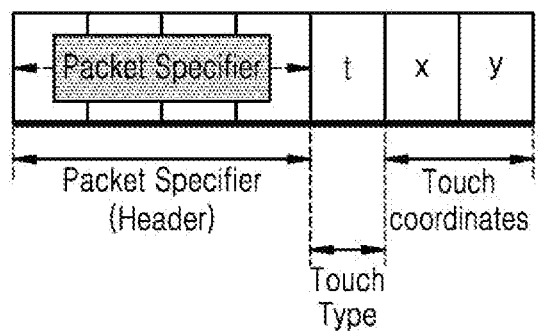
FIG. 10E illustrates an example of packet information shared with a VR device for touch-coordinates detected on a screen of a handheld device, according to an embodiment.

Packet Information for Position Information of the Input Means/Touch-Coordinates:

FIG. 10E illustrates an example of packet information shared with a VR device for touch-coordinates detected on a screen of a handheld device, according to an embodiment. The touch type may indicate values for the type of input received, for example, '0' for hovering touch event, '1' for a physical touch event', '2' for a move type touch event, for example by way of dragging, '3' for a click event such as during secondary interaction mechanism activated upon enabling VR mode on the handheld device 400A.

By way of a further example, the data parsing at the VR device 400B for a input message received at Socket 1, Socket 2, Socket 3 and Socket 4 may be performed in the following manner.

Firstly, an initial message may be received at the VR device 400B as a control message, i.e. 'initiating VR mode'. The input message received at Socket 1 may be parsed to receive information such as: Layout design to show the view of the window running on the handheld device 400A in VR; the screen resolution of the handheld device 400A; and the orientation of the handheld device 400A.

In thread 1, the data is received at Socket 2. The revived data from the data buffer may be decoded using H.264 decoding. Thereafter, the data is set to primary view to show graphical data of the top running application at the handheld device 400A.

In thread 2, the data is received at Socket 3 recursively. The data of each screen, i.e., the screen information pertaining to the background applications, may be decompressed. Thereafter, the data is set to secondary views to show display data of background applications running at the handheld device 400A.

In thread 3, the data is received at Socket 4. The buffer information of the touch coordinates is parsed. A finger pointer may be created as a visual indicator based on the information of the touch coordinates received from the handheld device 400A. The finger pointer may be created as an overlay to view finger position in the VR.

Figure 11:
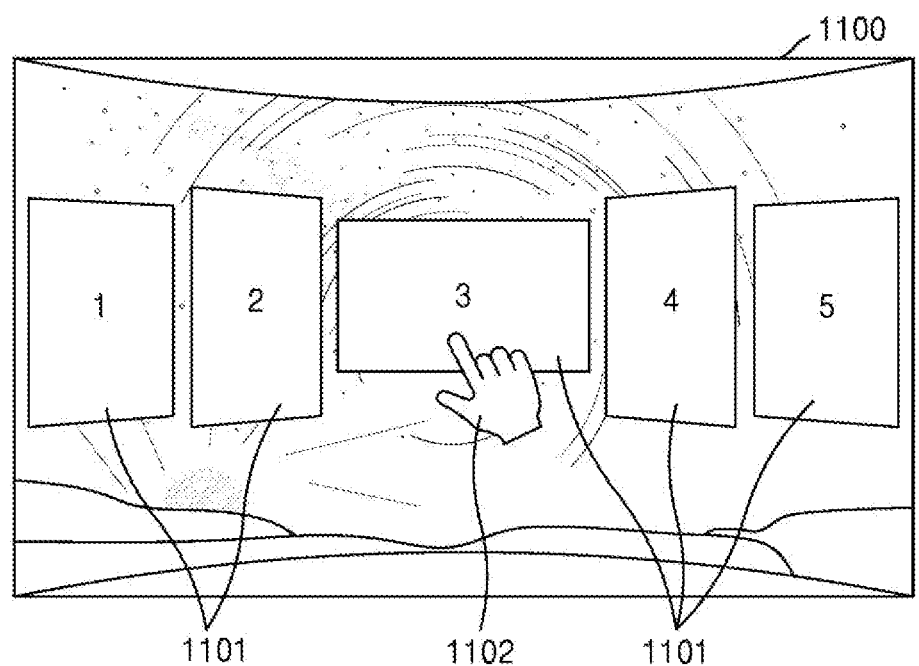
FIG. 11 illustrates a VR view displaying screen information shared by a handheld device according to an embodiment.

FIG. 11 illustrates a VR view displaying screen information shared by a handheld device according to an embodiment. By referring to FIG. 11, the VR 1100 includes multiple views 1101 pertaining to multiple windows running on the handheld device 400A with a finger pointer 1102 overlaid on one of the views.

In a main thread, an operation is performed based on control message received in Socket 1, which may include a bezel-event, i.e., to update view positions of the primary screen switched with one of the secondary screens. Alternatively, the control message received at Socket 1 may include a close command to de-initialize the VR mode, which may be the preformed in the main thread.

Figure 12A:
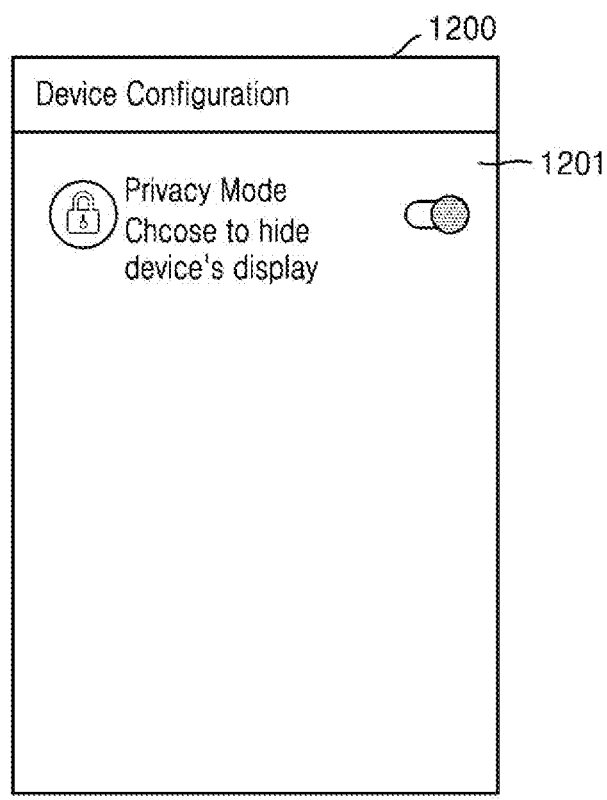
FIGS. 12A and 12B illustrate user-interfaces of a device configuration application of a handheld device according to an embodiment.
Figure 12B:
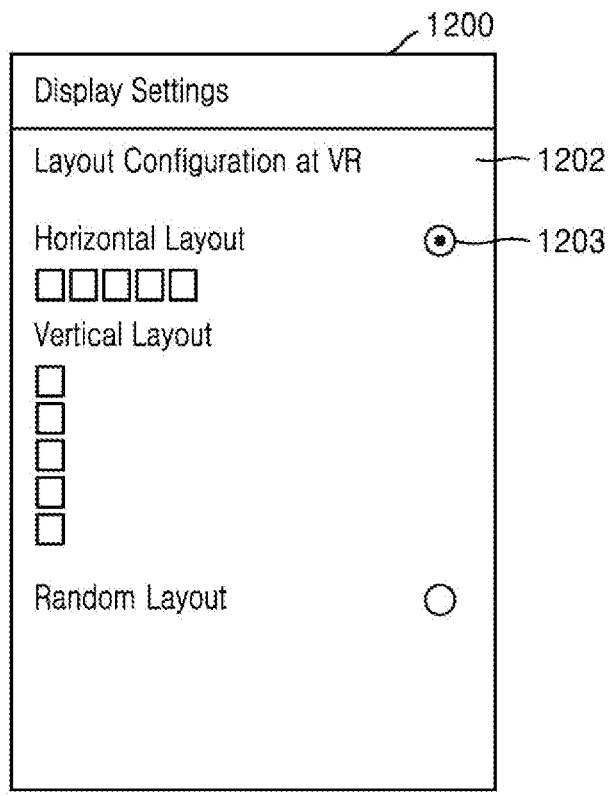

FIGS. 12A and 12B illustrate user-interfaces of a device configuration application of a handheld device according to an embodiment. By referring to FIG. 12A, the privacy mode may be enabled on the handheld device 400A such that a screen of the handheld device 400A goes black in the VR mode. The privacy mode may be enabled by in the device configuration UI 1201.

The UI 1201 may include a toggle button to switched on privacy mode on the device 1200.

By way of a further example, the display configurations for the screen information, or view to be displayed in the VR, may be provided by way of user-selection on the handheld through the display configuration settings of the handheld device 400A as shown in FIG. 12B. FIG. 12B depicts a user-interface 1202 of the display settings on a handheld device 1200. The user-interface 1202 represents three possible layouts for the shared screen information with the VR device 400B, which include: 'horizontal layout', 'vertical layout' and 'random layout'. The selection at 1203 indicates that the user-provided selection for the layout for displaying shared screen information in the VR is: horizontal layout.

The following description shall now explain the various methods illustrated through FIGS. 13-17 which may be performed on the above described handheld device 400A, according to an embodiment.

Figure 13:
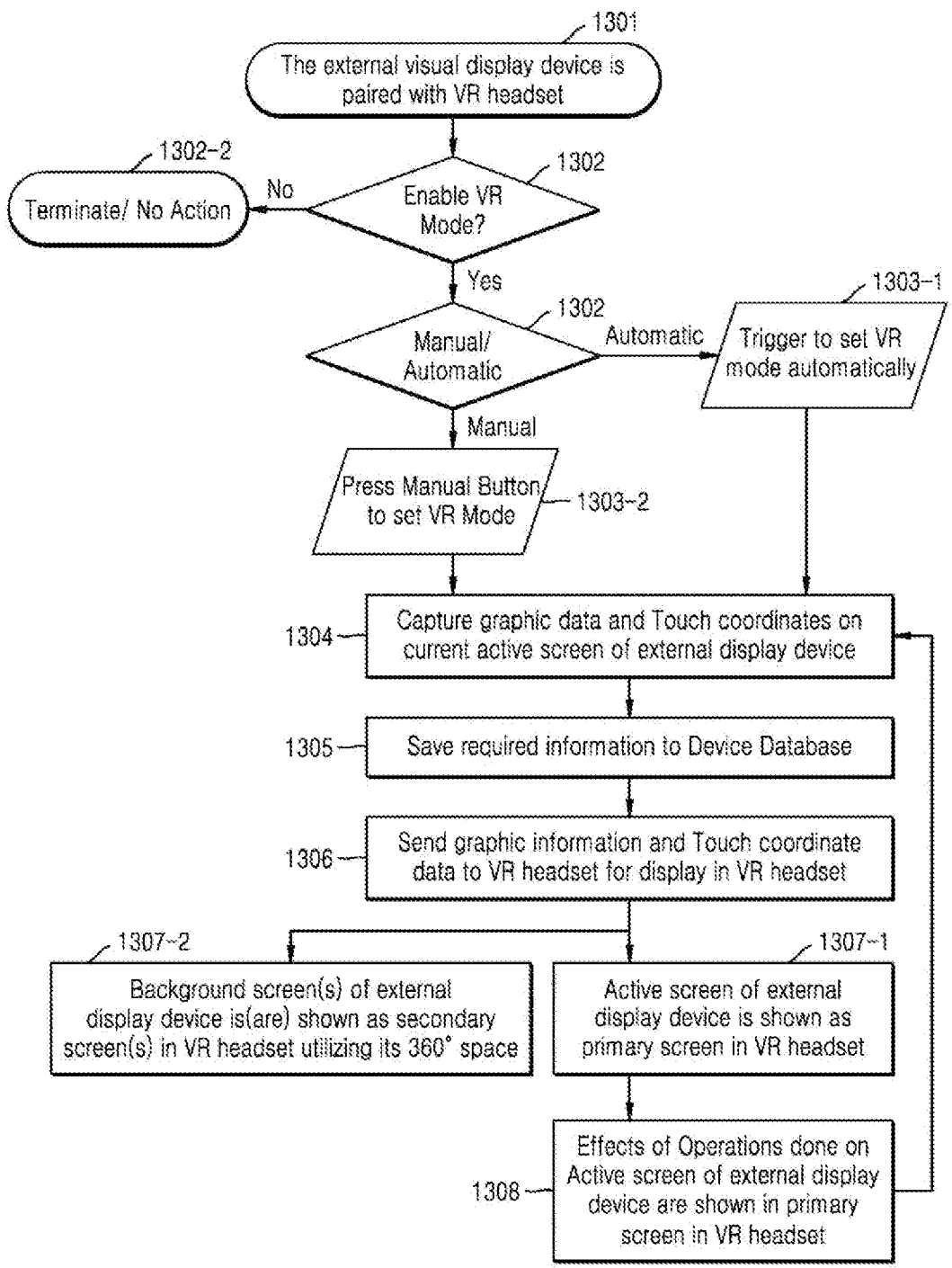
FIG. 13 illustrates a flowchart of a method of operating a handheld device in a VR mode, according to an embodiment.

FIG. 13 illustrates a flowchart of a method of operating a handheld device in a VR mode, according to an embodiment. The handheld device 400A is represented as the 'external visual display device' and the VR device 400B is represented as the 'VR headset' in the FIG. 13. The method begins at step 1301, where the handheld device 400A is paired with the VR device 400B using any of the existing technologies such as Wi-Fi, Bluetooth™, or wired data cable etc. At step 1302, an event detection module (for example the event detection module 104 referred to in FIG. 1) may check if an event to initiate operation of the handheld device 400A has been detected. In case no such event is detected, the method may proceed to step 1302-2 where the process ends. In case the event to enable the VR mode is detected, the method 1300 proceeds to step 1302-1. At step 1302-2, the event detection module checks if the event to initiate operation of the handheld device in VR mode is enabled through the manual method or the automatic method. If the VR mode is enabled through the automatic method, the method proceeds to step 1303-1 to trigger the setting of the VR mode on the handheld device 400A. If the VR mode is enabled through the manual method, the method proceeds to step 1303-2 where a manual button on the handheld device may be pressed or detected to be selected for setting the VR mode on the handheld device 400A. After setting the VR mode on the handheld device 400A, either at step 1303-1 or at step 1303-2, the method proceeds to step 1304 to capture the graphic data and the touch coordinates on current active screen of the handheld device 400A. At step 1305, the graphic data information along with the mapped application identifier in saved in the device database 406. After the graphic data information and the touch coordinates are provided to the device processing unit 404, at step 1306, the graphic information and the touch coordinates are provided to the VR device 400B to be displayed thereupon. The screen information of the active screen of the handheld device 400A is displayed as the primary screen upon the VR display 411 of the VR device 400B, at step 1307-1. In case background screens information as secondary screens(s) is displayed in the VR display 411 of the VR device 400B, at step 1307-2, where steps 1307-1 and 1307-2 may be performed simultaneously. In accordance with an embodiment, the 360 degree visual space of the VR display 411 may be utilized to display the secondary screens. At step 1308, the process continues to show effect of operations done on the active screens of the handheld device 400A.

Figure 14:
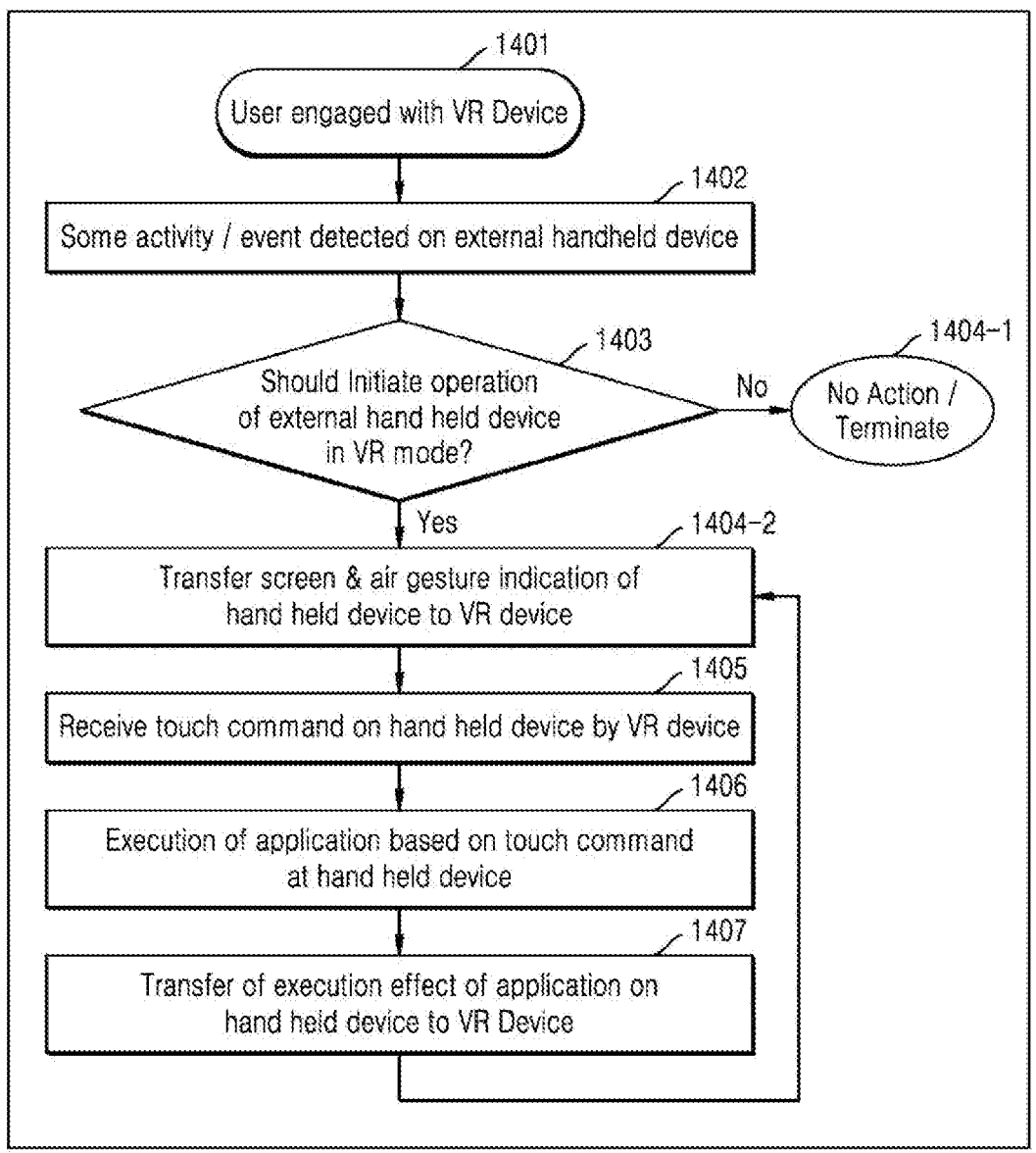
FIG. 14 illustrates a flowchart of a method of initiating a VR mode on a handheld device based on detection of a pre-defined event, according to an embodiment.

FIG. 14 illustrates a flowchart of a method of initiating a VR mode on a handheld device based on detection of a pre-defined event, according to an embodiment. The handheld device 400A is represented as the 'external visual display device' in the FIG. 14. The method begins at step 1401, when the user starts VR by the VR device 400B. At step 1402, some activity/event such as a pre-defined event explained in relation to the above described embodiments of automatic method of detection of the VR mode on the and the handheld device 400A, may be detected on the handheld device 400A. At step 1403, the event detection module (for example the event detection module 104 referred to in FIG. 1) may check if the VR mode should be initiate on the handheld device 400A based on the event detected in step 1402. In case the decision is no, the method proceeds to step 1404-1 where the process terminates, i.e., no action is required to be taken regarding setting of the VR mode. In case the decision taken at step 1403 to initiate VR mode on the handheld device 400A based on the event detected in step 1402 is affirmative, the method proceeds to step 1404-2 where the screen information is transferred to the VR device 400B. Also, since the enablement of VR mode may convert the interaction mechanism of the handheld device 400A from the first interaction mechanism to the second interaction mechanism, air hover gesture indication may be transferred as the required position information of the input means to the handheld device 400A, along with the screen information to the VR device at step 1404-2. At step 1405, a touch command is received on the handheld device 400A as an input command where the touch command may be a click event forming a part of set of second input receiving mechanism activated due to the VR mode being enabled on the handheld device 400A. Based on the touch command received at step 1405, a current active application on the handheld device may be executed at step 1406 by the application manager (for example the application controller 405) of the handheld device 400A. At step 1407, the effect of the executed application on the handheld device 400A is continued to be transferred to the VR device 400B.

Figure 15:
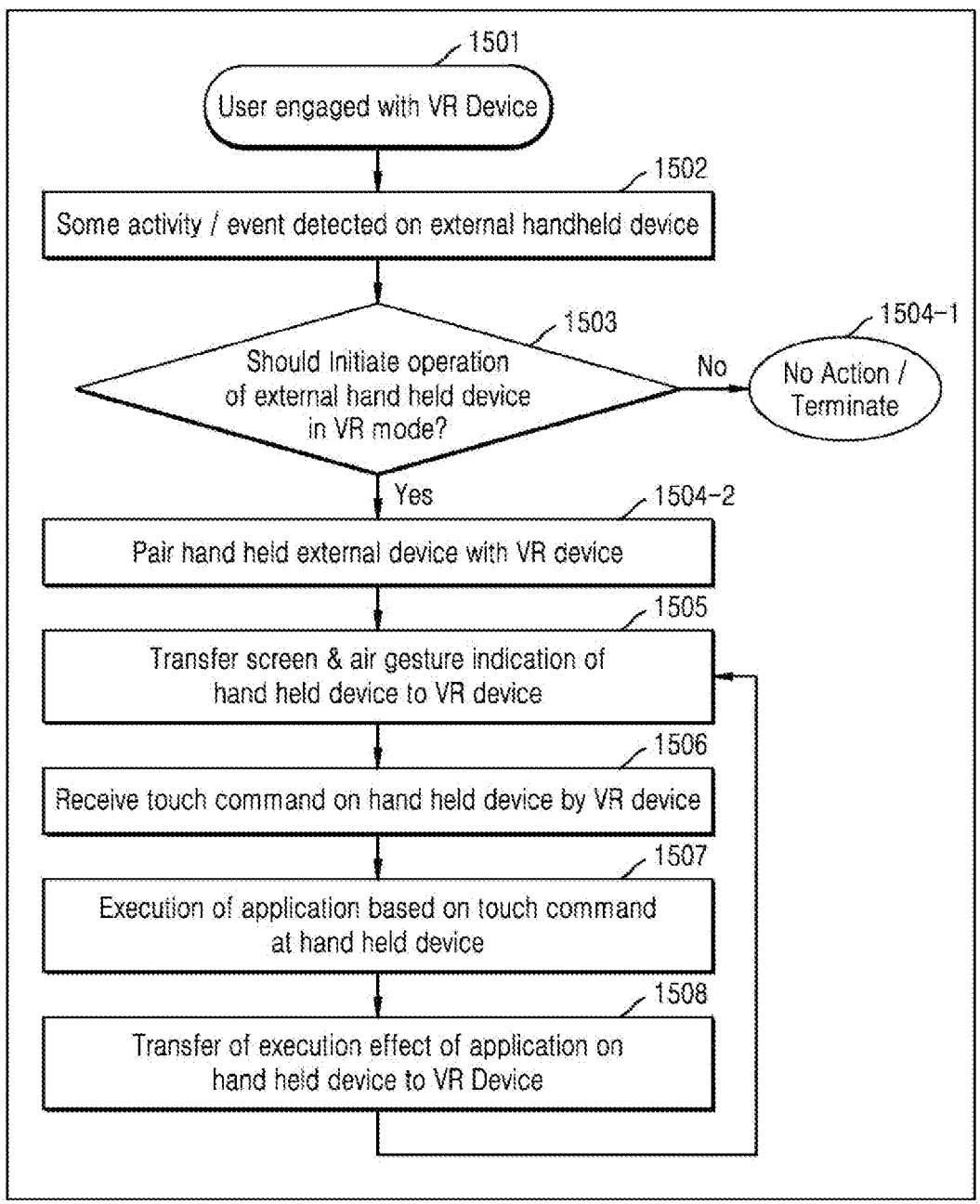
FIG. 15 illustrates a flowchart of a method of initiating a VR mode on a handheld device, according to an embodiment.

FIG. 15 illustrates a flowchart of a method of initiating a VR mode on a handheld device, according to an embodiment. The handheld device 400A is represented as the 'external visual display device' in the FIG. 15. The method begins at step 1501 when a user is in a VR experience using the VR device 400B. At step 1502, some activity/event such as a pre-defined event explained in relation to the above described embodiments of automatic method of detection of the VR mode on the handheld device 400A, may be detected on the handheld device 400A. At step 1503, the event detection module (for example the event detection module 104 referred to in FIG. 1) may check if the VR mode should be initiate on the handheld device 400A based on the event detected in step 1502. In case the decision is no, the method proceeds to step 1504-1 where the process terminates, i.e., no action is required to be taken regarding setting of the VR mode. In case the decision taken at step 1503 to initiate VR mode on the handheld device 400A based on the event detected in step 1502 is affirmative, the method proceeds to step 1504-2 where the handheld device 400A is paired with the VR device 400B. At step 1505, the screen information is transferred to the VR device 400B. Also, since the enablement of VR mode may convert the interaction mechanism of the handheld device 400A from the first interaction mechanism to the second interaction mechanism, air hover gesture indication may be transferred as the required position information of the input means to the handheld device 400A, along with the screen information to the VR device at step 1505. At step 1506, a touch command is received on the handheld device 400A as an input command where the touch command may be a click event forming a part of set of second input receiving mechanism activated due to the VR mode being enabled on the handheld device 400A. Based on the touch command received at step 1506, a current active application on the handheld device may be executed at step 1507 by the application manager (for example the application controller 405) of the handheld device 400A. At step 1508, the effect of the executed application on the handheld device 400A is continued to be transferred to the VR device 400B.

Figure 16:
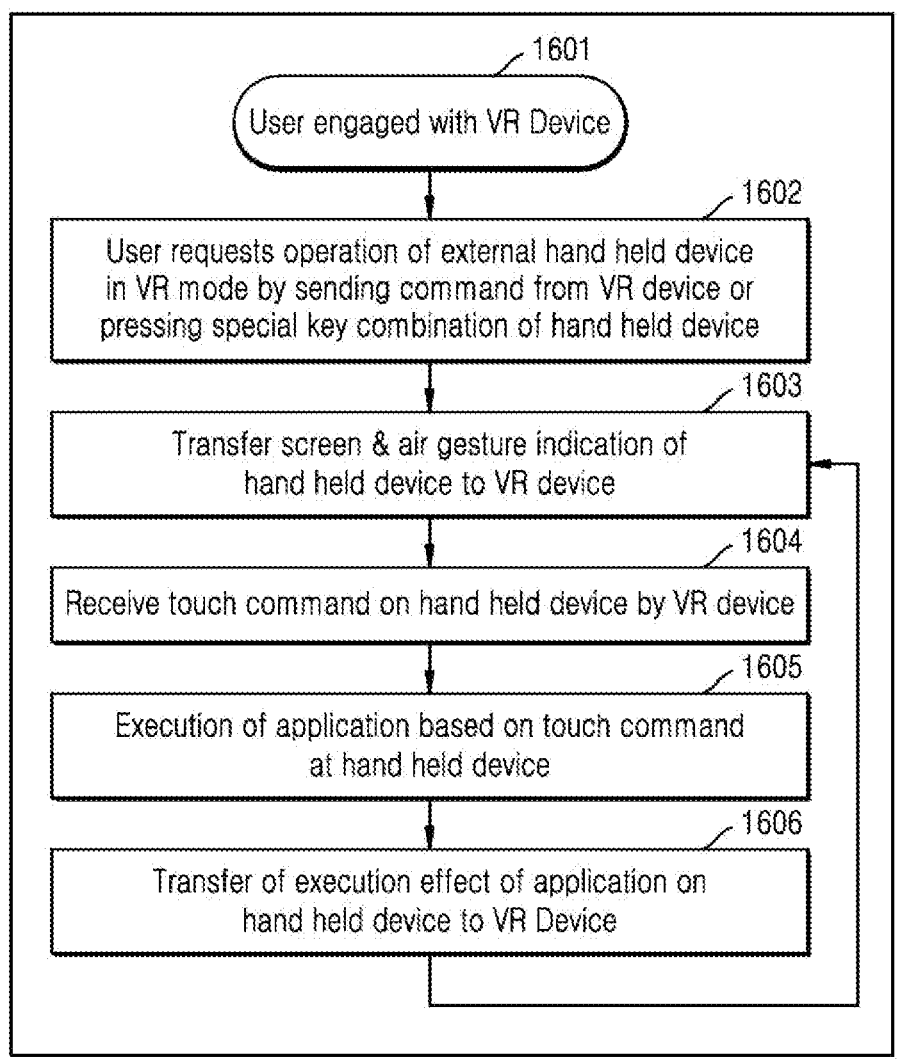
FIG. 16 illustrates a flowchart of a method of manually initiating a VR mode on a handheld device, according to an embodiment.

FIG. 16 illustrates a flowchart of a method of manually initiating a VR mode on a handheld device, according to an embodiment. The handheld device 400A is represented as the 'external visual display device' in the FIG. 16. The method begins at step 1601, when the user starts VR in the VR device 400B. At step 1602, the user requests operation of the handheld device 400A by enabling the VR mode on the handheld device 400A. This may be done in two ways. One way is to send a command from the VR device 400B by pressing some hard key button on the VR headset or the VR device 400B in-use. The second way is to providing a user input or selection of some special hard key combination of the handheld device 400A. Based on the user-input selection corresponding to a request to initiate VR mode on the handheld device 400A received in step 1602, the method proceeds to step 1603 where the screen information is transferred to the VR device 400B. Also, since the enablement of VR mode may convert the interaction mechanism of the handheld device 400A from the first interaction mechanism to the second interaction mechanism, air hover gesture indication may be transferred as the required position information of the input means to the handheld device 400A, along with the screen information to the VR device at step 1603. At step 1604, a touch command is received on the handheld device 400A as an input command where the touch command may be a click event forming a part of set of second input receiving mechanism activated due to the VR mode being enabled on the handheld device 400A. Based on the touch command received at step 1604, a current active application on the handheld device may be executed at step 1605 by the application manager (for example the application controller 405) of the handheld device 400A. At step 1606, the effect of the executed application on the handheld device 400A is continued to be transferred to the VR device 400B.

Figure 17:
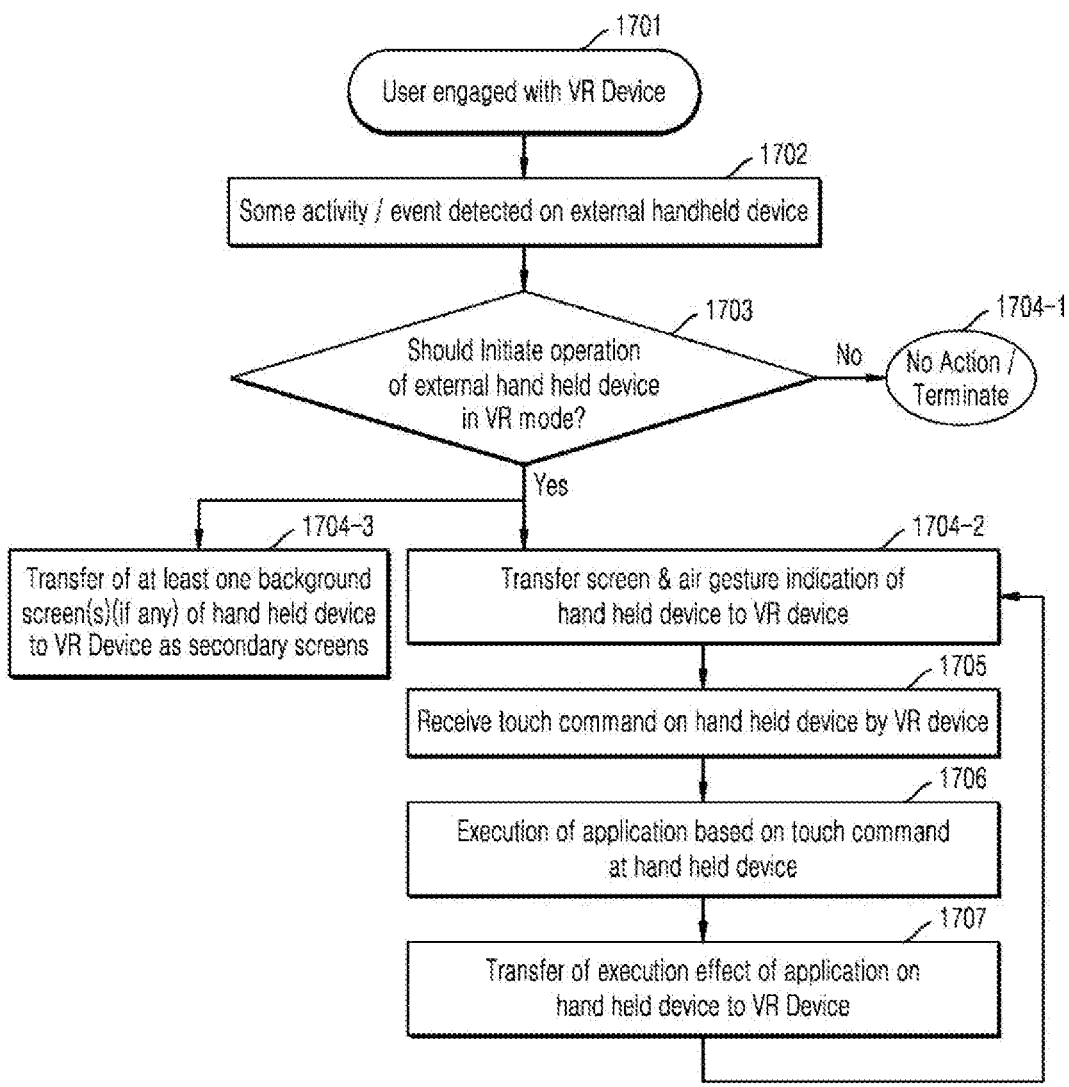
FIG. 17 illustrates a flowchart of a method of displaying of active screen information along with background screen information in VR, according to an embodiment.

FIG. 17 illustrates a flowchart of a method of displaying of active screen information along with background screen information in a VR mode, according to an embodiment. Accordingly, primary screen and secondary screens(s) may be displayed on the VR display 411 of the VR device 400B, according to an embodiment. According to one implementation, the VR display may include a 360 degree visual space available for displaying contents. The handheld device 400A is represented as the 'external visual display device' in the FIG. 17. The method begins at step 1701 when a user is a VR using the VR device 400B. At step 1702, some activity/event such as a pre-defined event explained in relation to the above described embodiments of automatic method of detection of the VR mode on the handheld device 400A, may be detected on the handheld device 400A. At step 1703, the event detection module (for example the event detection module 104 referred to in FIG. 1) may check if the VR mode should be initiate on the handheld device 400A based on the event detected in step 1502. In case the decision is no, the method proceeds to step 1704-1 where the process terminates, i.e., no action is required to be taken regarding setting of the VR mode. In case the decision taken at step 1703 to initiate VR mode on the handheld device 400A based on the event detected in step 1702 is affirmative, the method proceeds to step 1704-2 and step 1704-3 where at step 1704-2, the current screen information and indicative of air gesture of the handheld device 400A is transferred to the VR device as primary screen information, and at step 1704-4, at least one background screen information (if any) running on the handheld device 400A is transferred to the VR device as secondary screen(s) information. The steps 1704-2 and 1704-3 may be simultaneously performed during the process of transferring. At step 1705, a touch command is received on the handheld device 400A as an input command where the touch command may be a click event forming a part of set of second input receiving mechanism activated due to the VR mode being enabled on the handheld device 400A. Based on the touch command received at step 1705, a current active application on the handheld device may be executed at step 1706 by the application manager (for example the application controller 405) of the handheld device 400A. At step 1707, the effect of the executed current active application on the handheld device 400A is continued to be transferred as the primary screen to the VR device 400B.

The foregoing description describes some of the use-cases of implementation of the above disclosed methods in FIG. 18-31 on the handheld device 400A and the VR device 400B.

Figure 18A:
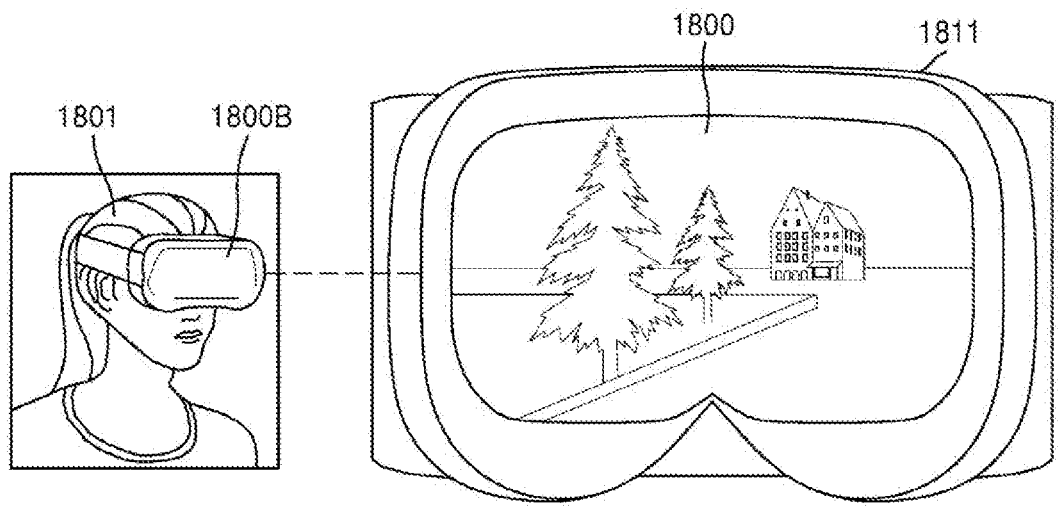
FIGS. 18A, 18B, 18C and 18D illustrate an example use-case of initiating a VR mode on a handheld device without looking at a screen of the handheld device, according to an embodiment.
Figure 18B:
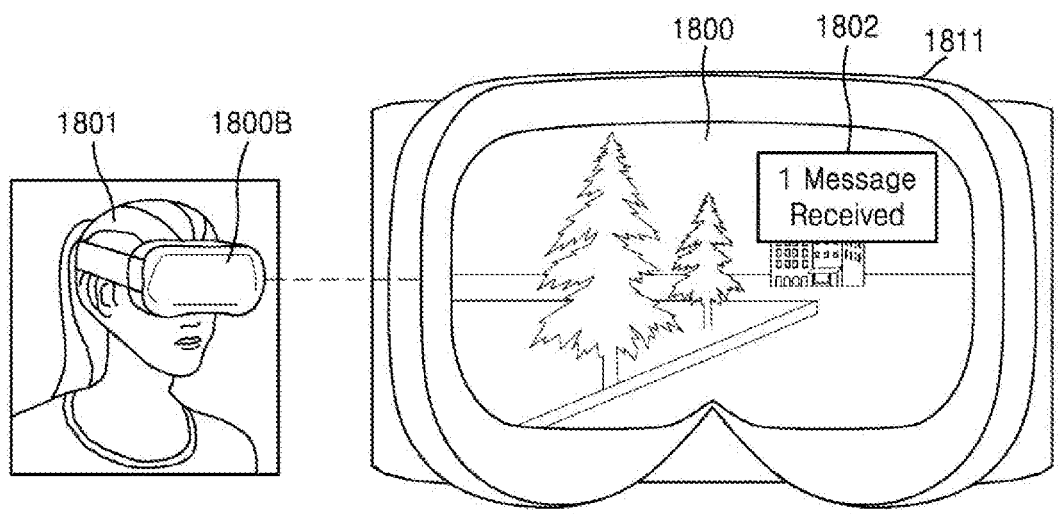
Figure 18C:
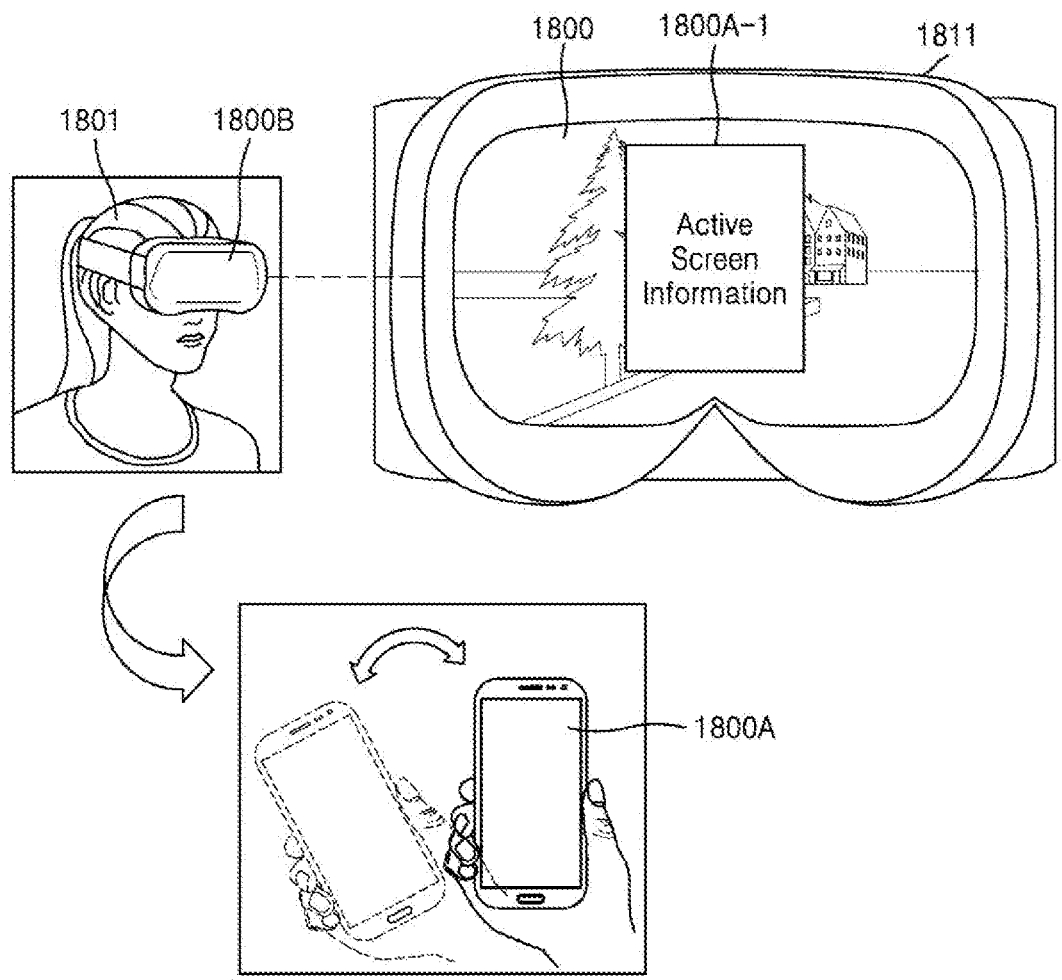

FIGS. 18A, 18B, 18C and 18D illustrate an example use-case of initiating a VR mode on a handheld device without looking at a screen of the handheld device, according to an embodiment. As illustrated in FIG. 18, a user 1801 wearing a VR headset 1800B is viewing a VR 1800 displayed on a VR display 1811. Initially, the user is immersed in his VR represented by FIG. 18A. Further, as represented in FIG. 18B, while viewing the VR 1801, the user receives a message notification on his handheld device where such message notification 1802 is displayed within the VR 1811 on the VR display 1811. To view the screen of his handheld device and operate the same in the VR, the user initiates the VR mode on his handheld device without looking at the screen of his handheld device. The same is represented in FIG. 18C where 1800A represents the handheld device of the user. By way of an example to automatically initiate the VR mode on the handheld device 1800A, the user may shake his handheld device 1800A where the motion sensor(s) of the handheld device 1800A may detected such input and perform a corresponding action of enabling the VR mode on the handheld device 1800A. Due to initiation of the VR mode on the handheld device 1800A, the active screen information 1800A-1 of the handheld device 1800 is displayed on the VR display 1811 within the VR 1800. The same is represented in FIG. 18C.

Figure 18D:
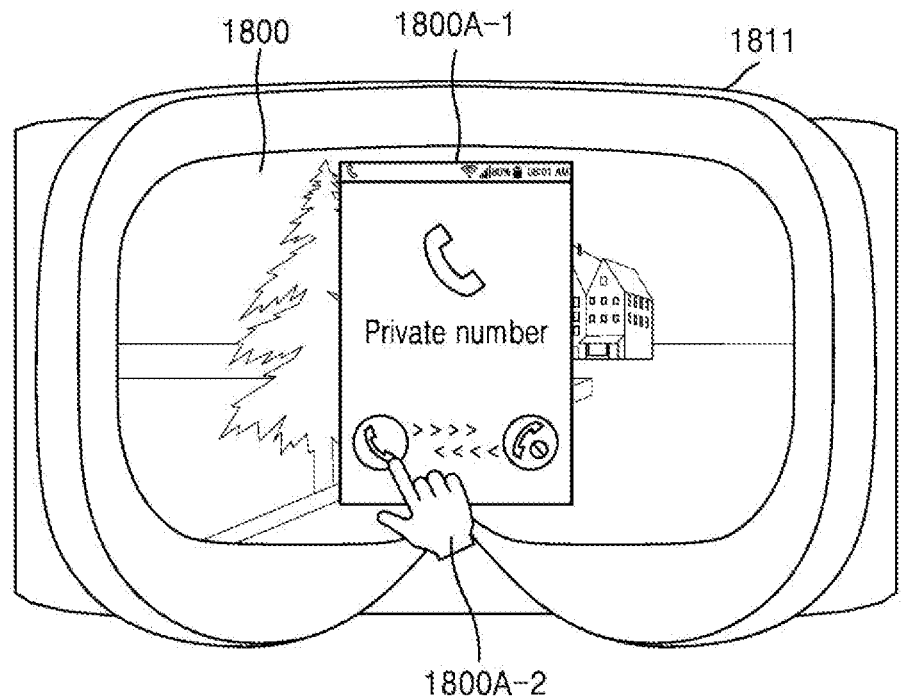

Further, as shown in FIG. 18D, along with the active screen information, a visual indicator such as a finger pointer 1800A-2 may also be displayed in the VR display 1811, where the finger pointer 1800A-2 is the position information of the input means given by the touch coordinates on the screen of the handheld device. As represented in FIG. 18D, an active screen of the handheld device may include an incoming call on the screen of the handheld device where the active screen information 1800A-1 displayed in the VR 1800 may include such screen and also the position of the finger mapped to the actual position of the finger on the screen of the handheld device is also displayed in the VR 1800, as finger pointer 1800A-2. Thus, a user is able to view the active screen on his handheld device in the VR 1800 as well as operate it. Even when the call is connected, the effect of the executed application is continued to be provided to the VR device 1800B to be displayed upon the VR display 1811.

Figure 19A:
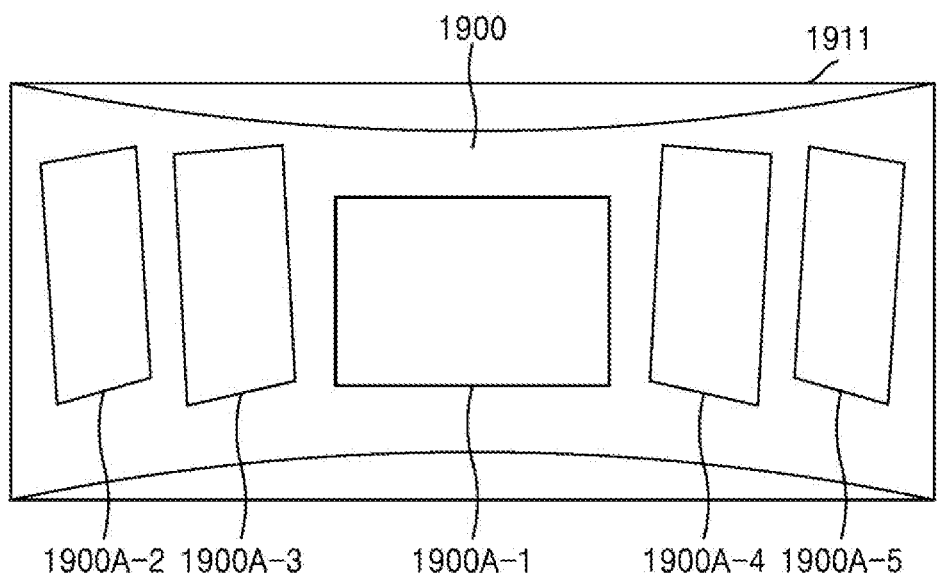
FIGS. 19A, 19B, 19C and 19D illustrate an example use-case of scaling a normal view of shared screen information of a handheld device in a VR, according to an embodiment.
Figure 19B:
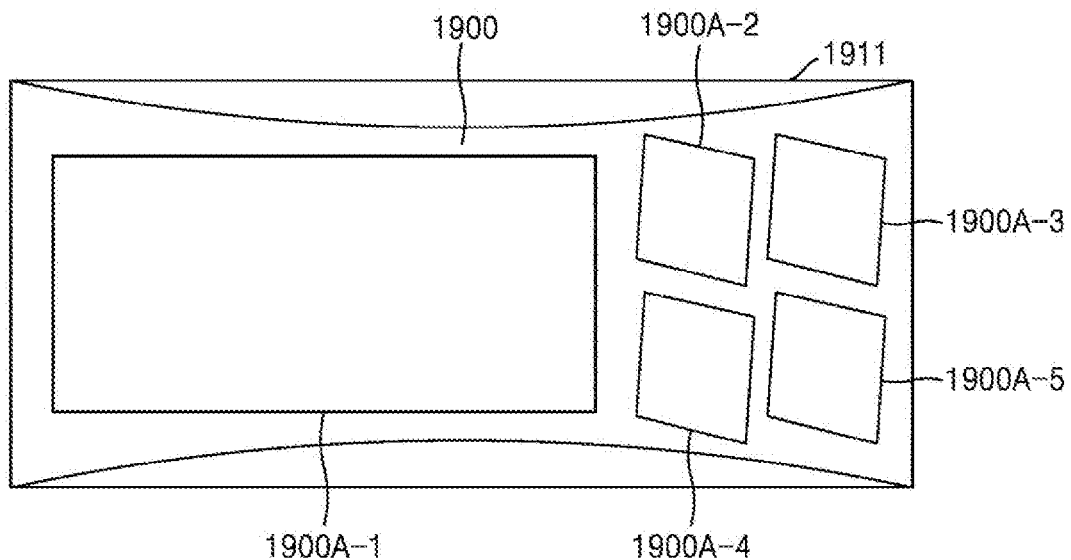
Figure 19C:
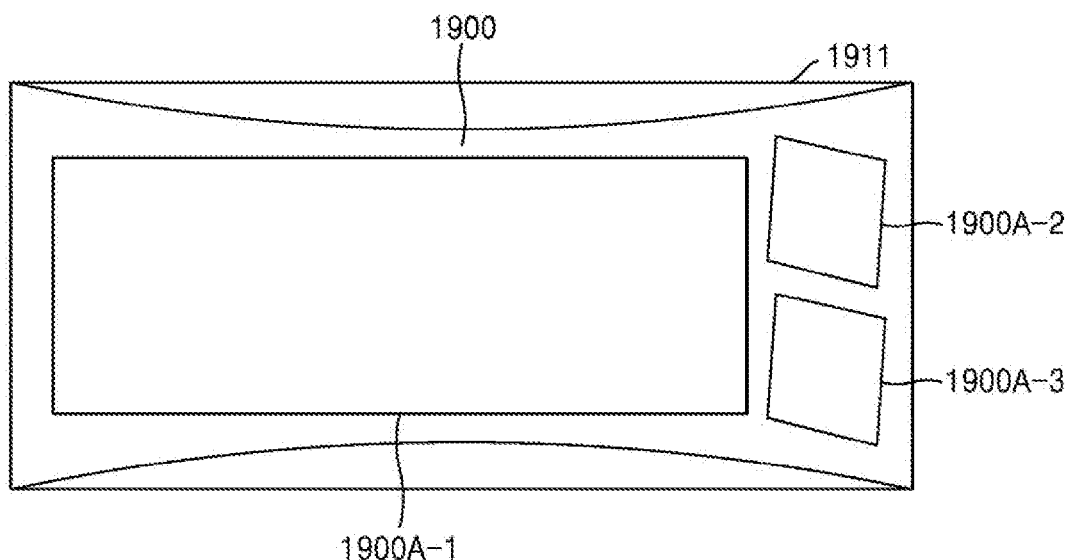
Figure 19D:
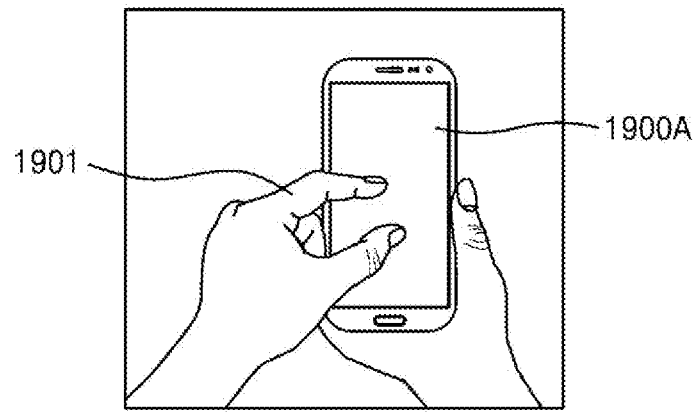

FIGS. 19A, 19B, 19C and 19D illustrate an example use-case of scaling a normal view of shared screen information of a handheld device in a VR mode, according to an embodiment. By way of an example, a pinch and zoom type user-input may be received on the handheld device during the second input receiving mechanism activated on the handheld device when the VR mode is enabled. The pinch-and zoom type input may be used to zoom out into a bigger view of a current screen displayed in the VR. As illustrated in FIG. 19A, normal scaled views of a primary screen 1900A-1 and secondary screens 1900A-2, 1900A-3, 1900A-4, 1900A-5 are displayed in a VR on a VR display 1911. Based on a pinch and a zoom type user input received on a user's handheld device 1900A when enabled in VR mode, where the user's handheld device 1900A is in connection to the VR device providing the VR display 1911, a scaling of the view displayed in FIG. 19A to a larger view may be performed according to the representation illustrated in FIG. 19B, or to a yet extra-large view may be performed according to a representation illustrated in FIG. 19C. The views of the secondary screens may be removed from the VR display area 1900 based on the display area of the view of the larger scaled primary screen.

Figure 20A:
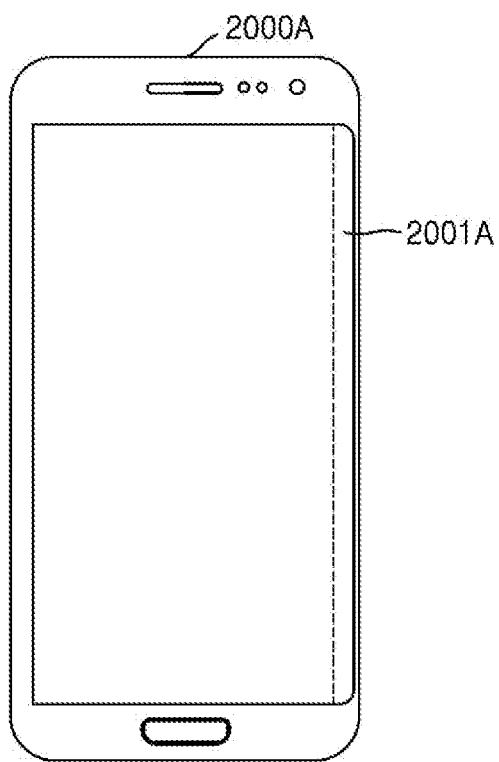
FIGS. 20A, 20B, 20C and 20D illustrate an example use-case of displaying a tool bar including one or more applications of a handheld device in a VR, and receiving an input-command in relation to selection of an application from the tool bar of the handheld device, according to an embodiment.
Figure 20B:
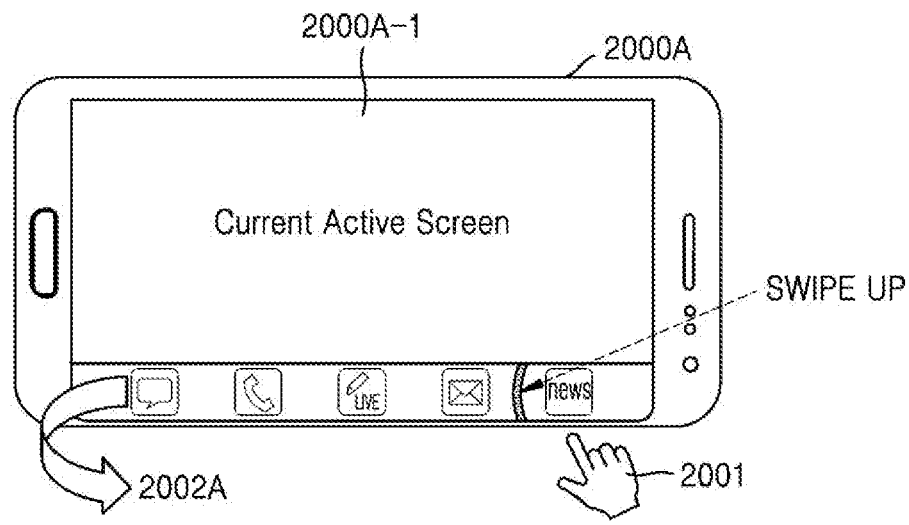

FIGS. 20A, 20B, 20C and 20D illustrate an example use-case of displaying a tool bar including one or more applications of a handheld device in a VR mode, and receiving an input-command in relation to selection of an application from the tool bar of the handheld device, according to an embodiment. The toolbar may be referred to as 'easy-access bar' including one or more applications in the VR where the one or more applications in the easy-access bar may receive user-selection to be displayed as a primary screen in the VR. By way of an example, the user-input corresponding to a selection of an application from the easy access bar in the VR may be performed on the handheld device in a bezel-less area, or edges of a screen of the handheld device. Such user-input may include a swipe event on the handheld device. As illustrated in FIG. 20A, a hand-held device 2000A is shown which may include a bezel-less side panel 2001A. Further, FIG. 20B represents an application panel 2002A which corresponds to an easy access bar when displayed in the VR. In order to provide touch-command to execute any of the applications from the easy access bar explained above, the user may perform a swipe event either in the bezel-less panel 2001A as shown in FIG. 20A or perform a swipe-up event from the bottom edges area of the screen 2000A-1 as shown in FIG. 20B where the edge area includes the application panel 2002A. Further, as represented in FIG. 20B a user-input 2001 may be performed as a swipe event with respect to an application in the application panel 2002A to view that application as a primary screen in the VR.

Figure 20C:
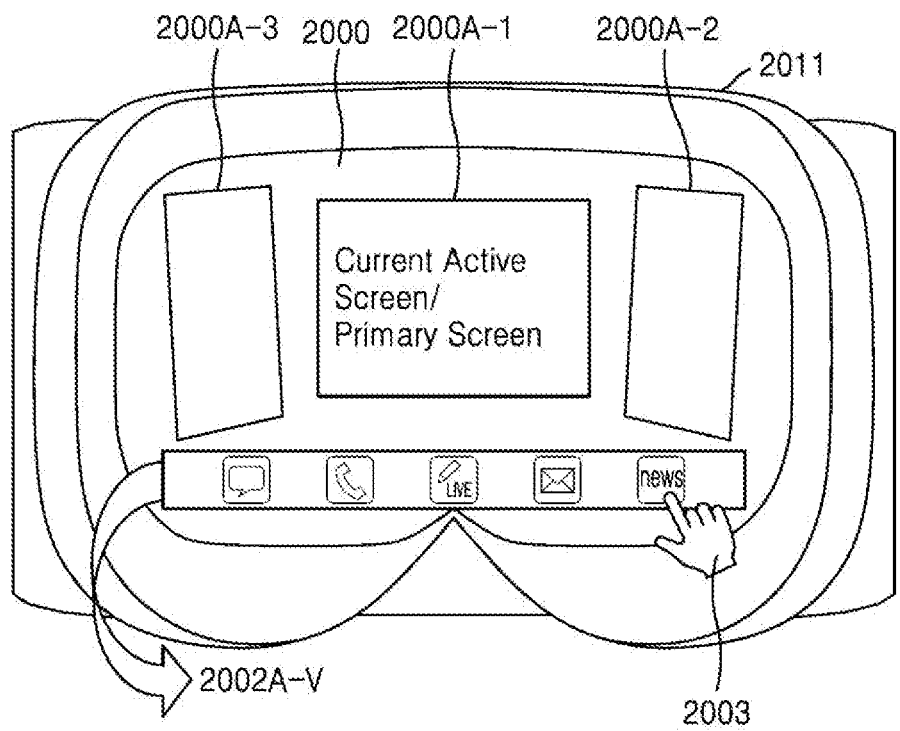
Figure 20D:
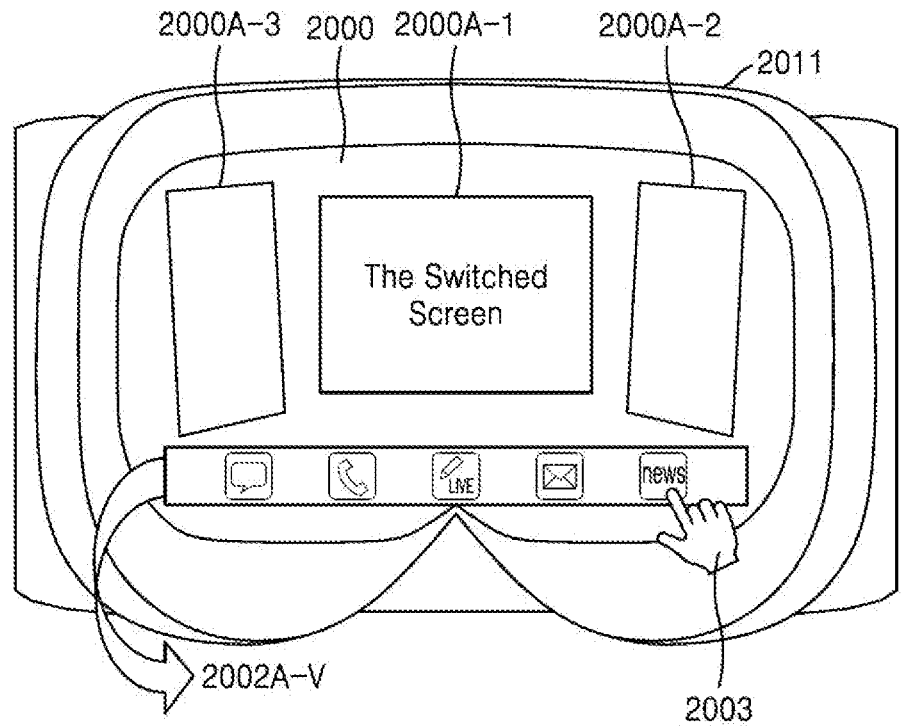

FIG. 20C represents a VR display 2011 of a VR device connected to the handheld device 2000A. The easy access bar is represented as 2002A-V which is displayed in the bottom most region of the VR 2000 displayed on the VR display 2011. The visual indicator shown as a finger pointer 2003 is also displayed in the VR 2000 to allow user to see the movement of the input means (finger position) on the screen of the handheld device 2000A and operate the handheld device 2000A in the VR 2000. As may be seen from FIG. 20B, the actual finger position 2001 of the user on the screen of the handheld device 2000A is upon an icon of a 'news application' in the application panel 2002A. Accordingly, when viewed in the VR 2000 upon the VR display 2011, the visual indicator 2003 is also displayed upon the icon of a 'news application' in the easy access bar 2002A-V. Initially, as represented in FIG. 20C, a current active screen/primary screen 2000A-1 and secondary screens 2000A-2 and 2000A-3 are displayed in the VR 2000. If the swipe-up event corresponding to the icon of the 'news application' is performed on the handheld device 2000A, then the 'news application' may replace the primary screen 2000A shown in the FIG. 20C with the 'switched screen'. Thus the new primary screen 2000A-1 shown in FIG. 20D after performing the swipe-up event on the handheld device 2000A, is the 'switched screen'.

FIG. 20C represents a VR display 2011 of a VR device connected to the handheld device 2000A. The easy access bar is represented as 2002A-V which is displayed in the bottom region of the VR 2000 displayed on the VR display 2011. The visual indicator shown as a finger pointer 2003 is also displayed in the VR 2000 to allow user to see the movement of the input means (finger position) on the screen of the handheld device 2000A and operate the handheld device 2000A in the VR 2000. As may be seen from FIG. 20B, the actual finger position 2001 of the user on the screen of the handheld device 2000A is upon an icon of a 'news application' in the application panel 2002A. Accordingly, when viewed in the VR 2000 upon the VR display 2011, the visual indicator 2003 is also upon the icon of a 'news application' in the easy access bar 2002A-V. Initially, as represented in FIG. 20C, a current active screen/primary screen 2000A-1 along with secondary screens 2000A-2 and 2000A-3 are displayed in the VR 2000. If the swipe-up event corresponding to the icon of the 'news application' is performed on the handheld device 2000A, then the 'news application' may be displayed in the primary screen 2000A shown in the FIG. 20C as the 'switched screen'. Thus the new primary screen 2000A-1 shown in FIG. 20D after performing the swipe-up event on the handheld device 2000A is the 'switched screen'.

Figure 21A:
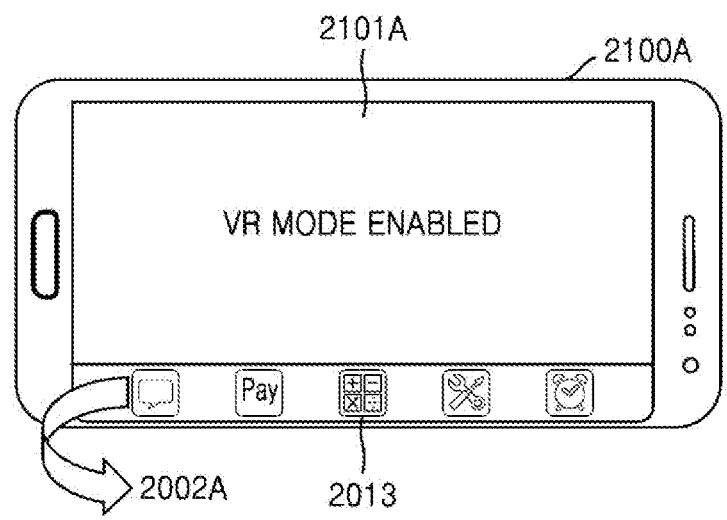
FIGS. 21A, 21B, 21C and 21D illustrate an example use-case of displaying related applications in a VR, according to an embodiment.
Figure 21B:
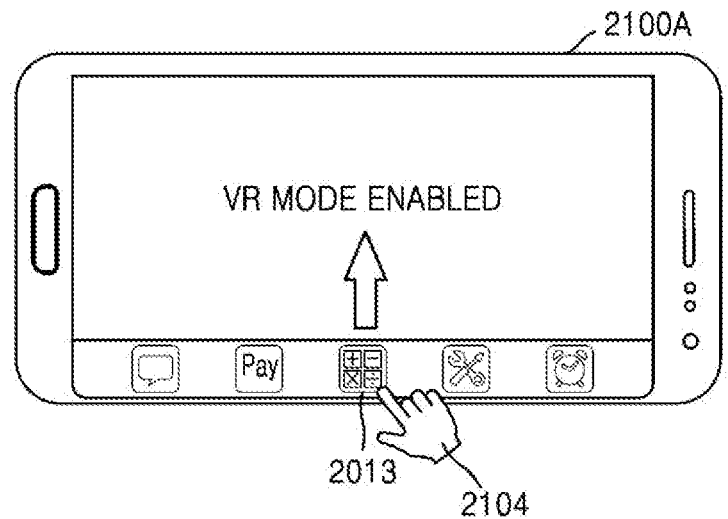

FIGS. 21A, 21B, 21C and 21D illustrate an example use-case of displaying related applications in a VR mode, according to an embodiment. As illustrated in FIG. 21A, a handheld device 2100A is illustrated on which VR mode is enabled and which depicts a screen 2101A according to the VR mode configurations on the handheld device 2100A. The screen 2101A may include an application panel 2102A (may not be visually appearing in the VR but have been illustrated for explanation purposes). By way of an example, the application panel 2102A may include applications related to a 'payment application' since the user had been last using a payment application in the VR. A related application to the payment application may be a 'calculator application' 2103. In case of using the payment application in the VR, based on a swipe up event, as represented in FIG. 21B, using input means 2104 (his fingers), corresponding calculator application may be shown together in the application panel 2102A. Other corresponding (related) applications may be displayed in the application panel 2102A.

Figure 21C:
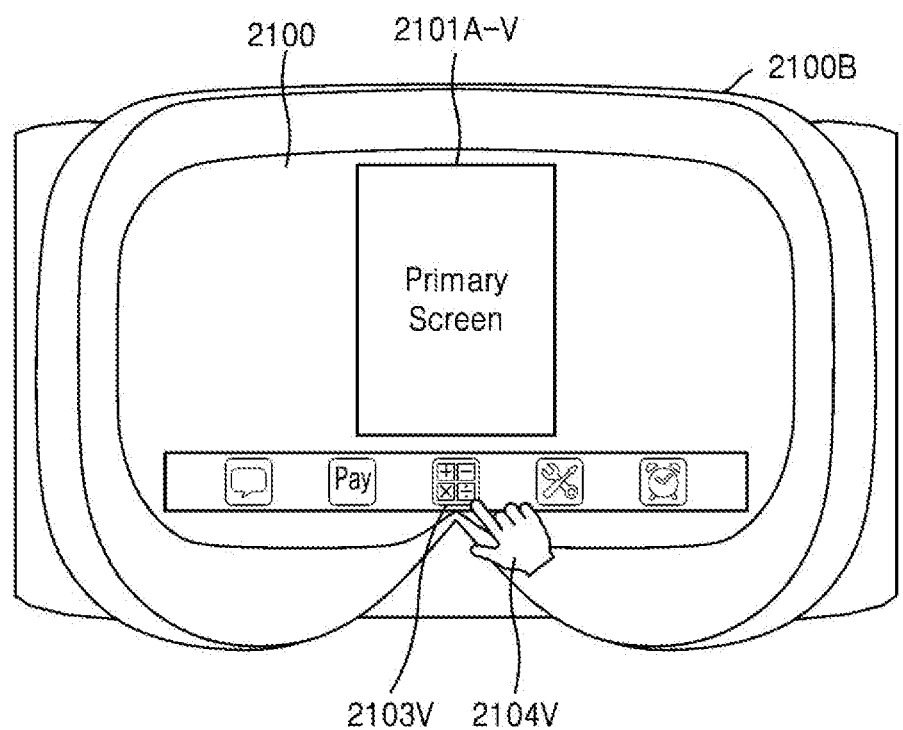
Figure 21D:
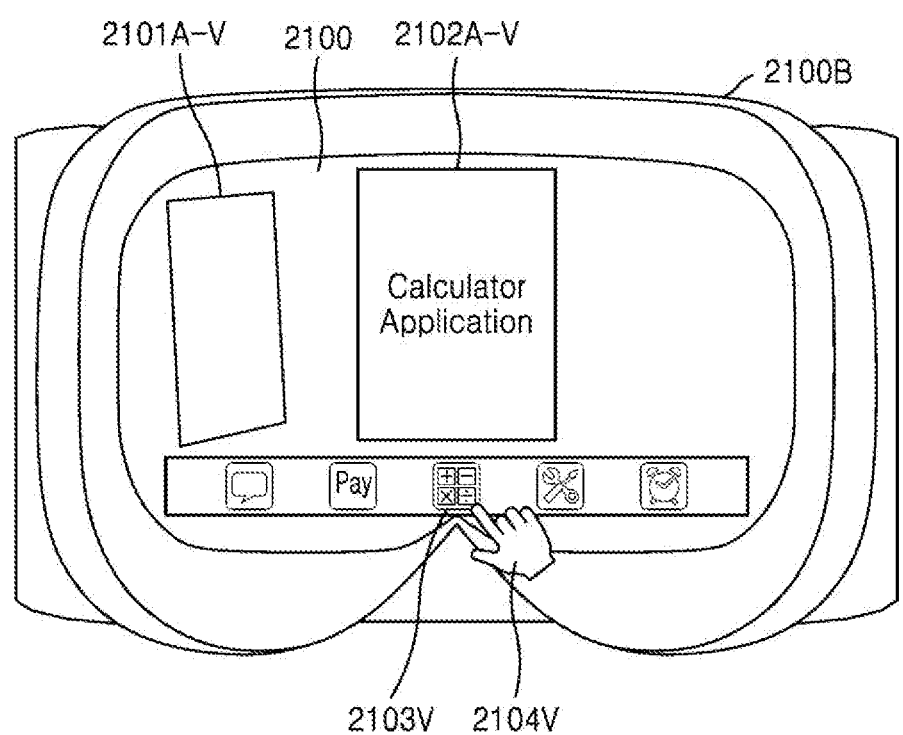

FIG. 21C represents an initial primary screen 2101A-V displayed as a primary screen in the VR 2100 provided on a VR display of a VR device 2100B in-connection to the handheld device 2100A when in VR mode. The same screen information is displayed in the VR 2100 that includes visual indicator upon the calculator application 2103V as the user performs an actual swipe-up event corresponding to the calculator application 2103 on the handheld device 2100A, as represented in FIG. 21B. After receiving the swipe-up event on the handheld device 2100A, the calculator application becomes the primary screen view 2102A-V, as represented in FIG. 21D. Also, the initial primary screen 2101A now becomes the secondary screen view in the VR 2100 as shown in FIG. 21D.

Figure 22:
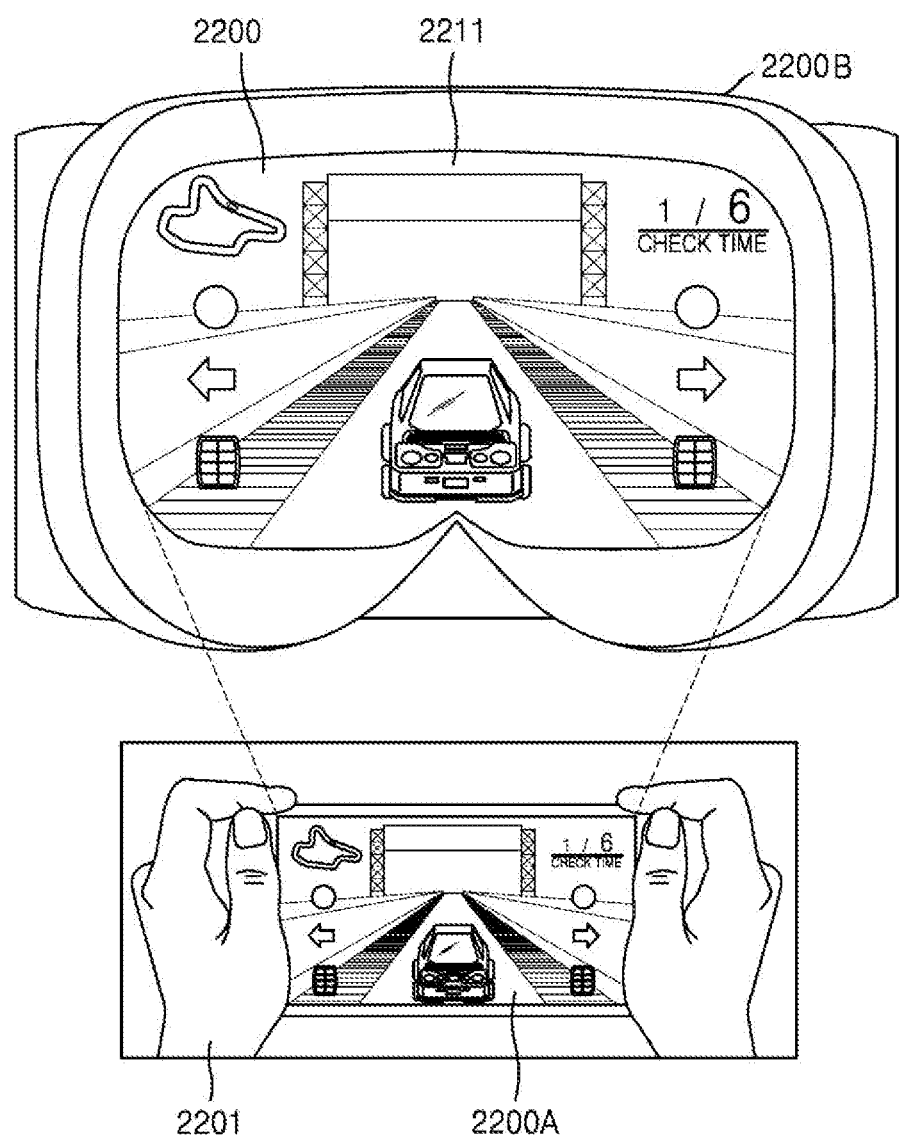
FIG. 22 illustrates an example use-case of synchronizing a handheld device's screen orientation and resolution with a VR device, according to an embodiment.

FIG. 22 illustrates an example use-case of synchronizing a handheld device's screen orientation and resolution with a VR device, according to an embodiment. By way of an example, a gaming experience of a user may be enhanced using the large display area on a VR display and effectively using the sensors of the handheld device, for e.g., a mobile device. Also, while playing the game, other applications of the mobile device may also be accessed by the user in the VR. According to an embodiment, information regarding the resolution and orientation of the handheld device is shared with the VR device and based on the shared information the view for the screen of the handheld device to be displayed in the VR is created.

As illustrated in FIG. 22, a user 2201 is seen playing a game using a gaming application on his mobile device 2200A and able to view the screen of the gaming application in the large display area of the VR display 2211 of the VR device 2200B. The resolution and orientation of the current screen of the gaming application running on the mobile device 2200A is shared with the VR device 2200B connected to the mobile device 2200A, when VR mode is enabled on the mobile device 2200A. Based on the shared screen information, the view of the screen of the mobile device 2200A is created and displayed in the VR 2200 on the VR display 2211. Thus, a user may experience a real feeling of holding his mobile device to play the game in the VR.

Figure 23:
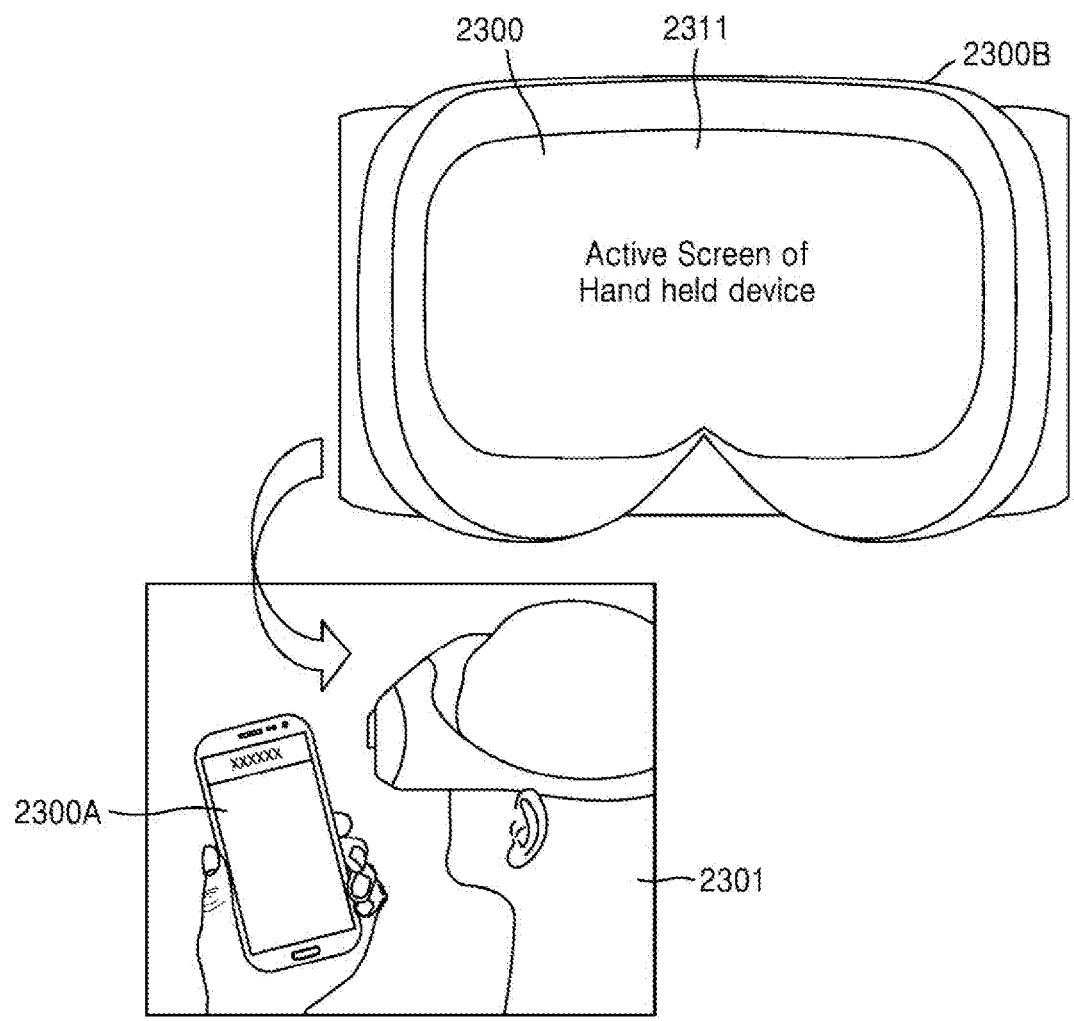
FIG. 23 illustrates an example use-case of enabling a privacy mode on a handheld device in relation to a VR mode, according to an embodiment.

FIG. 23 illustrates an example use-case of enabling a privacy mode on a handheld device in relation to a VR mode, according to an embodiment. According to this embodiment, the user may enable a privacy mode through the device setting configurations of his handheld device where the screen display of the handheld device is turned off whenever the VR mode is enabled on the handheld device. As a result, the screen of the handheld device appears as a black screen when connected to a VR device during the VR mode, and the user gets a privacy of viewing the content on the active screen of his handheld device. An example of the privacy mode may be seen in FIG. 23, where a user 2301 wearing a VR headset is operating his mobile device 2300A in the VR 2300 provided by the VR device 2300B, according to an embodiment. Due to the privacy mode being turned ON, the screen of the mobile device 2300A display nothing in the VR mode enabled on the mobile device 2300A, while the screen is visible on the VR display 2311 of the VR device 2300B.

Figure 24A:
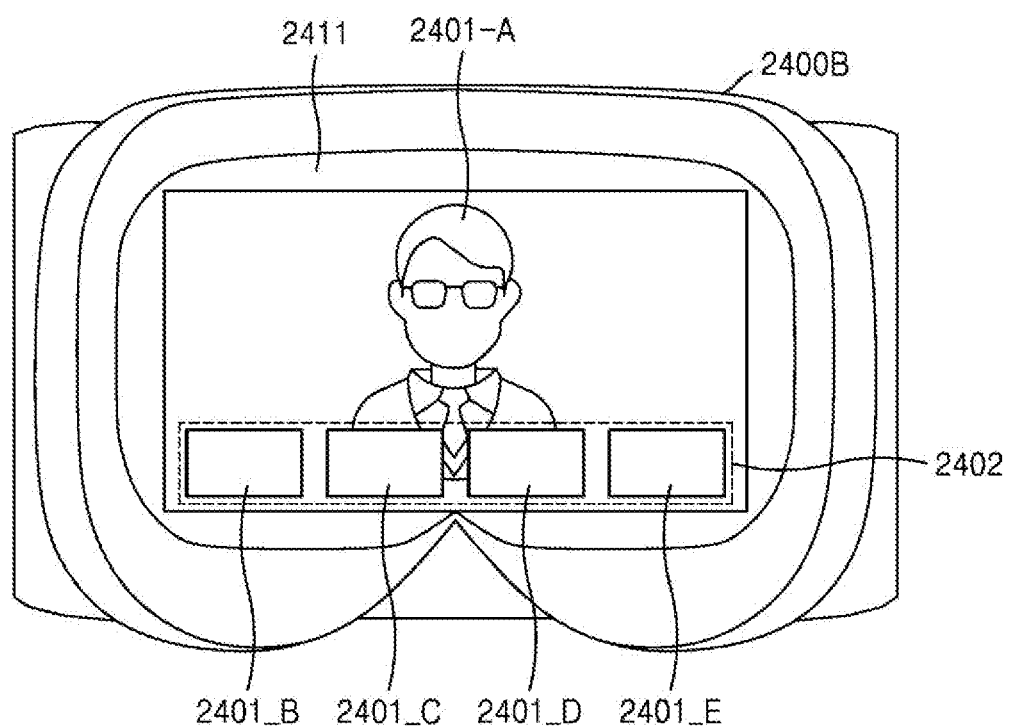
FIGS. 24A and 24B illustrate an example use-case of providing different types of user-interface (UI) options of a shared screen information from a handheld device in the VR, according to an embodiment.
Figure 24B:
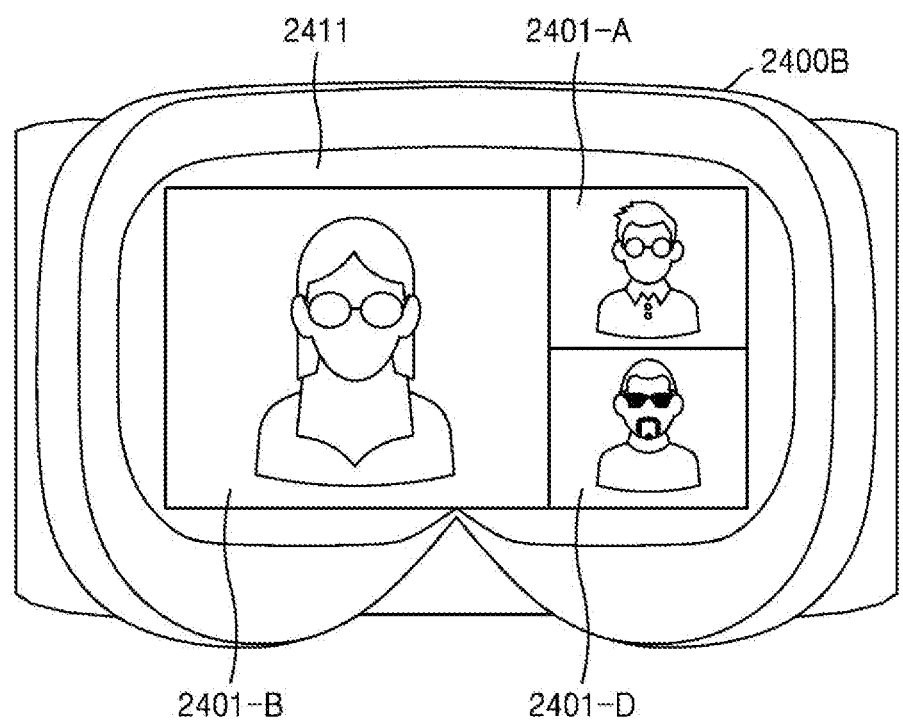

FIGS. 24A and 24B illustrate an example use-case of providing different types of user-interface (UI) options of shared screen information from a handheld device in the VR, according to an embodiment. By way of one example, a gallery application of a mobile device may show images with different types of UI, for example, different types of environment, available as options for viewing the images. By way of another example a mobile application may include dynamic UI options for viewing the application in the VR. One such example is shown in FIG. 24, where the UI may be dynamically changed in the VR from the normal application view based on a specific type of touch command received on the screen of the handheld device. For example, a drag type touch command may be received on the screen of the handheld device to drag a specific view in the VR to change the normal application view in the VR.

FIG. 24 illustrates view of a VR display 2411 of a VR device 2400B where initially normal application view '2401-A' is displayed as shown in FIG. 24A. '2401-1-B', '2401-C', '2401-D' and '2401-E' are the other views available in the current UI of the application displayed in the VR. A user may drag one of the views shown in VR by providing a drag option on the touch screen of his handheld device to change the normal application view. The drag option is represented in the VR as shown by the arrow marked 2402 representing a drag option. Based on receiving the drag type touch command on the handheld device of the user, the user interface including the views of the application may change as shown in FIG. 24B.

Figure 25A:
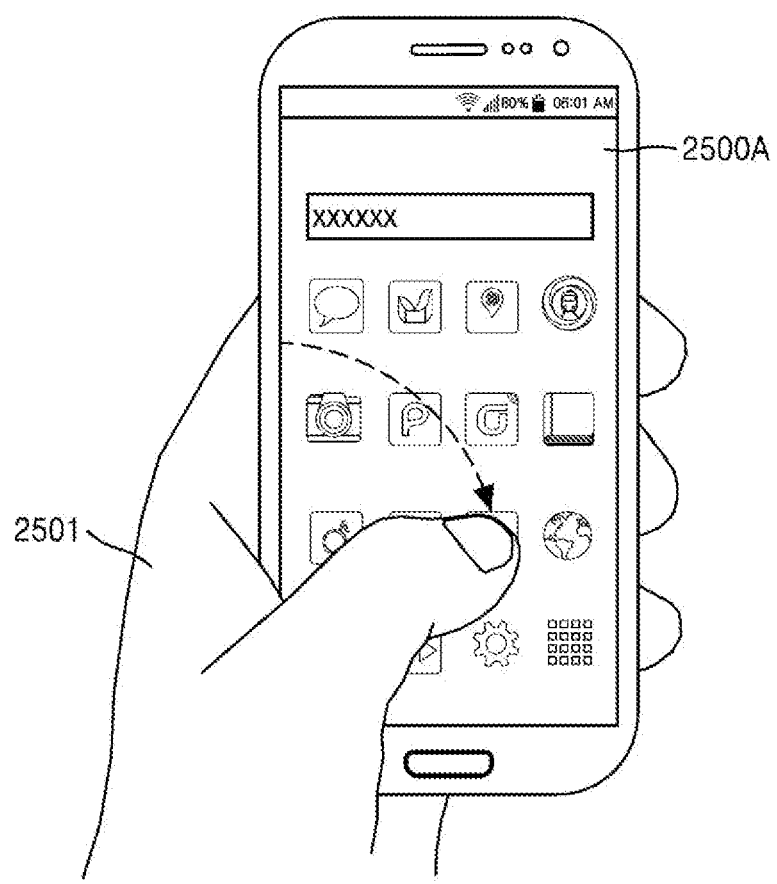
FIGS. 25A and 25B illustrate an example use-case of displaying a differently oriented view of a screen of a handheld device in a VR, according to an embodiment.
Figure 25B:
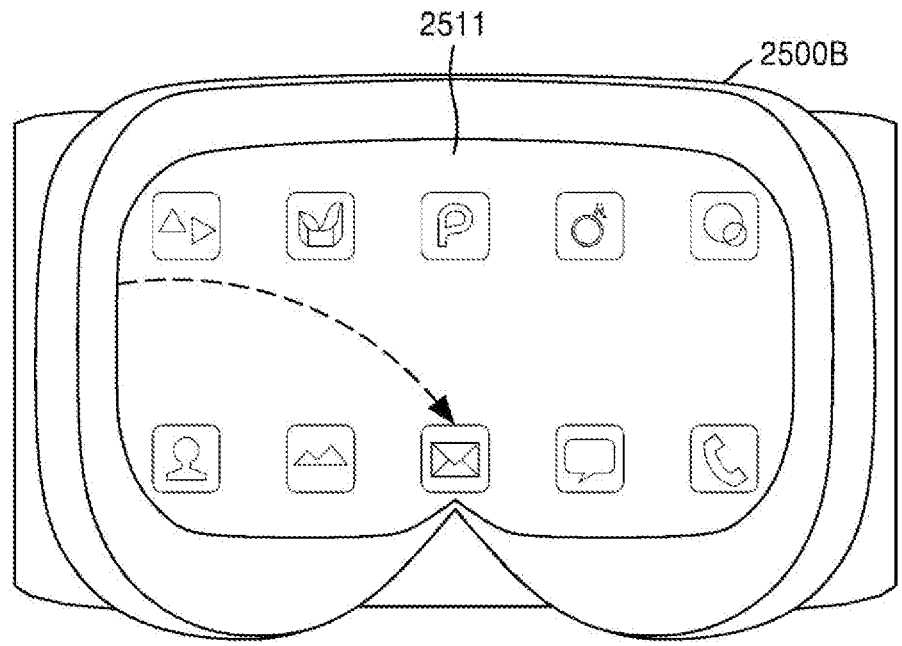

FIGS. 25A and 25B illustrate an example use-case of displaying a differently oriented view of a screen of a handheld device in a VR mode, according to an embodiment.

The orientation of the view specifically in the VR may be created for some applications which may be different from the orientation of view of the application on the screen of the handheld device. By way of an example, the larger view area of the VR display may be used to show a differently oriented view (for e.g., a landscape view) of the application when VR mode is enabled on the handheld device. The different or special VR view may result in better viewing. Further, a different interaction mechanism, i.e., the second interaction mechanism for the VR mode, may be used on the handheld device to interact with the application using the special view in the VR. This may also enhance the interaction experience of the user with the application in the VR. As seen in FIG. 25A, orientation of a view of an application as presented on the screen of a handheld device, i.e., mobile device 2500A, is in portrait mode. Whereas, the orientation of view of the shared screen of the mobile device 2500A, is in landscape mode when presented on the VR display 2511 of a VR device 2500B connected to the mobile device 2500A when the mobile device 2500A is in VR mode. Further, the user 2501 provides touch-input commands, for e.g. a finger drag type input (represented by a curved arrow over the screen of the mobile device 2500A) as applicable for the second interaction mechanism activated on the mobile device 2500A in VR mode, to interact with the application while viewing the same in the VR on the VR display 2511. Thus, the interaction experience of the user with the application when viewed in VR enhances.

Figure 26A:
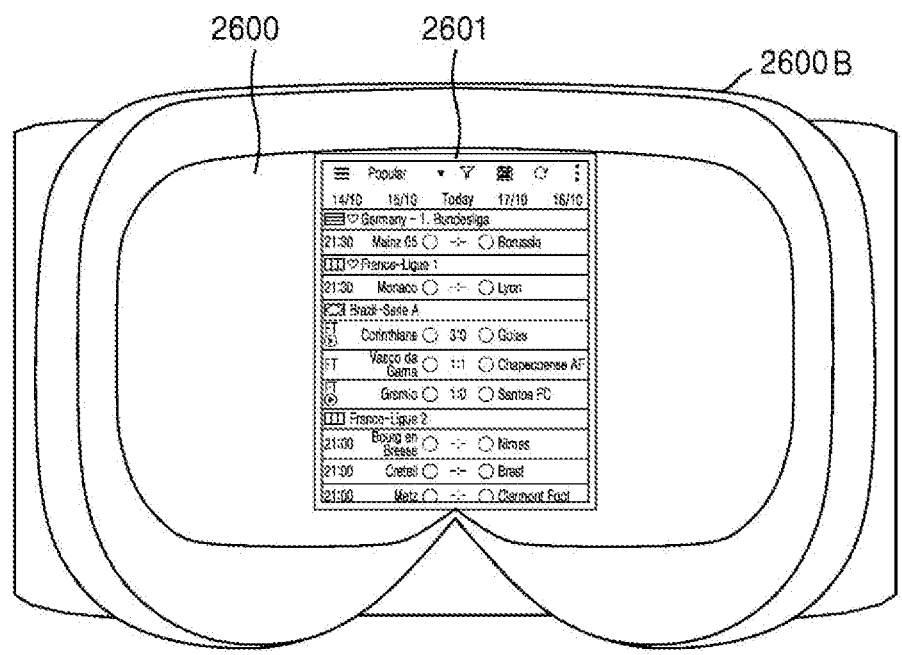
FIGS. 26A, 26B and 26C illustrate an example use-case of displaying a selected portion of a dynamic user-interface (UI) of a shared screen of a handheld device in a VR, according to an embodiment.
Figure 26B:
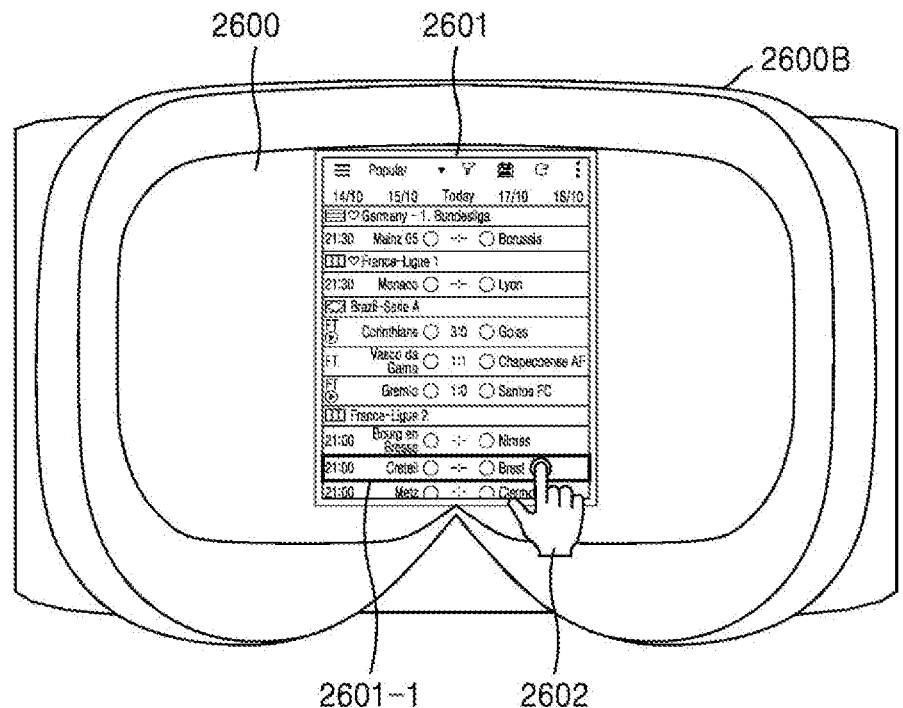
Figure 26C:
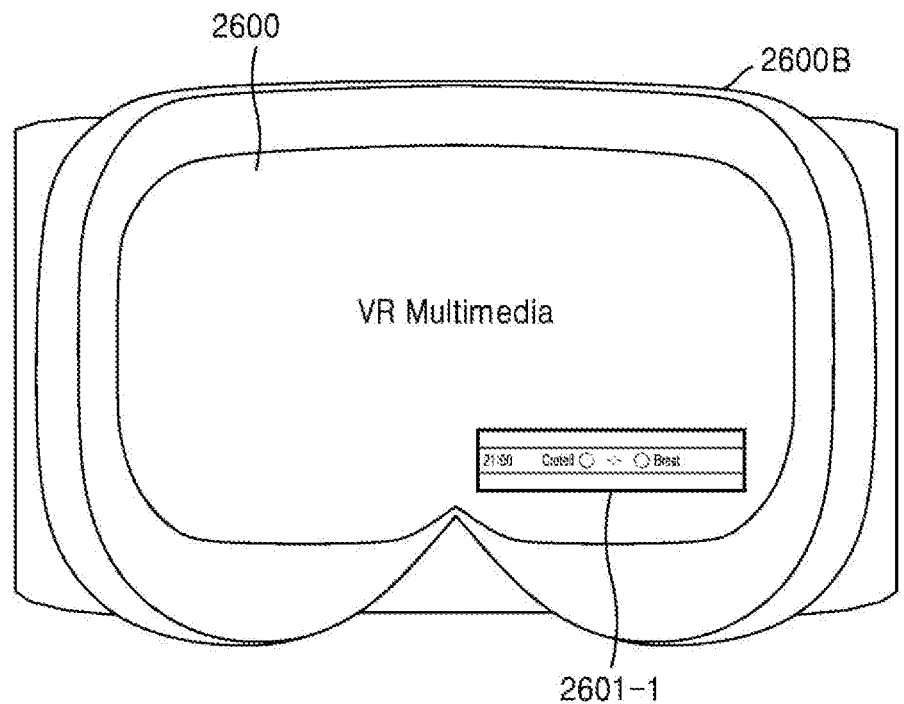

FIGS. 26A, 26B and 26C illustrate an example use-case of displaying a selected portion of a dynamic user-interface (UI) of a shared screen of a handheld device in a VR mode, according to an embodiment. FIG. 26A represents a display of a VR device 2600B which includes a view 2601 of the shared screen of a handheld device within the VR 2600 provided by the VR device 26008. By way of an example, the view 2601 regards to a sports new or commentary update application which may include dynamically changing portions within its user-interface (UI). In case the user does not wish to view the entire display information of the sports update application he may select a portion of the dynamic UI which he may desire to view in the VR as shown in FIG. 26B where a portion 2601-1 is selected as a desired dynamic UI to be seen in the VR. As the user makes a selection of the portion 2601-1 by way of a touch command on his handheld device, the finger pointer 2602 is displayed in the VR 2600 at the position where the user makes a selection of the portion 2601-1. Further, as illustrated in FIG. 26C, only the selection portion 2601-1 is displayed as the handheld device screen information in the VR 2600 while the VR content 'VR multimedia' plays in the background in the VR 2600.

Figure 27A:
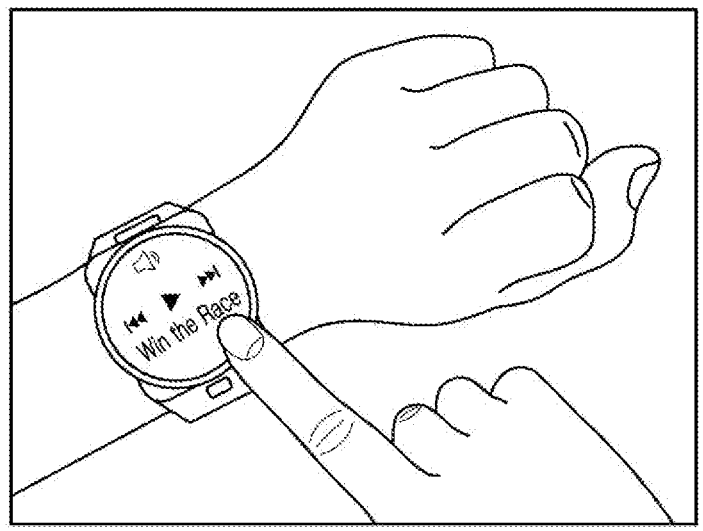
FIGS. 27A and 27B illustrate an example use-case of operating a connected device in a VR, according to an embodiment.
Figure 27B:
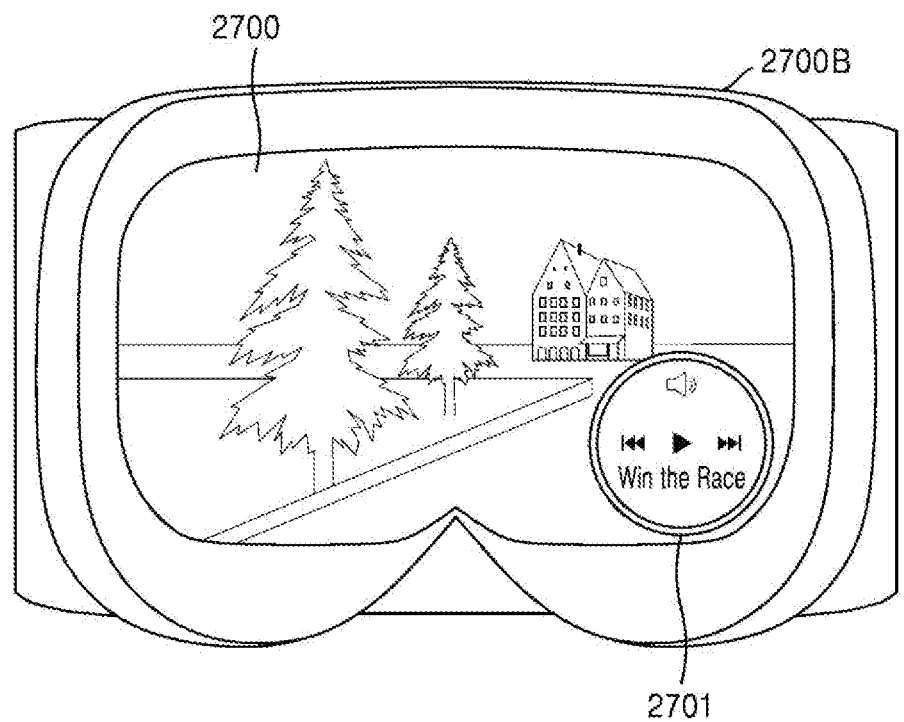

FIGS. 27A and 27B illustrate an example use-case of operating a connected device in a VR mode, according to an embodiment. The connected device may have a visual display, and the connected device may be a smart watch and be in communication with VR device. By way of an example, when initiation of operation of the connected device in VR is enabled, hovering gesture may be used to provide input command to the connected device. As shown in FIG. 27A, a user is seen providing an input command (for e.g. a finger hovering input) on the screen of a connected device, i.e., a smartwatch. The shared screen of the connected device is displayed in the VR 2700 provided by the VR device 2700B, as seen in FIG. 27B where the view 2701 belongs to the shared screen of the connected device. This implementation allows the user to check notifications on his connected device without removing his VR headset and also may read incoming notifications on his connected device in a larger view provided by the VR.

Figure 28:
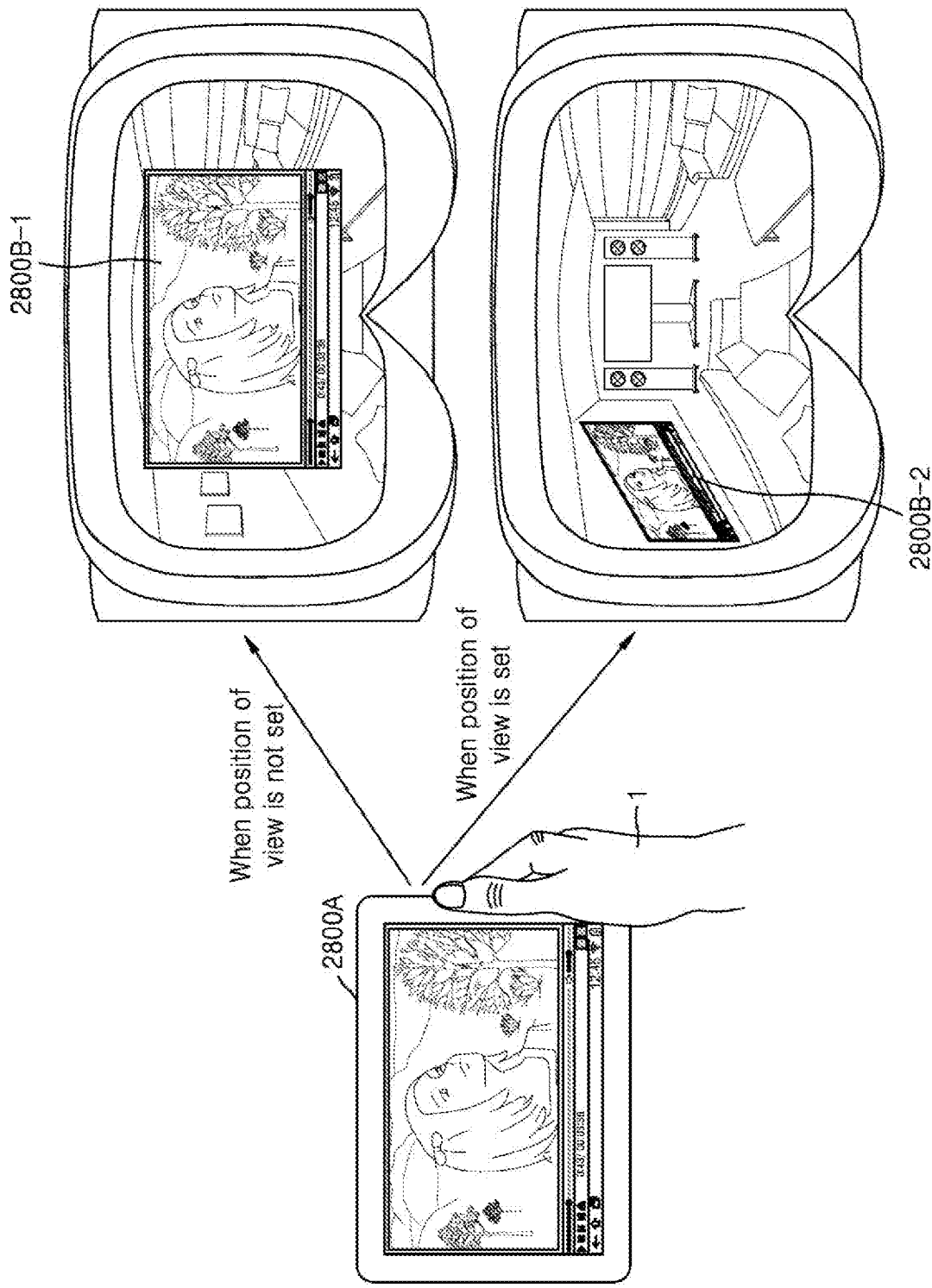
FIG. 28 illustrates an example use-case of positioning a shared screen view of a handheld device in a dedicated area of a VR display according to an embodiment.

FIG. 28 illustrates an example use-case of positioning a shared screen view of a handheld device in a dedicated area in a VR mode according to an embodiment. FIG. 28 illustrates a user 1 holding his handheld device 2800A and two possible scenarios in the VR display area, first being when the position of the view 2800B-1, i.e. the shared screen of the handheld device 2800A, is not set in the VR and the second being when the position of the view 2800B-2, i.e. the shared screen of the handheld device 2800A, is set in the VR.

Figure 29A:
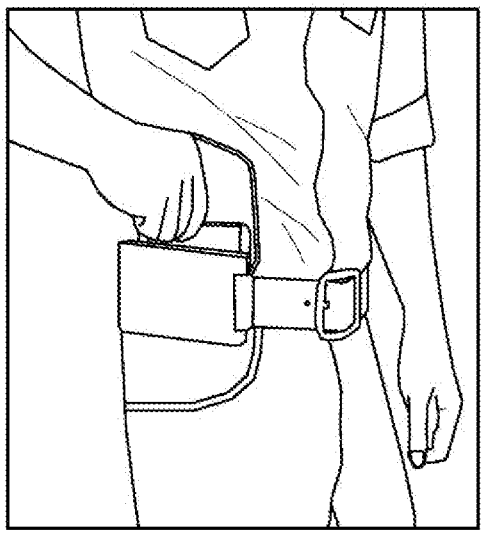
FIGS. 29A, 29B and 29C illustrate examples of methods of enabling a VR mode on a handheld device according to an embodiment.
Figure 29B:
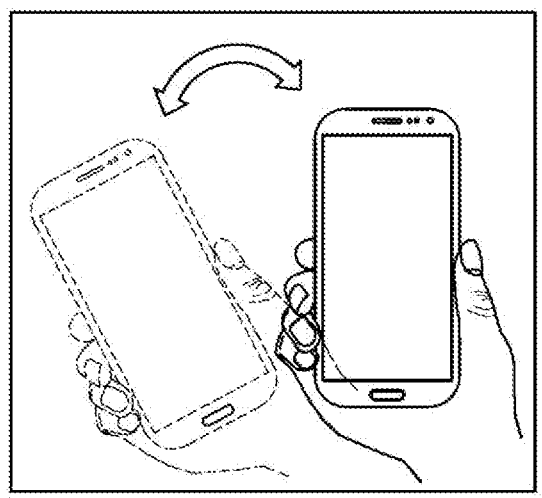
Figure 29C:
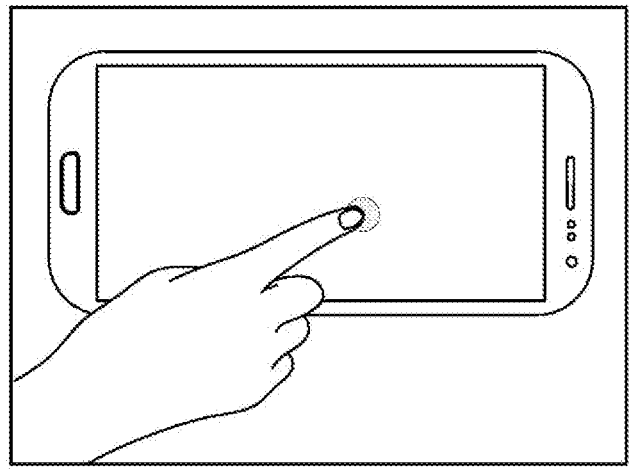

FIGS. 29A, 29B and 29C illustrate examples of methods of enabling a VR mode on a handheld device according to an embodiment. By way of example, when a user is watching VR content on a VR display using a VR device and he performs any of the described actions herein in relation to his handheld device, for e.g. a mobile phone, the VR mode may be enabled on his mobile phone and the mobile phone may be configured to be operated in the VR, according to an embodiment. Such actions may include, for example, the actions represented in FIGS. 29A to 29C. FIG. 29A illustrates the action of taking out of the mobile phone from the user's pocket which may be detected using pocket-detection methods known in the art. FIG. 29B illustrates shaking of the mobile phone which may be detected using motion sensors of the mobile phone. FIG. 29B illustrates a long press event performed on a touch-screen of the mobile phone which may be detected using touch-screen sensors of the mobile phone.

Figure 30A:
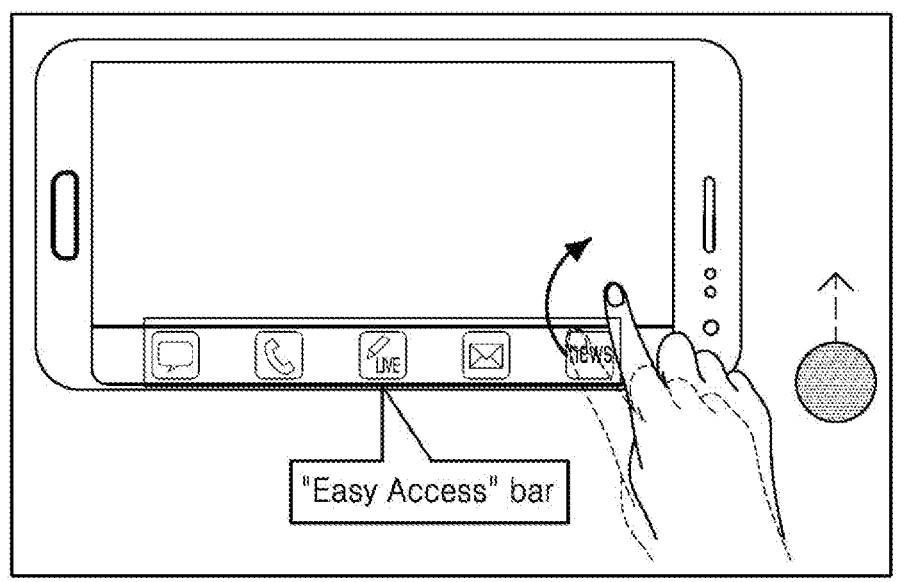
FIGS. 30A, 30B, 30C and 30D illustrate examples of methods of interacting with a handheld device in a VR mode, according to an embodiment.
Figure 30B:
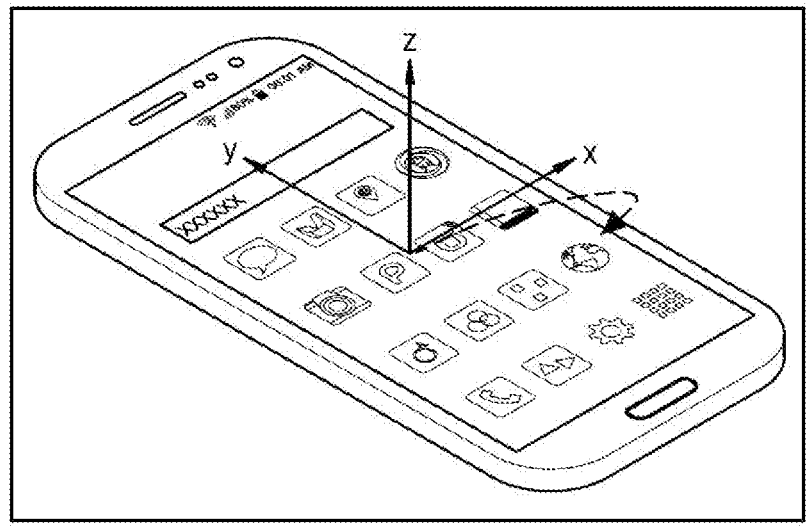
Figure 30C:
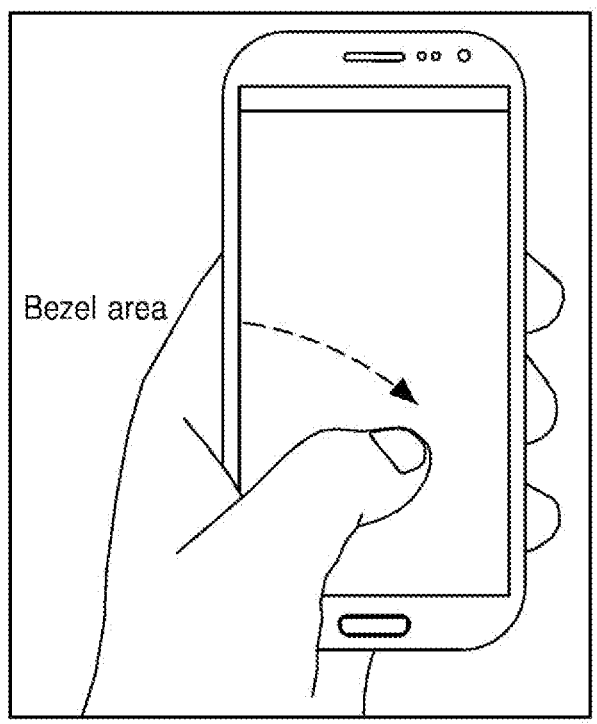
Figure 30D:
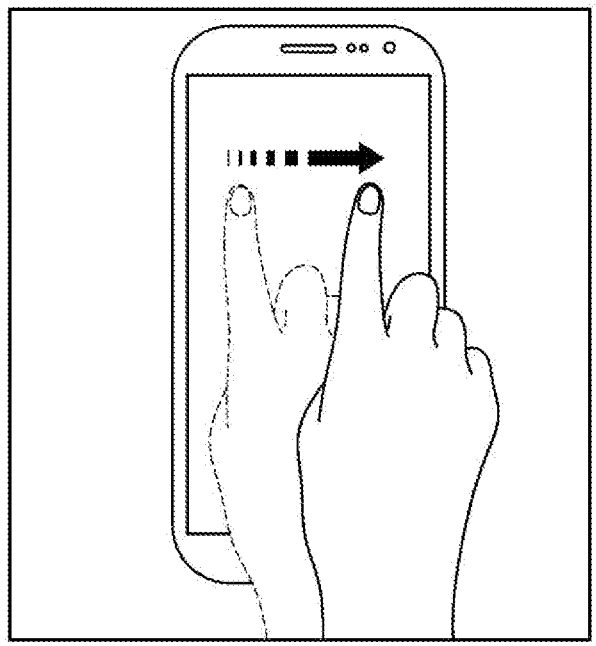

FIGS. 30A, 30B, 30C and 30D illustrate examples of methods of interacting with a handheld device in a VR mode, according to an embodiment. Such of the second interaction mechanism applicable in the VR mode may include for example, the interactions represented in FIGS. 30A to 30D. FIG. 30A represents a drag type input for selecting an application from an easy access bar. The easy access bar may include one or more applications, where the one or more application may receive selection to appear as the current screen of the handheld device. FIG. 30B represents a motion input received on a handheld device where the motion may be sensed in three dimensional 'x, y, z' plane illustrated using gyroscope sensors 121 of the handheld device. FIG. 30C illustrates a swipe type input received on a bezel-area of the screen of the handheld device which may be sensed by bezel-detecting sensors of the handheld device. FIG. 30D illustrates a finger-swipe received on a touch-screen of the handheld device which may be detected by touch-sensors of the handheld device.

Figure 31A:
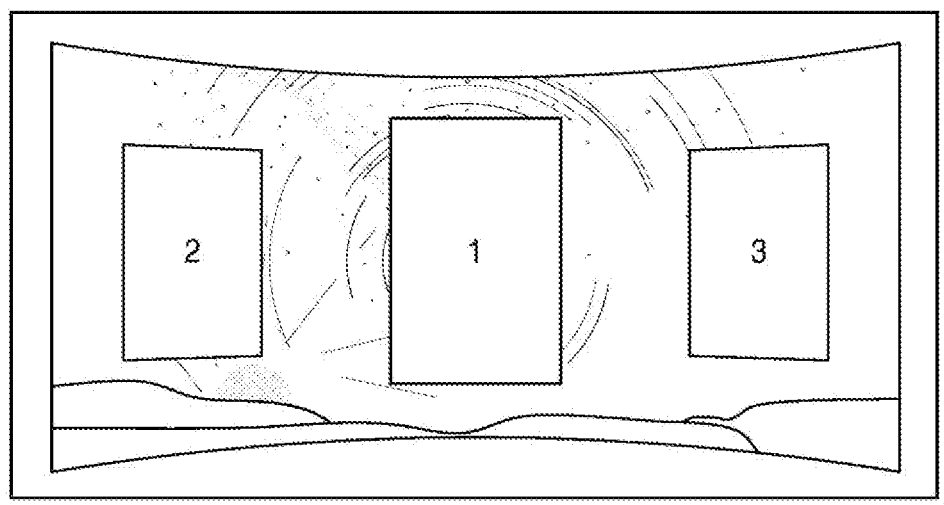
FIGS. 31A and 31B illustrate a use-case of switching between views of a primary screen and secondary screens in a VR, according to an embodiment.
Figure 31B:
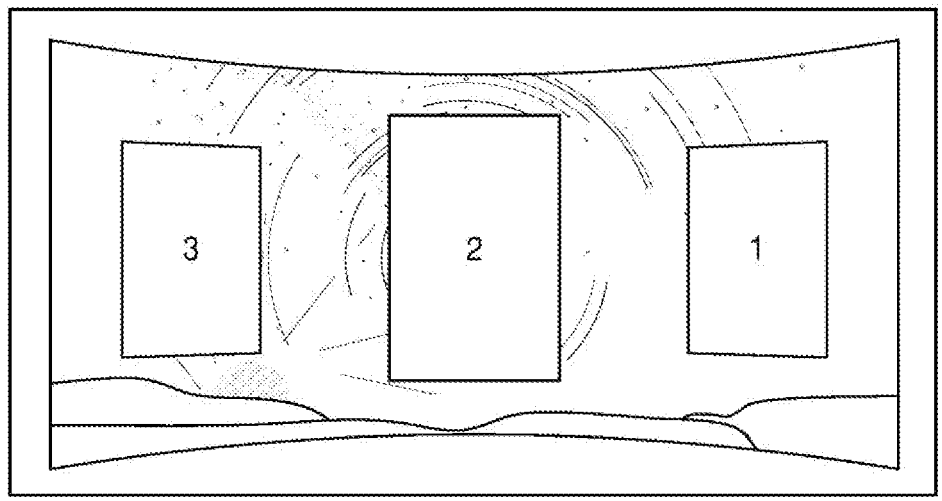

FIGS. 31A and 31B illustrate a use-case of switching between views of a primary screen and secondary screens in a VR mode, according to an embodiment. FIG. 31 illustrates a view of the VR display of a VR device 3000B. FIG. 31A illustrates a view where a current screen 1 of the handheld device is the primary view in the VR and screen 2 and screen 3 belonging to background applications on the handheld device are shown as secondary views in the VR. Based on receiving a user-input command for switching in-between the primary screen 1 with one of the screens, i.e., screen 2 of a background application, the screen 2 is displayed as the current screen in the primary view illustrated in FIG. 31B, and the screens 3 and 1 are shown as secondary views.

Figure 32:
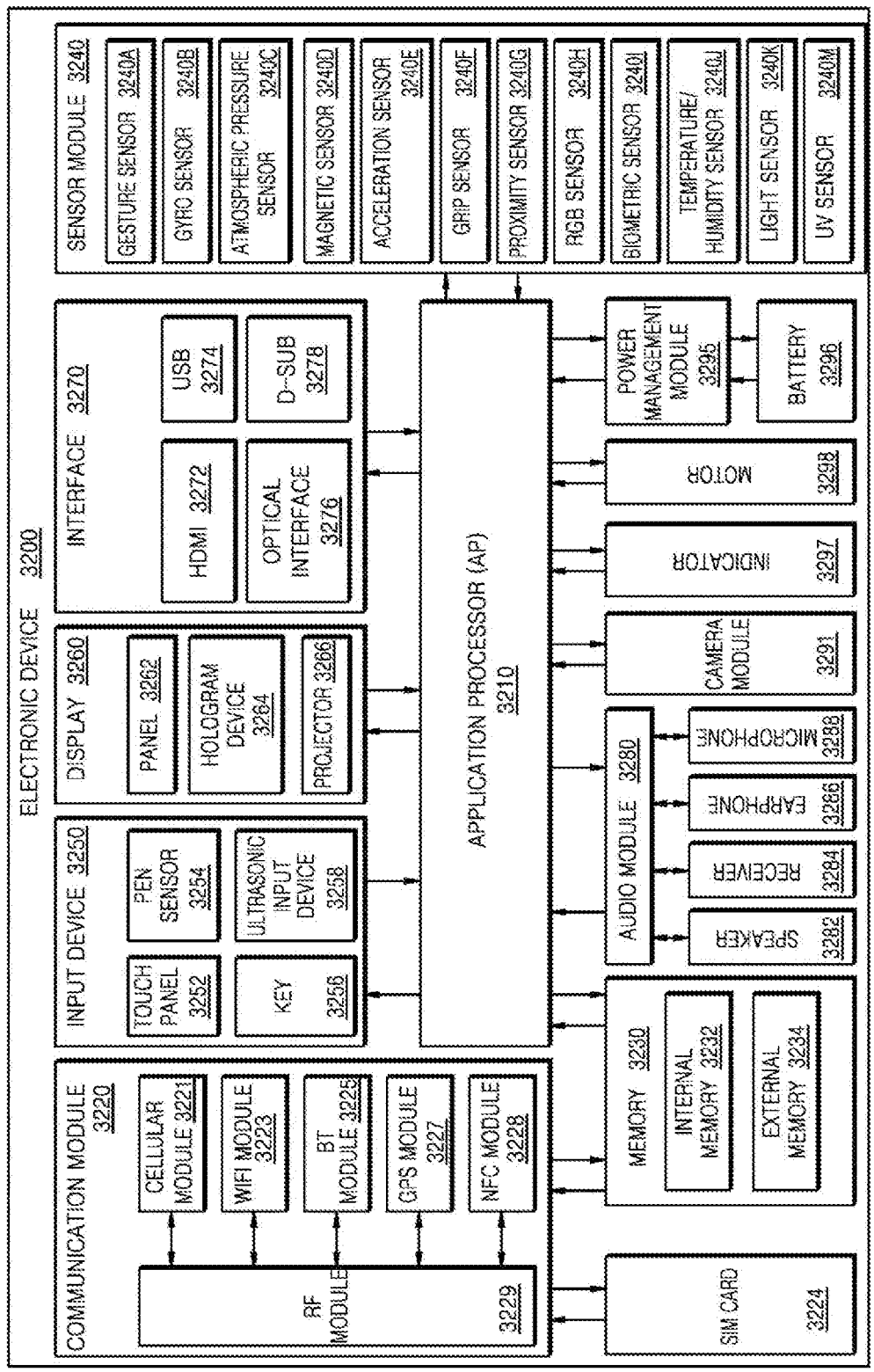
FIG. 32 illustrates a block diagram of a VR device, according to an embodiment.

FIG. 32 illustrates a block diagram of a VR device, according to an embodiment. Referring to FIG. 32, the VR device 3200 may include at least one application processor (AP) 3210, a communication module 3220, a subscriber identification module (SIM) card 3224, a memory 3230, a sensor module 3240, an input unit 3250, a display 3260, an interface 3270, an audio module 3280, a camera module 3291, a power management module 3295, a battery 3296, an indicator 3297, and a motor 3298.

The AP 3210 may drive an operating system or applications, control a plurality of hardware or software components connected thereto, and also perform processing and operation for various data including multimedia data. According to an embodiment, the AP 3210 may further include a graphic processing unit (GPU).

The communication module 3220 may perform a data communication with any other VR device connected to the VR device 3200 through the network. According to an embodiment, the communication module 3220 may include therein a cellular module 3221, a Wi-Fi module 3223, a BT module 3225, a GPS module 3227, an NFC module 3228, and an RF (Radio Frequency) module 3229.

The cellular module 3221 may offer a voice call, a video call, a message service, an internet service, or the like through a communication network (e.g., LTE, LTE-A, CDMA, WCDMA, UMTS, WiBro, or GSM, etc.). Additionally, the cellular module 3221 may perform identification and authentication of the VR device in the communication network, using the SIM card 3224. According to an embodiment, the cellular module 3221 may perform at least part of functions the AP 3210 may provide. For example, the cellular module 3221 may perform at least part of a multimedia control function.

According to an embodiment, the cellular module 3221 may include a communication processor (CP). Additionally, the cellular module 3221 may be formed of SoC, for example. Although some elements such as the cellular module 3221 (e.g., the CP), the memory 3230, or the power management module 3295 are shown as separate elements being different from the AP 3210 in FIG. 32, the AP 3210 may be formed to have at least part (e.g., the cellular module 3221) of the above elements in an embodiment.

According to an embodiment, the AP 3210 or the cellular module 3221 (e.g., the CP) may load commands or data, received from a non-volatile memory connected thereto or from at least one of the other elements, into a volatile memory to process them. Additionally, the AP 3210 or the cellular module 3221 may store data, received from or created at one or more of the other elements, in the non-volatile memory.

Each of the WiFi module 3223, the BT module 3225, the GPS module 3227 and the NFC module 3228 may include a processor for processing data transmitted or received there through. Although FIG. 32 shows the cellular module 3221, the WiFi module 3223, the BT module 3225, the GPS module 3227 and the NFC module 3228 as different blocks, at least part of them may be contained in a single IC (Integrated Circuit) chip or a single IC package in an embodiment. For example, at least part (e.g., the CP corresponding to the cellular module 3221 and a Wi-Fi processor corresponding to the Wi-Fi module 3223) of respective processors corresponding to the cellular module 3221, the Wi-Fi module 3223, the BT module 3225, the GPS module 3227 and the NFC module 3228 may be formed as a single SoC.

The RF module 3229 may transmit and receive data, e.g., RF signals or any other electric signals. Although not shown, the RF module 3229 may include a transceiver, a PAM (Power Amp Module), a frequency filter, an LNA (Low Noise Amplifier), or the like. Also, the RF module 3229 may include any component, e.g., a wire or a conductor, for transmission of electromagnetic waves in a free air space. Although FIG. 32 shows that the cellular module 3221, the Wi-Fi module 3223, the BT module 3225, the GPS module 3227 and the NFC module 3228 share the RF module 3229, at least one of them may perform transmission and reception of RF signals through a separate RF module in an embodiment.

The SIM card 3224 may be a specific card formed of SIM and may be inserted into a respective slot formed at a certain place of the VR device 3200. The SIM card 3224 may contain therein an ICCID (Integrated Circuit Card IDentifier) or an IMSI (International Mobile Subscriber Identity).

The memory 3230 may include an internal memory 3232 and an external memory 3234. The internal memory 3232 may include, for example, at least one of a volatile memory (e.g., DRAM (Dynamic RAM), SRAM (Static RAM), SDRAM (Synchronous DRAM), etc.) or a non-volatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 3232 may have the form of an SSD (Solid State Drive). The external memory 3234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 3234 may be functionally connected to the VR device 3200 through various interfaces. According to an embodiment, the VR device 3200 may further include a storage device or medium such as a hard drive.

The sensor module 3240 may measure physical quantity or sense an operating status of the VR device 3200, and then convert measured or sensed information into electric signals. The sensor module 3240 may include, for example, at least one of a gesture sensor 3240A, a gyro sensor 3240B, an atmospheric sensor 3240C, a magnetic sensor 3240D, an acceleration sensor 3240E, a grip sensor 3240F, a proximity sensor 3240G, a color sensor 3240H (e.g., RGB (Red, Green, Blue) sensor), a biometric sensor 3240I, a temperature-humidity sensor 3240J, an illumination sensor 3240K, and a UV (ultraviolet) sensor 3240M. Additionally or alternatively, the sensor module 3240 may include, e.g., an E-nose sensor, an EMG (electromyography) sensor, an EEG (electroencephalogram) sensor, an ECG (electrocardiogram) sensor, an IR (infrared) sensor, an iris scan sensor, or a finger scan sensor. Also, the sensor module 3240 may include a control circuit for controlling one or more sensors equipped therein.

The input unit 3250 may include a touch panel 3252, a digital pen sensor 3254, a key 3256, or an ultrasonic input unit 3258. The touch panel 3252 may recognize a touch input in a manner of capacitive type, resistive type, infrared type, or ultrasonic type. Also, the touch panel 3252 may further include a control circuit. In an embodiment including a capacitive type, a physical contact or proximity may be recognized. The touch panel 3252 may further include a tactile layer. In this example, the touch panel 3252 may offer a tactile feedback to a user.

The digital pen sensor 3254 may be formed in the same or similar manner as receiving a touch input or by using a separate recognition sheet. The key 3256 may include, for example, a physical button, an optical key, or a keypad. The ultrasonic input unit 3258 is a specific device capable of identifying data by sensing sound waves with a microphone 3288 in the VR device 3200 through an input tool that generates ultrasonic signals, thus allowing wireless recognition. According to an embodiment, the VR device 3200 may receive a user input from any external device (e.g., a computer or a server) connected thereto through the communication module 3220.

The display 3260 (e.g., the display 3250) may include a panel 3262, a hologram 3264, or a projector 3266. The panel 3262 may be, for example, LCD (Liquid Crystal Display), AM-OLED (Active Matrix Organic Light Emitting Diode), or the like. The panel 3262 may have a flexible, transparent or wearable form. The panel 3262 may be formed of a single module with the touch panel 3252. The hologram 3264 may show a stereoscopic image in the air using interference of light. The projector 3266 may project an image onto a screen, which may be located at the inside or outside of the VR device 3200. According to an embodiment, the display 3260 may further include a control circuit for controlling the panel 3262, the hologram 3264, and the projector 3266.

The interface 3270 may include, for example, an HDMI (High-Definition Multimedia Interface) 3272, a USB (Universal Serial Bus) 3274, an optical interface 3276, or a D-sub (D-subminiature) 3278. Additionally or alternatively, the interface 3270 may include, for example, an MHL (Mobile High-definition Link) interface, an SD (Secure Digital) card/MMC (Multi-Media Card) interface, or an IrDA (Infrared Data Association) interface.

The audio module 3280 may perform a conversion between sounds and electric signals. The audio module 3280 may process sound information inputted or outputted through a speaker 3282, a receiver 3284, an earphone 3286, or a microphone 3288.

The camera module 3291 is a device capable of obtaining still images and moving images. According to an embodiment, the camera module 3291 may include at least one image sensor (e.g., a front sensor or a rear sensor), a lens, an ISP (Image Signal Processor, not shown), or a flash (e.g., LED or xenon lamp, not shown).

The power management module 3295 may manage electric power of the VR device 3200. Although not shown, the power management module 3295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 3296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 3296 and a voltage, current or temperature in a charging process. The battery 3296 may store or create electric power therein and supply electric power to the VR device 3200. The battery 3296 may be, for example, a rechargeable battery or a solar battery.

The indicator 3297 may show thereon a current status (e.g., a booting status, a message status, or a recharging status) of the VR device 3200 or of its part (e.g., the AP 3210). The motor 3298 may convert an electric signal into a mechanical vibration. Although not shown, the VR device 3200 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the VR device disclosed herein may be formed of one or more components, and its name may be varied according to the type of the VR device. The VR device disclosed herein may be formed of at least one of the above-discussed elements without some elements or with additional other elements. Some of the elements may be integrated into a single entity that still performs the same functions as those of such elements before integrated.

The various actions, acts, blocks, steps, or the like in the flowchart may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein may be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the embodiments as described herein.

The invention claimed is:

1. An electronic device comprising:
   a memory storing instructions; and
   at least one processor configured to execute the instructions to:
   detect at least one event of another electronic device operating in a first mechanism;
   in response to the detected at least one event, cause the other electronic device to operate in a second mechanism;
   receive screen information of the other electronic device; and
   display a virtual reality screen based on the screen information.

2. The electronic device of claim 1, wherein the second mechanism comprises a hovering input mechanism.

3. The electronic device of claim 2, wherein the first mechanism excludes the hover input mechanism.

4. The electronic device of claim 1, wherein the at least one processor is further configured to execute the instructions to:
   receive position information of an input means with respect to the other electronic device from the other electronic device; and
   display a visual indicator based on the received position information.

5. The electronic device of claim 1, wherein the at least one processor is further configured to execute the instructions to:
   receive information of an input command received at the other electronic device; and
   perform a corresponding operation based on the received information of the input command.

6. The electronic device of claim 1, wherein in response to the detected at least one event, an input receiving mechanism of the other electronic device is switched from a first input receiving mechanism to a second input receiving mechanism.

7. The electronic device of claim 1, wherein in response to the detected at least one event, a screen displaying mechanism of the other electronic device is switched from a first screen displaying mechanism to a second screen displaying mechanism.

8. The electronic device of claim 1, wherein a plurality of windows are displayed in the virtual reality screen based on the received screen information, and none or one of the plurality of windows is displayed in a screen of the other electronic device based on the screen information.

9. The electronic device of claim 1, wherein in response to the detected at least one event, rendering of the screen information at the other electronic device is stopped.

10. An electronic device comprising:
    a memory storing instructions; and
    at least one processor configured to execute the instructions to:
    detect at least one event of the electronic device operating in a first mechanism;
    in response to the detected at least one event, operate in a second mechanism; and
    transmit screen information of the electronic device to another electronic device for displaying a virtual reality screen at the other electronic device based on the screen information.

11. The electronic device of claim 10, wherein the screen information includes first screen information regarding a first application running in foreground of the electronic device and second screen information regarding a second application running in background of the electronic device.

12. The electronic device of claim 11, wherein the at least one processor is further configured to execute the instructions to:
store the first screen information and the second screen information at a first rate and a second rate respectively.

13. The electronic device of claim 12, wherein the first rate is greater than the second rate.

14. The electronic device of claim 11, wherein the at least one processor is further configured to execute the instructions to:
store the first screen information and the second screen information in a dedicated buffer and a ring buffer respectively.

15. The electronic device of claim 10, wherein a plurality of windows are displayed in the virtual reality screen based on the screen information at the other electronic device and none or one of the plurality of windows is displayed in a screen of the electronic device based on the screen information.

16. The electronic device of claim 10, wherein in response to the detected at least one event, rendering of the screen information at the electronic device is stopped.

17. A method performed at an electronic device, comprising:
detecting at least one event of another electronic device operating in a first mechanism;
in response to the detected at least one event, causing the other electronic device to operate in a second mechanism;
receiving screen information of the other electronic device; and
displaying a virtual reality screen based on the screen information.

18. The method of claim 17, wherein the second mechanism comprises a hovering input mechanism, and the first mechanism excludes the hover input mechanism.

19. The method of claim 17, further comprising:
receiving position information of an input means with respect to the other electronic device from the other electronic device; and
displaying a visual indicator based on the received position information.

20. The method of claim 17, further comprising:
receiving information of an input command received at the other electronic device; and
performing a corresponding operation based on the received information of the input command.

* * * * *